(12) United States Patent
Klughart

(10) Patent No.: US 9,080,529 B1
(45) Date of Patent: *Jul. 14, 2015

(54) FUEL MANAGEMENT FUEL SURCHARGE SYSTEM AND METHOD

(76) Inventor: Kevin Mark Klughart, Denton, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 13/200,169

(22) Filed: Sep. 17, 2011

Related U.S. Application Data

(63) Continuation-in-part of application No. 13/136,144, filed on Jul. 25, 2011, now Pat. No. 8,538,591.

(51) Int. Cl.
*G05D 1/00* (2006.01)
*F02D 41/24* (2006.01)

(52) U.S. Cl.
CPC .................................. *F02D 41/2467* (2013.01)

(58) Field of Classification Search
CPC .................................................. F02D 41/2467
USPC ........................................................ 701/104
See application file for complete search history.

(56) References Cited

U.S. PATENT DOCUMENTS

| D294,820 S | 3/1988 | Belletire | |
|---|---|---|---|
| 6,879,962 B1 * | 4/2005 | Smith et al. | 705/22 |

OTHER PUBLICATIONS

SSI Technologies, Inc., "Application Note AT-AN12—ACU-Trac Smart 485 Liquid Level Transducers Family Overview", www.ssitechnologies.com, Janesville, WI USA, Feb. 8, 2010.

SSI Technologies, Inc., "Application Note AT-AN2—ACU-Trac NEMA 4 Liquid Level Sensor Product Overview", www.ssitechnologies.com, Janesville, WI USA, Mar. 7, 2007.
SSI Technologies, Inc., "Application Note AT-AN3—ACU-Trac Nema 6 Liquid Level Transmitter Product Overview", www.ssitechnologies.com, Janesville, WI USA, Mar. 15, 2007.
SSI Technologies, Inc., "Application Note AT-AN4—ACU-Trac Fuel Level Sensor Product Overview", www.ssitechnologies.com, Janesville, WI USA, Mar. 19, 2007.
SSI Technologies, Inc., "Application Note FT-AN1—Fluid-Trac 2-Wire Level Sensor (Resistive Emulation)", www.ssitechnologies.com, Janesville, WI USA, May 24, 2007.

(Continued)

*Primary Examiner* — Ramsey Refai
(74) *Attorney, Agent, or Firm* — Kevin M. Klughart

(57) ABSTRACT

A fuel management system and method that permits accurate accounting of fuel consumption within the context of a fuel consuming system is disclosed. The system/method may be broadly described as comprising a fuel level sensor, fuel level sensor transponder, fuel accounting system, and optional regulated fuel dispenser. The fuel level sensor accurately determines the contents of a fuel tank. This information is reported via fuel sensor transponder to a fuel accounting system that tracks the fuel consumption of the fuel consuming system and provides billing information based on the detected fuel consumption. This accounting information may be utilized within an optional regulated fuel dispenser to refill/unfill the fuel tank to an accurately predetermined fuel level for the next fuel management accounting cycle. The present invention has many applications, including but not limited to management of rental/lease vehicles, transportation fuel surcharges, leased vehicle fleet returns, and/or fuel arbitrage.

4 Claims, 32 Drawing Sheets

(56) References Cited

OTHER PUBLICATIONS

SSI Technologies, Inc., "Application Note FT-AN2—Fluid-Trac 3-Wire Level Sensor (Voltage Output)", www.ssitechnologies.com, Janesville, WI USA, May 24, 2007.

SSI Technologies, Inc., "Digital Fluid-Trac Ultrasonic Drum Level Gauge Overview", www.ssitechnologies.com, Janesville, WI USA, Jan. 28, 2010.

* cited by examiner

FIG. 3
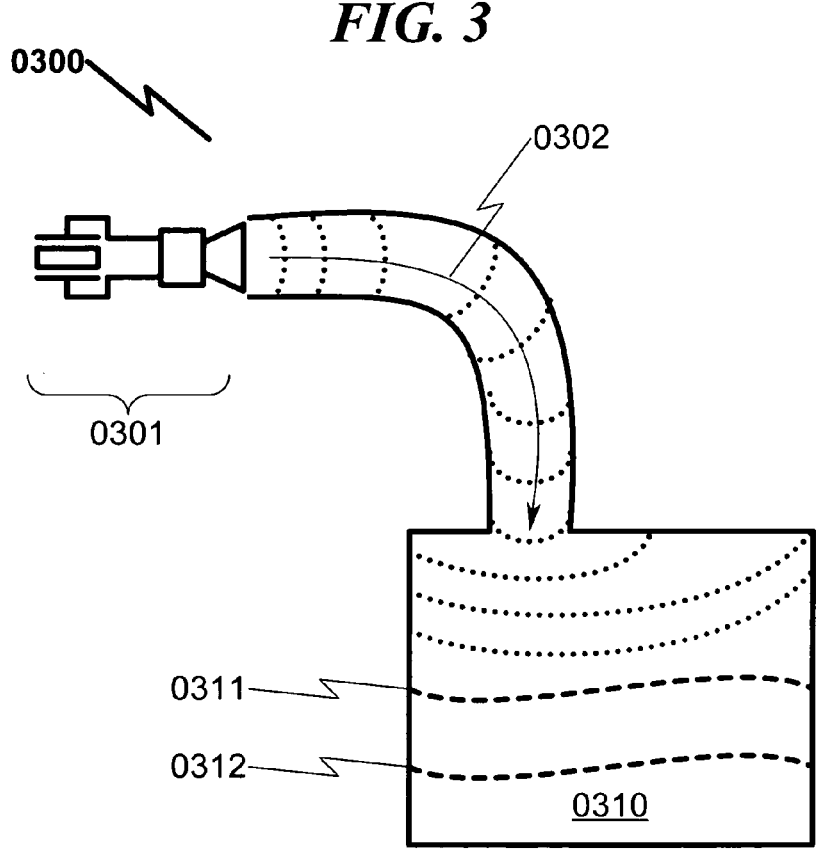
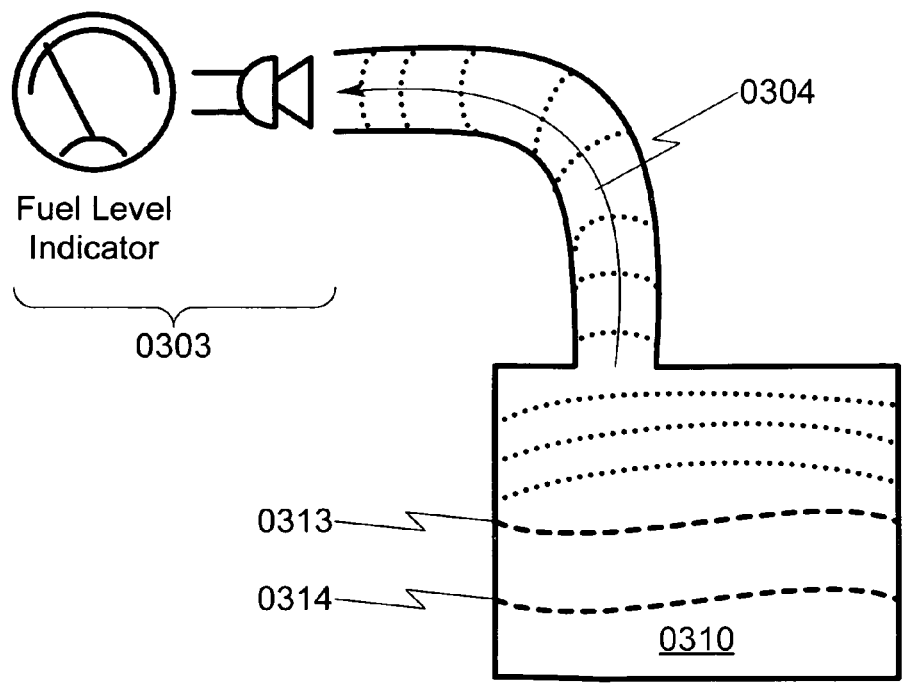

FUEL MANAGEMENT FUEL SURCHARGE SYSTEM AND METHOD

CROSS REFERENCE TO RELATED APPLICATIONS

Utility Patent Application

This patent application is a Continuation-in-Part (CIP) of United States Patent Utility Application Ser. No. 13/136,144 for "FUEL MANAGEMENT SYSTEM AND METHOD" filed on Jul. 25, 2011 now U.S. Pat. No. 8,538,591 by Applicant Kevin Mark Klughart. Applicant claims benefit pursuant to 35 U.S.C. §119/35 U.S.C. §120 and hereby incorporates by reference this Utility Patent Application for "FUEL MANAGEMENT SYSTEM AND METHOD", Ser. No. 13/136,144, filed Jul. 25, 2011, and submitted to the USPTO with Express Mail Label EG942485914US.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for managing fuel consumption and accounting for same within the context of supporting the needs of one or more fuel consuming systems. This field includes but is not limited generally to situations in which fuel consumption is managed and accounted for within a fleet of motor vehicles, automobiles, and/or trucks.

PRIOR ART AND BACKGROUND OF THE INVENTION

A common issue regarding the rental/lease of automobiles, trucks, motor vehicles, and other fuel consuming systems is the management and accounting for fuel use within these fuel consuming systems and proper chargeback to the rental/lease customer for situations in which fuel is consumed but not replaced by the customer. Typical approaches to this fuel accounting methodology require that the rental/lease agency issue the motor vehicle with a "full" fuel tank and require that the customer return the motor vehicle with a "full" fuel tank. If the customer returns the vehicle with a fuel gauge indicating anything less than a "full" tank, the rental/lease agency generally refills the fuel tank to a "full" level and charges the rental/lease customer appropriate fees based on the vehicle rental/lease contract.

While minor discrepancies in fuel tank contents may seem insignificant in the overall profitability in the rental/lease vehicle market, it should be noted that the rental car market in the United States has annual revenue of approximately USD$21 billion, with a fleet of approximately 1.6 million automobile rental vehicles (2010 data). This rental fleet services at least 22 million auto rental transactions per year (VISA® brand credit card rental car transaction count for 2004). This data would on its face suggest each transaction accounted for approximately USD$1000.00. However, a more realistic transaction value would be approximately one-quarter of this value, or approximately USD$250.00 (given that the transaction count cited was for a specific credit card vendor, and other credit card vendors are not included in this total). This analysis could easily yield 50+ million auto rental transactions per year. If each of these rentals is associated with a half gallon of unrecovered fuel cost, the total lost profit for this market could easily reach USD$100 million per year, or 0.5% of overall revenue, a significant profit loss given the overall profit margins in the industry.

Various fuel accounting issues are associated with this conventional prior art approach and include but are not limited to the following:
  What constitutes a "full" fuel tank is extremely subjective, as the fuel gauges in most motor vehicles are generally nonlinear and subject to significant inaccuracies.
  Customers may return the vehicle with less fuel than was originally in the fuel tank when the vehicle was issued to them, but due to inaccuracies in the fuel gauges of most vehicles this discrepancy may not be noticed, accounted for, or charged to the customer.
  Refilling of fuel tanks by various rental/lease employees may result in inconsistent amounts of fuel in the fuel tank as the vehicle is issued to the rental/lease customer.
  The definition of a "full" tank, as both defined by the vehicle rental/lease agency and the customer may have different meanings because neither party has an accurate method of determining fuel tank contents.
  Since neither the rental/lease agency nor customer can determine the exact fuel tank contents, neither party has sufficient information as to how much fuel should be added to the fuel tank to constitute a "full" tank of fuel.
  In many circumstances the vehicle rental/lease agency loses revenue on returned vehicles that contain less fuel than when the vehicles were issued, but the resolution of prior art fuel gauges do not permit the level of fuel tank level accuracy to properly account for these losses. As a result, vehicle rental/lease agencies may lose millions of dollars annually due to these unrecoverable fuel losses.

The inability of vehicle rental/lease agencies to accurately manage their fuel costs can result in significant lost profits, as the fuel tank refilling charges account for a significant profits stream for these companies. However, to date no accurate methodology has been proposed to manage fuel recovery costs for these companies or to provide any methodology of defining a "full" fuel tank in these situations.

DEFICIENCIES IN THE PRIOR ART

The prior art as detailed above suffers from the following deficiencies:
  Current methodologies of determining the contents of a fuel tank are generally too inaccurate to provide suitable fuel accounting management.

Traditional fuel sensors within fuel tanks are not suitable for accurate measurement of fuel tank contents.

Traditional methods of fuel tank filling by rental/lease agencies are prone to discrepancies in the amount of fuel placed in the tank based on a number of factors, including operator variances, fuel pump characteristics, time of day, temperature, etc.

Consumers of rental/lease automobiles, trucks, and the like have no reliable methodology to determine when the fuel tank is "full".

Automobile, truck, and other rental/lease agencies have no accurate methodology to determine if a fuel tank is "full" and lack any standardization as to how a "full" tank of fuel is to be defined.

As environmental temperature may vary significantly in vehicle rental/lease environments, the fuel tank volume may vary significantly based on these environmental factors, and to date there is no methodology to compensate for this effect.

In a rental/lease vehicle context, many customers return the rental/lease vehicle with "overfull" fuel tank levels that may spill or waste fuel when the vehicle is rented/leased to the next customer. No provision is made in the prior art to mitigate or reduce the environmental hazards associated with this practice.

In a rental/lease vehicle context, the refueling of rental/lease vehicles may incur significant variances based on the fueling operator, fuel pump used, and other environmental factors. As such, some refueled rental/lease vehicles may leave the rental/lease facility with "overfull" fuel tank levels that may spill or waste fuel when the vehicle is used by the current rental/leasing customer. No provision is made in the prior art to mitigate or reduce the environmental hazards associated with this practice.

While some of the prior art may teach some solutions to several of these problems, the core issue of fuel management, especially in the context of a rental/lease environment has not been addressed.

OBJECTIVES OF THE INVENTION

Accordingly, the objectives of the present invention are (among others) to circumvent the deficiencies in the prior art and affect the following objectives:

(1) Provide for a fuel management system and method that permits accurate determination of fuel tank contents.

(2) Provide for a fuel management system and method that permits accurate calibration of fuel tank fuel level sensors.

(3) Provide for a fuel management system and method that permits individual calibration of fuel tank fuel level sensors to their associated fuel tank.

(4) Provide for a fuel management system and method that permits a rental/lease agency to accurately define a "full" tank of fuel within a fuel tank.

(5) Provide for a fuel management system and method that permits a retail consumer of rental/lease automobile/truck the ability to determine if the fuel tank is "full".

(6) Provide for a fuel management system and method that permits a retail agency to accurately "fill" a fuel tank to a predetermined accurate "full" level.

(7) Provide for a fuel management system and method that permits returned automobile/truck rentals to be accurately charged for fuel tanks that are not returned "full".

(8) Provide for a fuel management system and method that permits quick determination as to whether a fuel tank is "full".

(9) Provide for a fuel management system and method that permits "overfull" fuel tanks to be normalized to a predetermined "full" level.

(10) Provide for a fuel management system and method that reduces the environmental damage caused by "overfull" fuel tanks.

(11) Provide for a fuel management system and method that permits fuel recovery from fuel tanks that have been "overfilled".

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention and typical system application as applied to a fuel management system may take many forms, but a preferred exemplary embodiment as illustrated within the context of a rental/lease automobile/truck environment is indicative of the breadth of the invention. The system/method may be broadly described as comprising a fuel level sensor, fuel level sensor transponder, fuel accounting system, and optional regulated fuel dispenser. The fuel level sensor accurately determines the contents of a fuel tank. This information is reported (typically wirelessly) via fuel sensor transponder to a fuel accounting system that tracks the fuel consumption of the fuel consuming system and provides billing information based on the detected fuel consumption. This fuel accounting information may be utilized within an optional regulated fuel dispenser to refill/unfill the fuel tank to an accurately predetermined fuel level for the next fuel management accounting cycle.

The system may incorporate a variety of fuel level sensors, but a preferred exemplary embodiment utilizes an ultrasonic fuel level sensor embodied in a fuel tank cap or other fuel tank covering that permits the fuel tank level to be accurately determined with no physical contact to the fuel within the fuel tank. The fuel tank sensor transponder optimally operates in a wireless fashion to transmit information describing the fuel tank level to a computer system running fuel tank accounting software. This accounting software may log the fuel tank level as the automobile/truck is rented/leased and then again when the automobile/truck is returned. Differentials in measured fuel tank contents may be automatically billed to the rental/lease consumer based on the contracted fuel reimbursement costs.

The measured fuel tank level upon return of the rental/lease vehicle may be input into a fuel dispenser that automatically dispenses fuel to the fuel tank in an amount sufficient to restore the fuel tank to a predetermined "full" level. By coordinating the fuel dispenser to the known fuel tank contents, the fuel tank may be refilled to an accurately known "full" level after each vehicle return, thus eliminating the possibility of overfilling or wasting fuel in the refilling process.

Method Overview

The present invention method can be generally described as incorporating the following steps:

Accurately sensing the level of fuel in a fuel tank;

Transmitting this fuel level information via a fuel level sensor transponder;

Receiving the fuel level information in a fuel accounting system;

Tracking the fuel level information associated with a given customer in a customer database;

Optionally refilling/unfilling the fuel tank using a fuel dispenser system that is controlled by the fuel accounting system based on the difference between the measured fuel tank level and a predetermined "full" fuel tank level.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 3 illustrates a generalized system overview of a preferred exemplary embodiment of an ultrasonic fuel level sensor system useful in some preferred embodiments of the present invention;

DESCRIPTION OF THE PRESENTLY PREFERRED EXEMPLARY EMBODIMENTS

Figure 1:
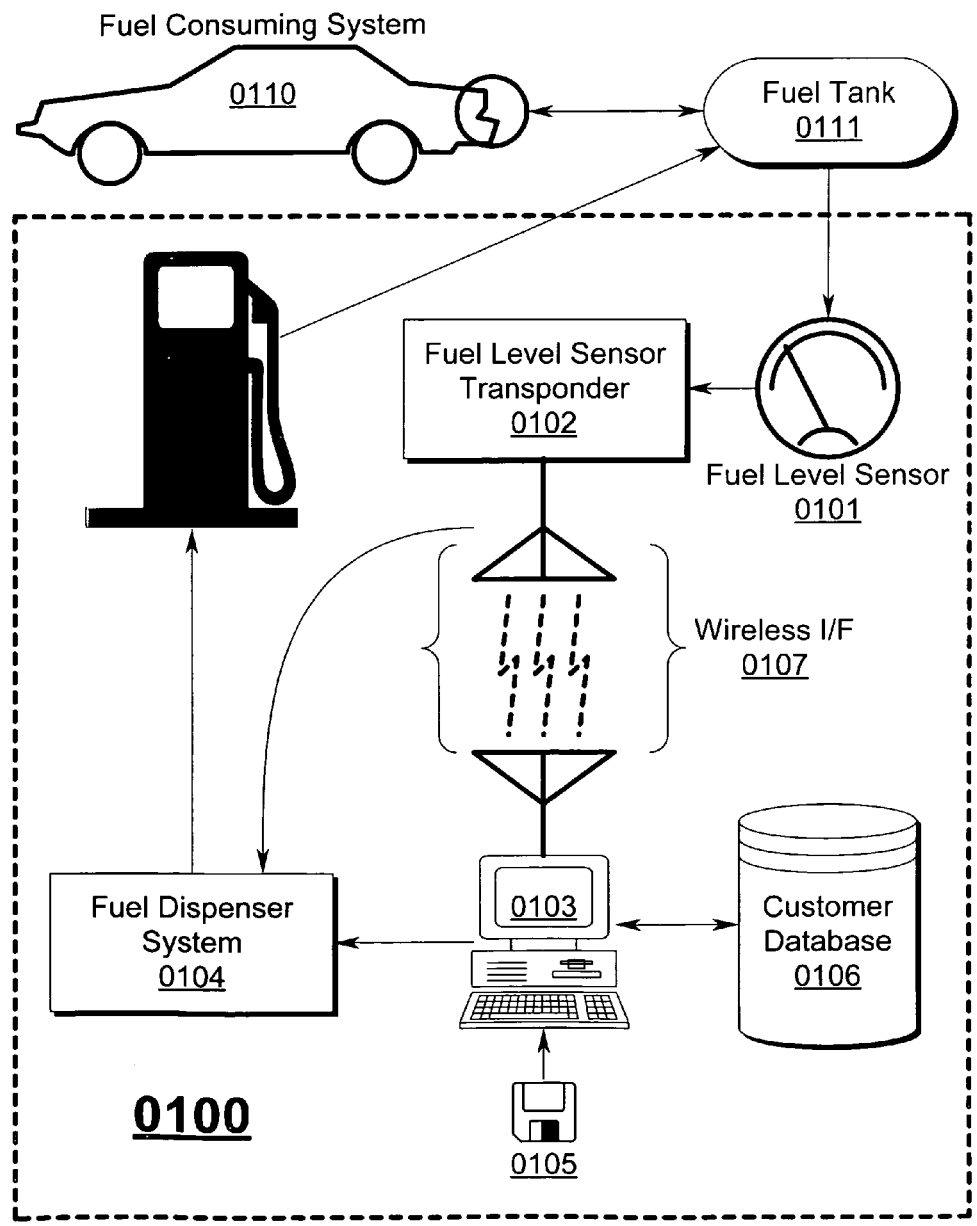
FIG. 1 illustrates a generalized system overview of a preferred exemplary embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a FUEL MANAGEMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Fuel Level Sensor Not Limitive

The present invention has as one of its features the accurate detection of fuel level within a fuel tank system. While the present invention does not limit the technology used to achieve this functionality, many preferred exemplary embodiments utilize an ultrasonic transducer to excite the unfilled cavity within the fuel tank to determine the amount of fuel present within the fuel tank. While this is viewed as the optimal methodology to achieve this desired function, the present invention does not limit the scope of the invention to this particular method of fuel level determination.

"Fuel Cap" Fuel Level Sensor Not Limitive

The present invention in some preferred exemplary embodiments utilizes a fuel level sensor integrated into the fuel cap ("gas cap") used to cover the fuel filling point of the fuel tank. This particular methodology of integrating the fuel level sensor into the overall system is believed to be optimal, but the present invention is not limited to this particular embodiment in implementing the fuel level sensor functionality.

Fuel Type Not Limitive

The present invention may be applied to a wide variety of fuel types, including but not limited to petroleum based fuels such as gasoline and/or diesel. However, the teachings of the present invention are not limited to any particular fuel type, and may include other forms of stored energy, including but not limited to compressed gasses, etc. In summary, the particular fuel associated with the fuel consuming system is ancillary to the methodologies detailed herein used to manage the fuel used within the fuel consuming system.

Fuel Consuming System Not Limitive

The present invention in some preferred embodiments may be applied to a wide variety of fuel consuming systems, such as automobiles, busses, trucks, motorcycles, boats, personal water craft, planes, snowmobiles, lawnmowers (and related farm/garden systems, generators, etc. However, the particular type of fuel consuming system is not limited by the scope of the present invention. Therefore, the term "fuel consuming system" should be given its broadest possible interpretation in this context.

"Full" Fuel Tank Not Limitive

The present invention in many preferred exemplary embodiments attempts to standardize the amount of fuel within a fuel tank within the context of a fuel consuming system. Within this context, a standardized "full" fuel tank level is optimally the target of the system. However, the exact definition of what constitutes "full" may vary widely based on the specific application of the invention system/method.

For example, within some contexts it will be sufficient to fill the fuel tank with a known quantity of fuel that may or may not be the absolute or even rated capacity of the fuel tank. Some circumstances may dictate limiting the fuel within the fuel tank to enhance overall fuel economy by reducing overall vehicle weight. In many cases the absolute value of a "full" tank is not as important as the fact that the same fuel level is consistently placed within the fuel tank in a given context. Therefore, the term "full" should be given its broadest possible interpretation within the context of the present invention disclosure, with an emphasis being placed on situations where the meaning of "full" is defined and standardized within the context of the application. Thus, within some application contexts, "full" may mean any standardized volume level of fuel that meets the particular needs of the vehicle fuel management system.

Rental/Lease Vehicle Not Limitive

The present invention in some preferred embodiments may be applied to situations in which fuel a rental/lease vehicle is accounted for and/or dispensed by a fuel management system/method as detailed herein. However the particular type of rental/lease vehicle is not limited by the scope of the present invention. Therefore, the term "rental vehicle" "lease vehicle" or "rental/lease vehicle" should be broadly interpreted to include any "fuel consuming system" that is the subject of a rental and/or lease agreement.

Transponder Not Limitive

The present invention in some preferred embodiments may utilize a transponder to transmit fuel level sensor information to a fuel accounting system. The present invention makes no limitation on the form of this transponder, and it may take the form of a magnetic, radio-frequency, RFID, and/or other form of wireless transmission with no loss of generality in the overall invention scope. However, the present invention does specifically anticipate (and incorporates herein by reference) the utilization of the wireless technologies detailed in U.S. Pat. No. 5,025,486 (now expired) for WIRELESS COMMUNICATION SYSTEM WITH PARALLEL POLLING, issued on Jun. 18, 1991, to Kevin M. Klughart. This patent disclosure discloses both the use of 200 Khz and 300 Mhz low power transponder communication mechanisms. While this technology may be applicable to some embodiments of the present invention, other embodiments may use different transponder communication methodologies.

Identification and Security

The present invention may incorporate layers of identification and security within the context of the fuel level sensor and associated electronics to (among other things) verify the integrity of the fuel level sensor calibration data, prevent fraud, protect sensitive customer information, and in some cases streamline the processing of data from the fuel level sensor. While there are many methodologies to uniquely identify the fuel level sensor, one preferred methodology uses the Maxim Integrated Products, Inc. model DS2401 Silicon Serial Number integrated circuit as the identifying agent. In addition, the use of Maxim Integrated Products, Inc. 1-WIRE® brand memory products may be used to store calibration data, vehicle VIN information, customer information, etc. within the context of many preferred embodiments of the present invention.

General Invention System Architecture (0100)

The general system architecture of the present invention is generally illustrated in FIG. 1 (0100). In this exemplary architecture the system is illustrated as applied to servicing a fuel consuming system (0110) herein depicted as an automobile. This fuel consuming system (0110) is generally equipped with a fuel tank (0111) that may take a variety of forms. The present invention generally comprises a fuel level sensor (0101) that detects the amount of fuel present within the fuel tank (0111). This fuel level sensor (0101) communicates with a fuel level sensor transponder (0102) that converts the fuel level information to a wireless data stream (0107) that is relayed to a fuel accounting system (0103) running on a computer system under control of computer software retrieved from computer readable media (0105). A computer readable customer database (0106) maintains information on specific customers, their relationship to particular fuel consuming systems (0110), and information on fuel consumption retrieved from the fuel level sensor (0101) via the fuel level sensor transponder (0102). Some preferred exemplary embodiments implement a fuel dispenser system (0104) that determines how much fuel is required to "fill" the fuel tank (0111) by retrieving fuel tank (0111) level information from the fuel sensor (0101) and/or fuel accounting system (0103) and then replacing this exact amount of fuel in the fuel tank (0111).

General Invention Method Architecture (0200)

Figure 2:
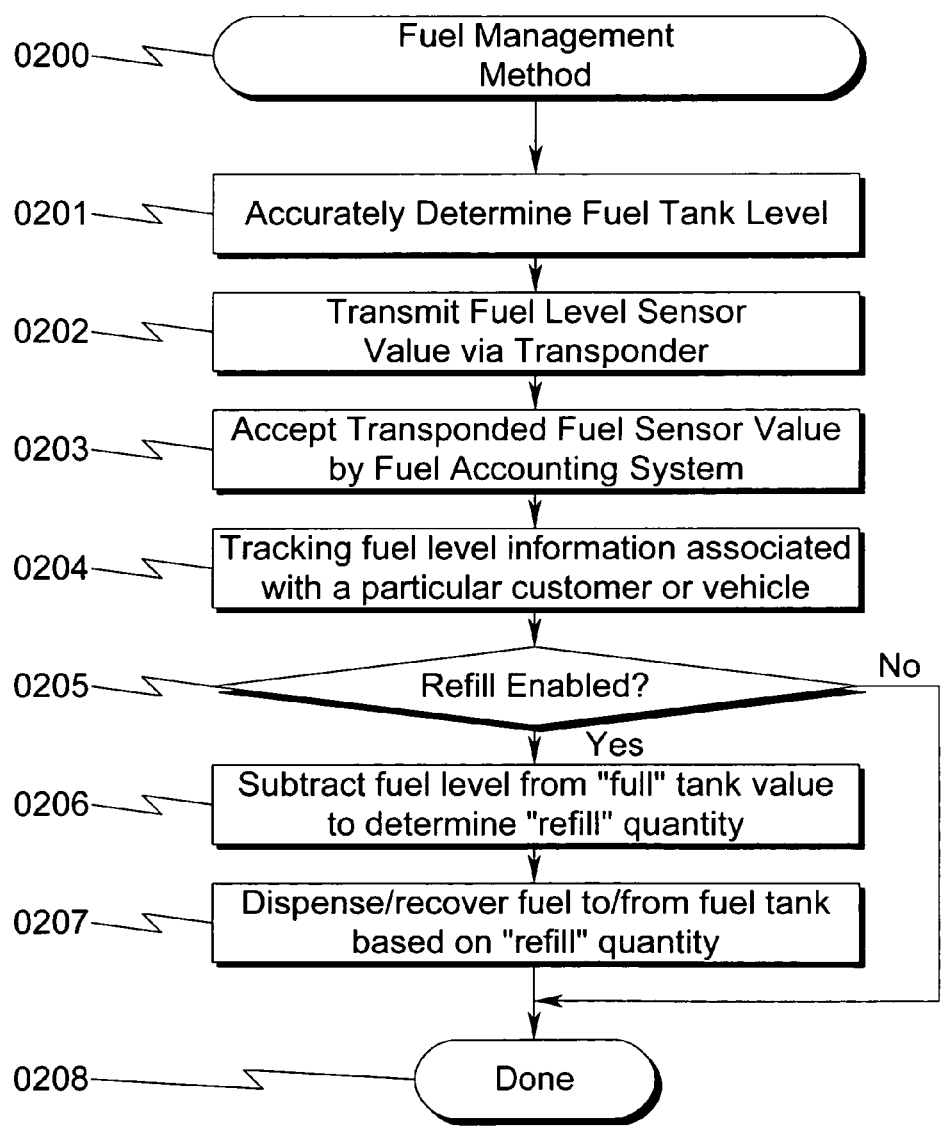
FIG. 2 illustrates a generalized method flowchart of a preferred exemplary embodiment of the present invention.

The general method architecture of the present invention is generally illustrated in FIG. 2 (0200). In this exemplary architecture the method is illustrated as applied to servicing a fuel consuming system. The method steps generally comprise the following:
Accurately sensing the level of fuel in a fuel tank (0201);
Transmitting this fuel level information via a fuel level sensor transponder (0202);
Receiving the fuel level information in a fuel accounting system (0203);
Tracking the fuel level information associated with a given customer or vehicle in a customer database (0204);
Determining if fuel tank refilling is enabled, and if not, proceeding to step (8) (0205);
Subtracting the measured fuel level from a "full" tank value to determine the fuel tank "refill" quantity (0206);
Refilling/unfilling the fuel tank using a fuel dispenser system that is controlled by the fuel accounting system based on the difference between the measured fuel tank level and a predetermined "full" fuel tank level (0207);
Terminating the fuel accounting cycle (0208).

One skilled in the art will recognize that these method steps may be augmented or rearranged without limiting the teachings of the present invention.

This fuel management method has several advantages over the prior art. Specifically, the accurate measurement of fuel tank contents permits accurate accounting as to the amount of fuel that the customer must pay for and which is below the predetermined "full" fuel tank level. Additionally, if an automated fuel dispenser is utilized as in steps (6) and (7), only the required amount of fuel necessary to reach the predetermined "full" fuel tank level is added/removed to the tank to complete the refill operation.

This is in contrast to traditional refueling operations in which employees manually determine when the fuel tank is full (typically via a fuel pump dispenser shutoff trigger). This methodology can be untrustworthy, as it may depend on variables such as fuel flow rates, operator inconsistencies, and other factors that cannot be easily standardized.

Fuel Level Sensor System (0300)

One key element of the present is the use of a fuel level sensor that permits accurate determination of the fuel level within a fuel tank. Instead of utilizing the conventional fuel level sensors typically installed on fuel tanks, the present invention opts in some preferred embodiments for an alternate system that permits much more accurate determination of the exact amount of fuel within a fuel tank.

To accomplish this feature, the present invention utilizes in many preferred embodiments an ultrasonic fuel level sensor system. This system in its best mode embodiment utilizes a modified fuel tank filling cap ("gas cap") that incorporates an ultrasonic source and detector that permit accurate determination of the fuel level within the fuel tank.

Referencing FIG. 3 (0300), the general fuel level sensor utilizes an ultrasonic source (0301) to flood the fuel tank (0310) with ultrasonic energy with a fixed and determinate wavefront (0302). Depending on the fuel level (0311, 0312) in the tank, the return time associated with the echoed ultrasonic energy (0304) will vary, sometimes in a nonlinear fashion. An ultrasonic detector (0303) captures this return delay time to determine the fuel level (0313, 0314) currently present in the fuel tank (0310).

Fuel Level Sensor Method (0400)

Figure 4:
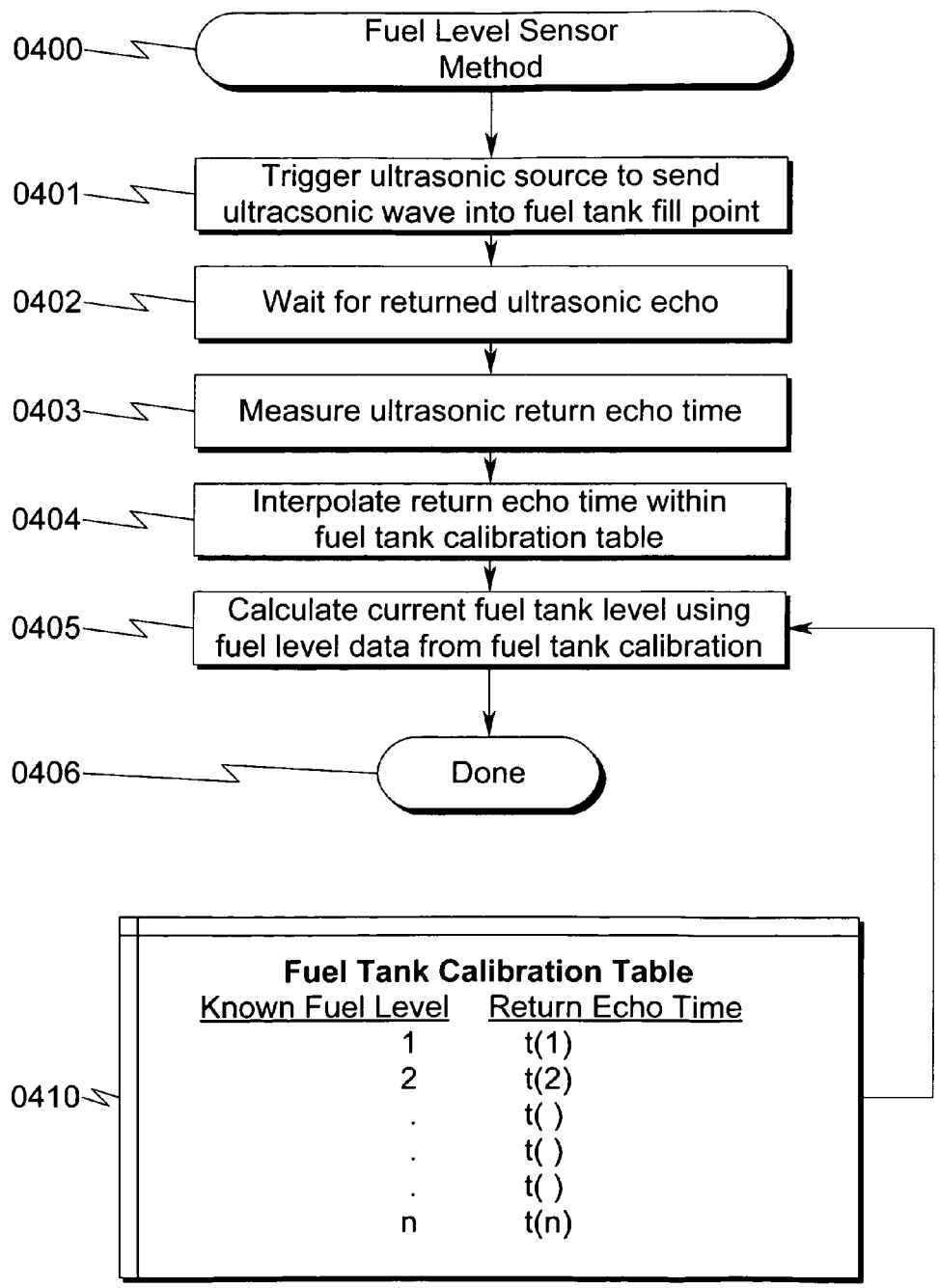
FIG. 4 illustrates a generalized method overview of a preferred exemplary embodiment of an ultrasonic fuel level sensor method useful in some preferred embodiments of the present invention.

The fuel level sensor system described above has an associated method architecture as generally illustrated in FIG. 4 (0400). The method steps generally comprise the following:
Activating an ultrasonic source to send an ultrasonic energy wave into the fuel tank fill point (0401);
Waiting for a returned ultrasonic echo, as the ultrasonic energy wave impinges the surface of the fuel within the fuel tank and is reflected back to the fuel tank fill point (0402);

Measuring the ultrasonic return echo time (0403);
Interpolating the return echo time within data contained within a fuel tank calibration table (0404);
Calculating the current fuel tank level using fuel tank level data (0410) from a prior fuel tank calibration (0405).

One skilled in the art will recognize that these method steps may be augmented or rearranged without limiting the teachings of the present invention.

It should be noted that the fuel tank level data (0410) obtained from a prior fuel tank calibration procedure generally includes paired data points including a known fuel tank level and the corresponding return echo time. Given the nonlinear nature of the ultrasonic echo waveforms, this table may be highly nonlinear and in some circumstances require the use of ultrasonic harmonics (added as a third vector in the calibration table) to accurately determine the fuel level within the fuel tank. The calculation of an accurate fuel tank level may require the use of a nonlinear fitting function to be applied to the calibration data (0410), and thus step (5) may require application of a nonlinear interpolation function. Nonlinear interpolation utilizing calibration datasets such as those illustrated in FIG. 4 (0410) are well known to those skilled in the mathematical arts.

Fuel Level Sensor Calibration System (0500)

Figure 5:
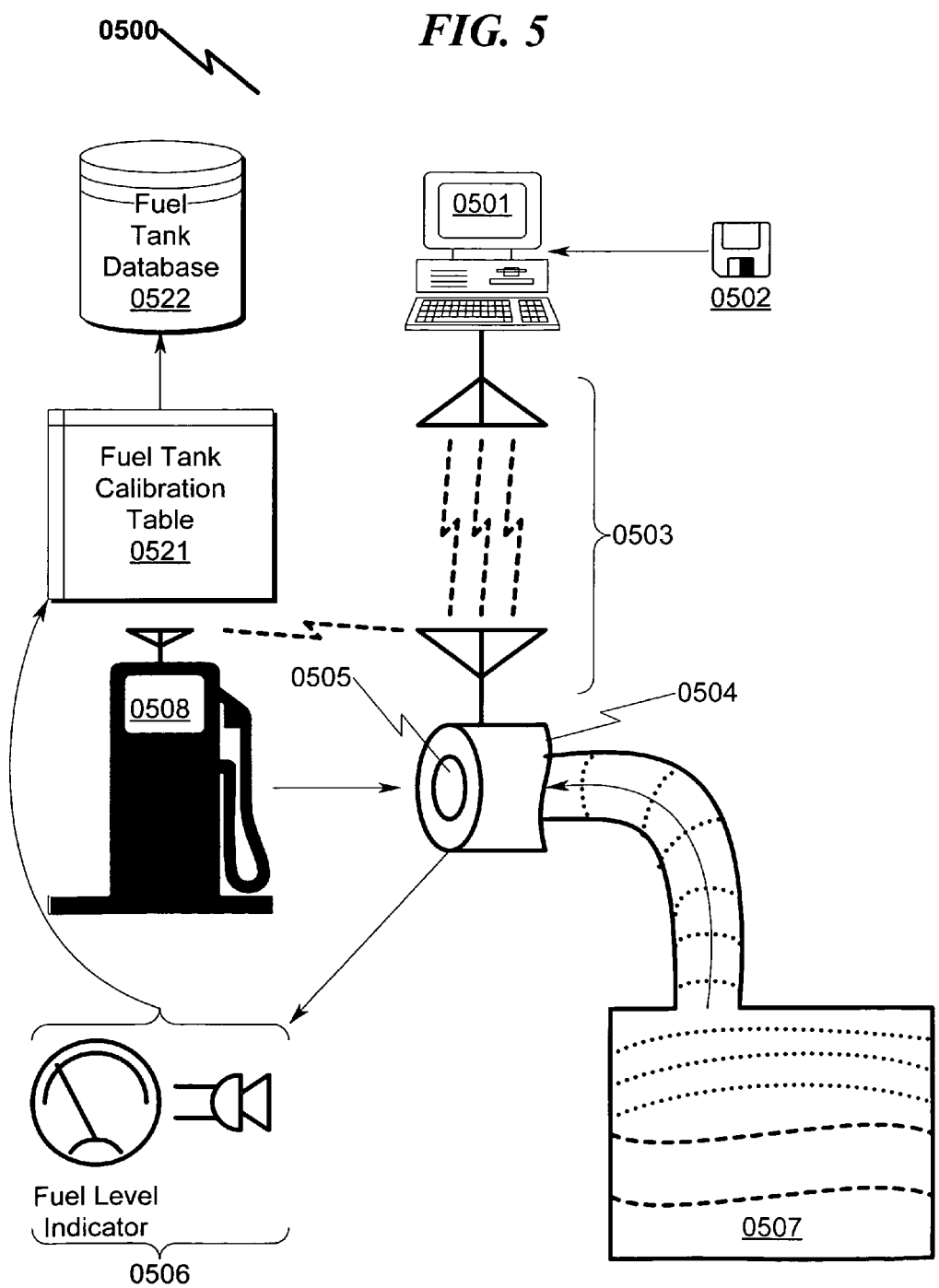
FIG. 5 illustrates a generalized system overview of a preferred exemplary embodiment of an ultrasonic fuel level sensor calibration system useful in some preferred embodiments of the present invention.

The present invention in some preferred exemplary embodiments may incorporate an automated fuel level sensor calibration system as generally depicted in FIG. 5 (0500). Since one goal of some embodiments of the invention is to provide accurate determination of fuel tank contents, some preferred embodiments utilize ultrasonic sensing of the fuel tank contents. Since the fuel tanks on which the invention may be used may vary considerably, the use of a fuel filler cap sensor for fuel tank level sensing is not a solution that can be generally applied to a wide variety of fuel tanks, unless some methodology is provided to individually calibrate the fuel level sensor to a given fuel tank. The system generally illustrated in FIG. 5 (0500) provides for this functionality.

The system (0500) generally comprises a computer system (0501) running software read from computer readable medium (0502) that communicates wirelessly (0503) to a fuel tank filler cap embodiment (0504) of a fuel sensor having a resealable hole (0505) into which a fuel dispensing hose can be placed. The fuel tank filler cap embodiment of the fuel sensor (0506) is preferably an ultrasonic sensor type as previously discussed. The fuel dispenser (0508) is preferably automated in this context, in that it receives commands from the fuel tank filler cap embodiment (0504) to dispense a known amount of fuel into the fuel tank (0507), after which the fuel tank sensor (0506) detects the fuel tank level based on the ultrasonic return echo time. This echo time is then loaded into a fuel tank calibration table (0521) that may be associated with a fuel tank database (0522). This information may be utilized by the fuel tank ultrasonic sensor (0506) and/or the computer system (0501) to calibrate the fuel tank sensor ultrasonic echo times to known fuel tank levels.

Several variants of this preferred embodiment are possible, including scenarios wherein the computer system drives the transfer of fuel from the fuel dispenser (0508) to the fuel tank (0507). Fuel sensor calibration data can be used by the computer system to determine fuel tank levels, or this information can be incorporated into the fuel tank sensor itself to report actual fuel tank contents rather than simply recording ultrasonic return echo times. In some sophisticated embodiments the raw data associated with the ultrasonic return echo may be reported back to the computer system (0501) for analysis and accurate determination of the fuel tank contents. Multiple ultrasonic frequencies, some including harmonics, may be utilized to provide a more accurate indicator of fuel tank contents in some circumstances.

Fuel Level Sensor Calibration Method (0600)

Figure 6:
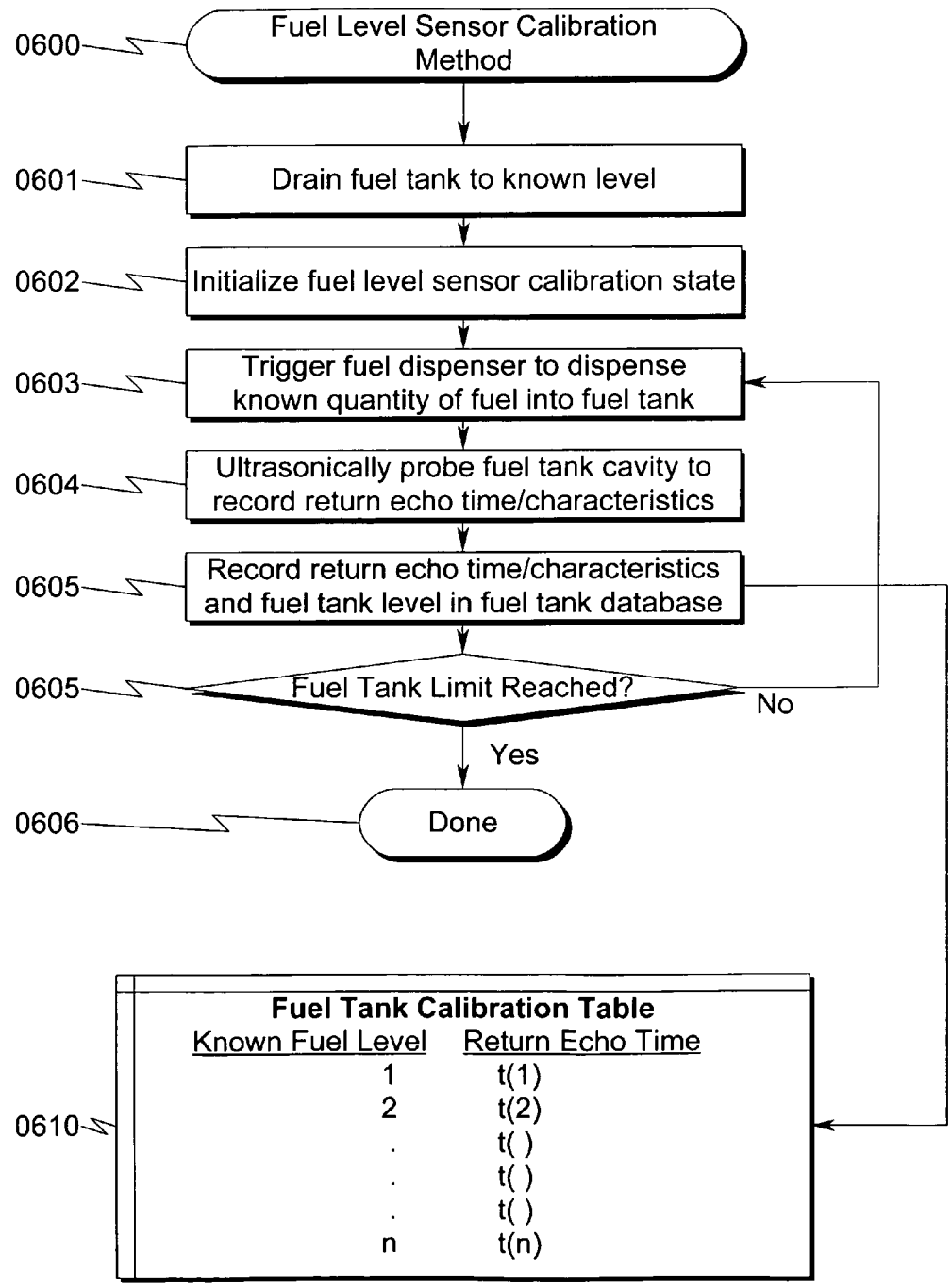
FIG. 6 illustrates a generalized method overview of a preferred exemplary embodiment of an ultrasonic fuel level sensor calibration method useful in some preferred embodiments of the present invention.

The fuel level sensor calibration system described above has an associated method architecture as generally illustrated in FIG. 6 (0600). The method steps generally comprise the following:
Draining the fuel tank to a known level (0601);
Initializing the fuel level sensor calibration state to indicate that the sensor is being calibrated to the fuel tank (0602);
Triggering a fuel dispenser to transfer a known quantity of fuel into the fuel tank (0603);
Ultrasonically probing the fuel tank cavity to record the return echo time and/or return echo characteristics associated with the current fuel level within the fuel tank (0604);
Recording the return echo time and/or return echo characteristics and fuel tank level in a fuel tank calibration database table (0610) for use later in determining the fuel level within the fuel tank (0605);
Determining if the fuel tank fill level has been reached, and if not, proceeding to step (3) (0605).

One skilled in the art will recognize that these method steps may be augmented or rearranged without limiting the teachings of the present invention.

It should be noted that the fuel tank level data (0610) generated by this fuel tank calibration procedure generally includes paired data points including a known fuel tank level and the corresponding return echo time. Given the nonlinear nature of the ultrasonic echo waveforms, this table may be highly nonlinear and in some circumstances require the use of ultrasonic harmonics (added as a third vector in the calibration table) to accurately determine the fuel level within the fuel tank. The calculation of an accurate fuel tank level may require the use of a nonlinear fitting function to be applied to the calibration data (0610). Nonlinear interpolation utilizing calibration datasets such as those illustrated in FIG. 6 (0610) are well known to those skilled in the mathematical arts.

Rental/Lease Fuel Management System (0700)

Figure 7:
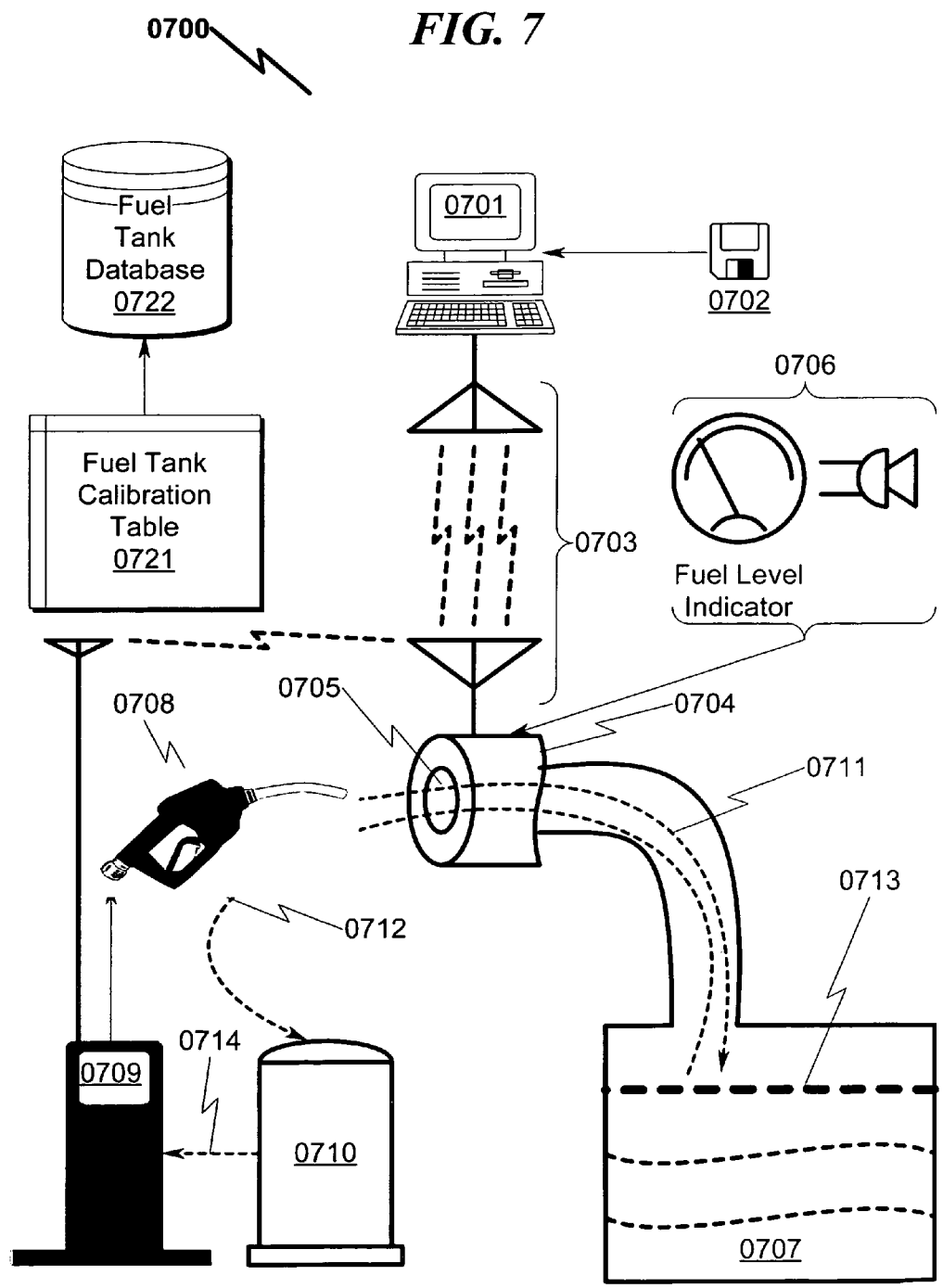
FIG. 7 illustrates a generalized system overview of preferred exemplary embodiment of the present invention as applied to a rental/lease fuel management system.

The present invention in some preferred exemplary embodiments may be advantageously applied to rental/lease fuel management system as generally illustrated in FIG. 7 (0700). While this system is primarily targeted towards rental/lease vehicle fuel management, the system can be applied to any situation in which a fuel consuming system is integrated with a fuel management system.

This particular preferred embodiment of the present invention is particularly well suited to situations in which rental/lease vehicles and the fuel that they consume are managed by an overall fuel management system. Of particular importance in these situations is the elimination of fuel waste at all points in the rental/lease management cycle. One methodology of fuel conservation is to prevent "overfilling" of the fuel tank, both at the rental/lease dispatch point and when the rental/lease vehicle is returned by the customer. This preferred exemplary embodiment achieves this goal by ensuring that the rental/lease vehicle is dispatched with a "full" tank of fuel and is returned to inventory with a "full" tank of fuel. The definition of a "full" tank of fuel may not be the absolute fuel tank capacity, but may be some other value that ensures minimal waste of fuel due to tank overfilling, spillage, etc.

This preferred exemplary system embodiment (0700) generally comprises a computer system (0701) running software read from computer readable medium (0702) that communicates wirelessly (0703) to a fuel tank filler cap embodiment (0704) of a fuel sensor having a resealable hole (0705) into which a fuel dispensing hose (0708) can be placed. The fuel tank filler cap embodiment of the fuel sensor (0706) is preferably an ultrasonic sensor type as previously discussed. The fuel dispenser (0708) is preferably automated in this context, in that it receives commands from the fuel tank filler cap embodiment (0704) to dispense a known amount of fuel into the fuel tank (0707), after which the fuel tank sensor (0706) detects the fuel tank level based on the ultrasonic return echo time. This echo time is then loaded into a fuel tank calibration table (0721) that may be associated with a fuel tank database (0722). This information may be utilized by the fuel tank ultrasonic sensor (0706) and/or the computer system (0701) to calibrate the fuel tank sensor ultrasonic echo times to known fuel tank levels.

Integrated into this system is the ability to both "fill" and "unfill" the fuel tank. The fuel dispensing hose (0708) may be configured to support dispensing of fuel from a fuel reservoir (0709) into (0711) the fuel tank (0707), so as to "fill" the fuel tank (0707) to the predetermined "full" level (0713). This situation is the one commonly occurring when the customer returns a rental/lease vehicle with a fuel tank that is not at the predetermined "full" level. The fuel dispensing hose (0708) fills the fuel tank (0707) to the predetermined "full" level (0713) as measured by the fuel level sensor system (0706) described previously. The fuel dispensing hose (0708) generally receives fuel from a fuel reservoir/pump (0709) system under control of either the computer' system (0701) and/or the fuel level sensor electronics (0706). In optimal configurations, the control of the fuel reservoir/pump (0709) system is wireless.

In addition to guaranteeing a "full" tank upon restocking of the rental/lease vehicle into inventory after return by the customer, the system as depicted may also remove fuel from the fuel tank (0707) via a suction siphoning tube associated with the fuel dispensing hose (0708) to permit recovery of fuel within the fuel tank that is above the nominal "full" fuel level (0713). This removal of fuel (0712) by the fuel dispensing hose enables recovery of excess fuel tank (0707) contents and storage of same within a fuel storage reservoir (0710) for application to other rental/lease vehicles (0714) (after appropriate filtering if necessary). The removal of excess fuel above the "full" fuel level (0713) within the fuel tank (0707) ensures that fuel is not wasted by spillage from the fuel tank or other mechanisms of fuel loss associated with "overfull" fuel tanks. This recovery of excess fuel tank storage also improves the environment by eliminating excess evaporation of fuel tank contents to the atmosphere.

As part of the fuel level sensor calibration procedure, the capability to remove fuel from the fuel tank also permits full calibration of the fuel level sensor by removing in some circumstances all of the fuel from the fuel tank, and then subsequently adding fuel at a known rate or incremental quantity and then calibrating the fuel level sensor at each known fuel tank storage level.

Several variants of this preferred embodiment are possible, including scenarios wherein the computer system drives the transfer of fuel from the fuel dispenser (0708) to the fuel tank (0707). Fuel sensor calibration data can be used by the computer system to determine fuel tank levels, or this information can be incorporated into the fuel tank sensor itself to report actual fuel tank contents rather than simply recording ultrasonic return echo times. In some sophisticated embodiments the raw data associated with the ultrasonic return echo may be reported back to the computer system (0701) for analysis and accurate determination of the fuel tank contents. Multiple ultrasonic frequencies, some including harmonics, may be utilized to provide a more accurate indicator of fuel tank contents in some circumstances.

Rental/Lease Fuel Management Method (0800)

Figure 8:
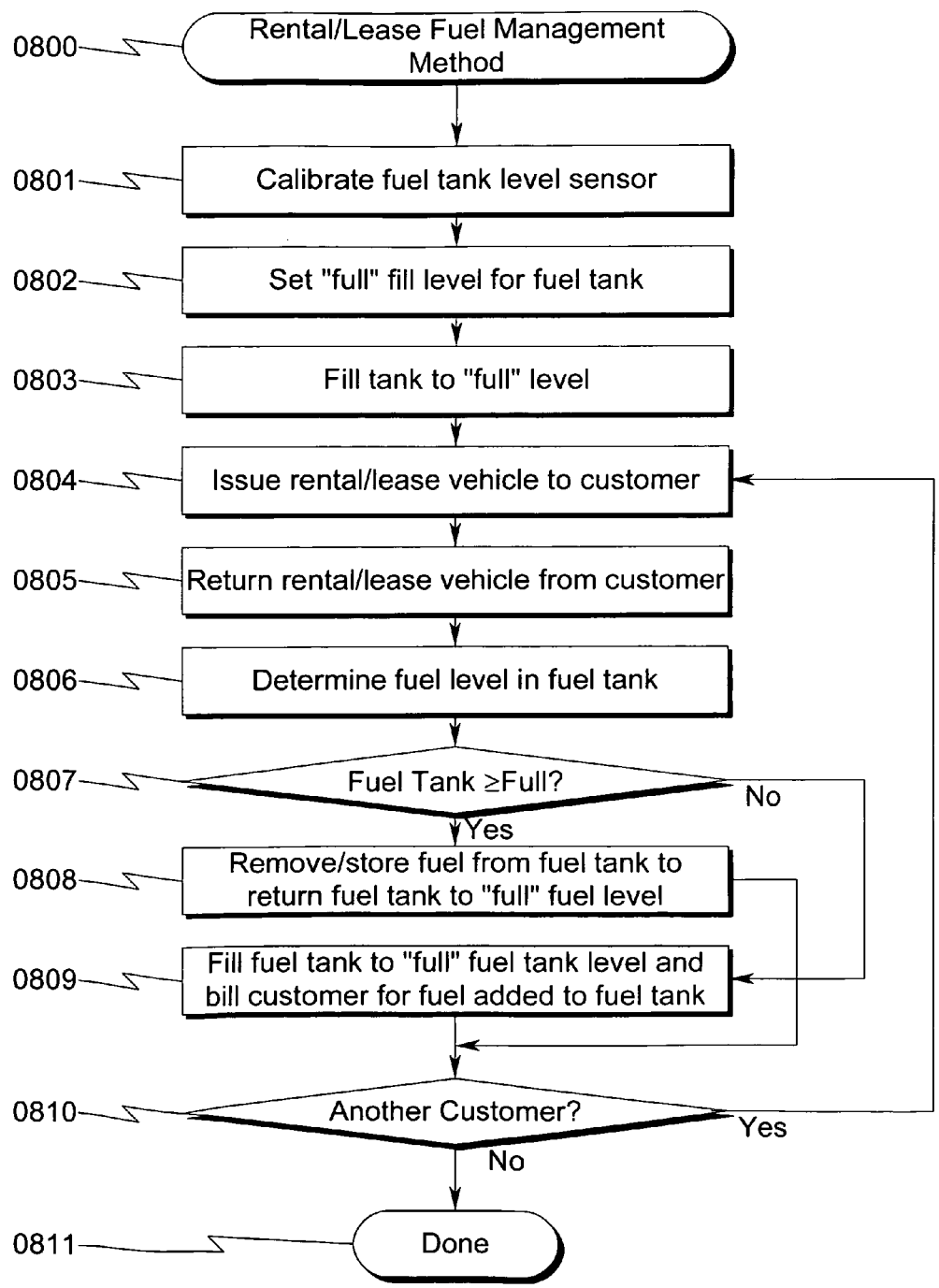
FIG. 8 illustrates a generalized method overview of preferred exemplary embodiment of the present invention as applied to a rental/lease fuel management method.

The rental/lease fuel management system described above has an associated method architecture as generally illustrated in FIG. 8 (0800). The method steps generally comprise the following:

Calibrating the fuel tank level sensor to the specific fuel tank on the rental/lease vehicle (0801);
Setting a "full" level for the fuel tank (0802);
Filling the fuel tank to the "full" level (0803);
Issuing the rental/lease vehicle to the customer (0804);
Returning the rental/lease vehicle from the customer (0805);
Accurately measuring the fuel level in the fuel tank (0806);
If the fuel tank is less than full, proceeding to step (9) (0807);
Removing and/or storing sufficient fuel from the fuel tank to return the fuel tank to a "full" fuel level and proceeding to step (10) (0808);
Filling the fuel tank to a "full" fuel level and billing the customer for fuel added to the fuel tank (0809);
Determining if there are other rental/lease customers to be serviced by the rental/lease vehicle, and if so, proceeding to step (4) (0810);
Terminating the rental/lease fuel management method (0811).

One skilled in the art will recognize that these method steps may be augmented or rearranged without limiting the teachings of the present invention.

It should be noted that the fuel tank level data (0410, 0610) generated by this fuel tank calibration procedure generally includes paired data points including a known fuel tank level and the corresponding return echo time. Given the nonlinear nature of the ultrasonic echo waveforms, this table may be highly nonlinear and in some circumstances require the use of ultrasonic harmonics (added as a third vector in the calibration table) to accurately determine the fuel level within the fuel tank. The calculation of an accurate fuel tank level may require the use of a nonlinear fitting function to be applied to the calibration data (0410, 0610). Nonlinear interpolation utilizing calibration datasets such as those illustrated in FIG. 4 (0410) and FIG. 6 (0610) are well known to those skilled in the mathematical arts.

Fuel Tank Fuel Management Cycle Method (0900)

Figure 9:
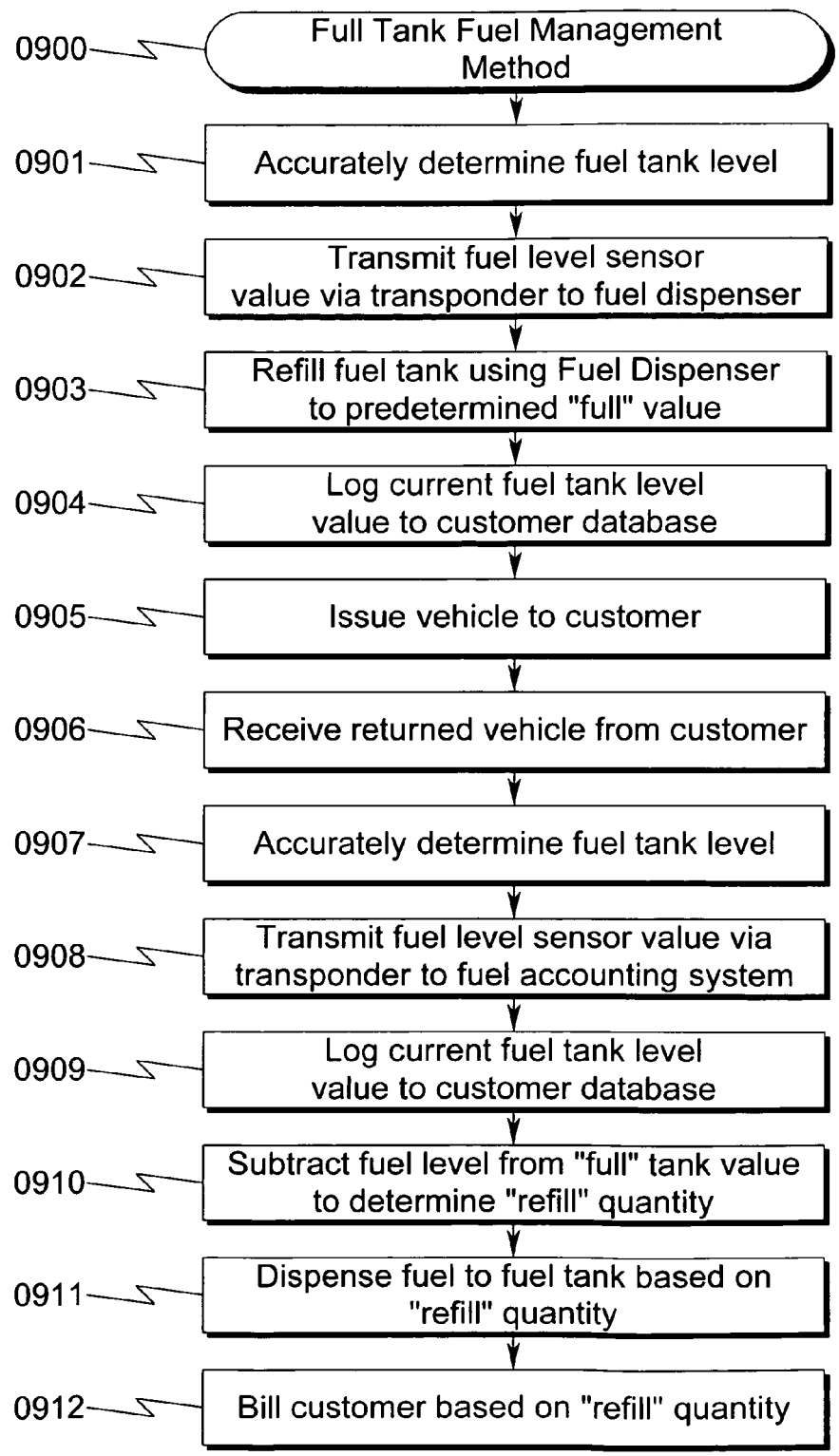
FIG. 9 illustrates a generalized method overview of a fuel tank fuel management method useful in some preferred embodiments of the present invention.

The present invention anticipates a wide variety of fuel management cycles will be appropriate for use with the present invention in addition to the ones previous described in FIG. 2 (0200), FIG. 4 (0400), FIG. 6 (0600), and FIG. 8 (0800). Several of these have application to vehicle rental/lease scenarios, and many will utilize elements of the previously described methods. One preferred fuel tank management cycle method is generally illustrated in FIG. 9 (0900) and comprises the following steps:

Accurately determining the fuel tank level (0901);
Transmitting the fuel level sensor value via a transponder to a fuel dispenser (0902);
Refilling the fuel tank using the fuel dispenser to a predetermined "full" level (0903);

Logging the current fuel tank level value to a customer database (0904);

Issuing the rental/lease vehicle to the customer (0905);

Receiving the returned rental/lease vehicle from the customer into the rental/lease vehicle intake system (0906);

Accurately determining the fuel tank level in the rental/lease vehicle (0907);

Transmitting the fuel level sensor value via transponder to the fuel accounting system (0908);

Logging the current fuel tank level value to the customer database (0909);

Subtracting the measured fuel tank fuel level from a predetermined "full" fuel tank value to determine a "refill" quantity (0910);

Dispensing fuel to the fuel tank based on the "refill" quantity (0911);

Billing the rental/lease customer based on the "refill" fuel quantity (0912).

One skilled in the art will recognize that these method steps may be augmented or rearranged without limiting the teachings of the present invention.

Ultrasonic Fuel Level Sensor (1000)

Figure 10:
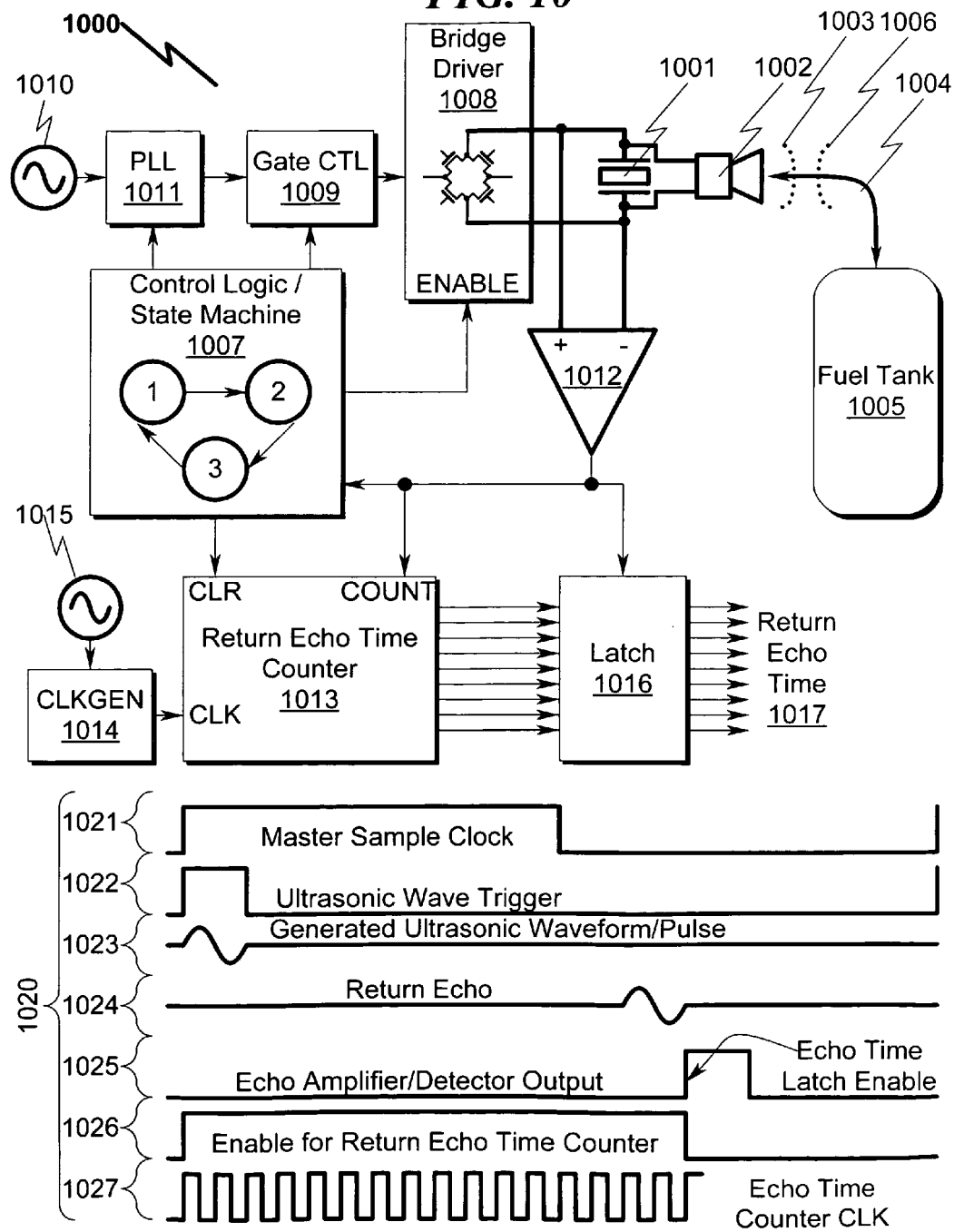
FIG. 10 illustrates a system block diagram of a preferred exemplary embodiment of an ultrasonic fuel level sensor system useful in some preferred embodiments of the present invention.

Many preferred exemplary embodiments of the present invention utilize an ultrasonic fuel level sensor to accurately determine the fuel level within the fuel tank. A system block diagram of the general architecture of one preferred exemplary embodiment of this sensor is illustrated in FIG. 10 (1000). This system utilizes an ultrasonic (typically piezoelectric) transducer (1001) with associated ultrasonic waveguide (1002) to focus ultrasonic energy/pulses (1003) for transmission (1004) into a fuel tank (1005). Return echo waveforms (1006) are returned for focusing by an ultrasonic waveguide (1002) and detection by the ultrasonic transducer (1001). Note this embodiment optimally utilizes a single piezoelectric transducer (1001) and waveguide (1002) for the generation and detection of the ultrasonic waves. Other embodiments may utilize separate transducers for generation and detection and/or separate waveguides for channeling of the ultrasonic energy.

The gist of the system as depicted is to measure the fuel tank level by impinging ultrasonic energy down the fuel tank filler tube and detect the return time associated with the echoed ultrasonic wave. The shorter the echo time, the fuller the tank level. Note also that due to the highly nonlinear characteristics of the fuel tank resonance structures, the returned waveform may incorporate other characteristics other than echo time that can be used to more accurately determine the fuel tank level. Therefore, in some circumstances a spectral analysis of the returned echo may be necessary to more fully determine the fuel tank level by matching the returned echo to a known set of echo patterns stored in a calibration database.

To support the generation of the ultrasonic waveforms and the detection of the return echo times, a control logic state machine (1007) operates to gate excitation of the ultrasonic transducer (1001) via use of a bridge driver (1008) that takes its stimulus from a clock gating circuit (1009). The clock gating circuit (1009) simply provides stimulus to the bridge driver (1008) in response to an oscillator (1010) and/or phase locked loop (1011) that generates the desired ultrasonic transducer (1001) stimulus. Note that the control logic (1007) can operate to change the characteristics of the phase locked loop (1011) and/or gate control (1009) circuitry to modify the ultrasonic waveform used to affect the fuel tank (1005) fuel level detection.

After the control logic/state machine (1007) initiates an ultrasonic waveform or pulse to probe the fuel tank (1005), the bridge driver (1008) goes inactive, and a sensing amplifier (1012) utilizes the ultrasonic transducer (1001) to sense the return echo from the fuel tank (1005). During this time a return echo time counter (1013) has been activated by the control logic/state machine (1007) to begin counting clock cycles from a clock generator (1014) and/or oscillator (1015). The period of the clock generator (1014) and/or oscillator (1015) is typically very short in comparison to the ultrasonic source period to permit accurate determination of the return echo time. Once the return echo is detected, the return echo time counter (1013) output is saved in a latch (1016) for use as the returned echo time (1017).

The returned echo time (1017) is then used within the fuel sensor calibration table to determine the exact amount of fuel within the fuel tank (1005) by interpolating between points of known fuel tank contents and their associated return echo times that have been saved as a result of a previous calibration procedure. The beauty in this approach is that a generic ultrasonic transducer (1001) can be utilized with a wide variety of fuel tanks (1005) and environments and be individually calibrated to the fuel tank such that variances in construction, components, etc. can be compensated for without any human intervention. For example, if in some preferred exemplary embodiments the ultrasonic transducer (1001) is incorporated into a fuel tank filler cap ("gas cap"), a single physical embodiment of this filler cap may operate on a wide variety of vehicles from a given manufacturer, even though the fuel tanks and associated capacities of these tanks may vary widely within the range of models supplied by the vehicle manufacturer.

Referencing FIG. 10 (1000), an exemplary timing diagram (1020) associated with some preferred exemplary embodiments of the circuitry shown in FIG. 10 is illustrated. Generally speaking, the state machine (1007) is run by a sample clock (1021), off of which an ultrasonic wave trigger (UWT) (1022) is generated. This UWT signal (1022) is used to gate the bridge driver (1008) to generate an ultrasonic wave/pulse (1023) that is emitted by the ultrasonic transducer (1001) into the fuel tank (1005). The return echo signal (1024) is then detected by the amplifier/detector (1012) to produce an echo detection signal (1025). This echo detection signal (1025) is used to terminate the counter enable (1026) for the return echo time counter (1013) that was counting timer clocks (1027) during its enable period. The echo detection signal (1025) is also utilized to latch the return echo time counter (1013) value into the storage latch (1016) for use as the return echo time value (1017).

One skilled in the art will recognize that the circuitry depicted in FIG. 10 (1000) may be easily incorporated into one or more application specific integrated circuits (ASICs) and/or incorporated within many conventional integrated microcontrollers (with appropriate embedded software) and/or FPGAs. The present invention makes no limitation on the particular hardware utilized to achieve the functionality associated with the ultrasonic fuel level sensor embodiments.

Ultrasonic Fuel Sensor Integrated Float Embodiment (1100)

While the present invention can be embodied in many preferred embodiments, some of these preferred embodiments incorporate a fuel cap fuel tank level sensor, and a subset of these preferred embodiments utilize an ultrasonic fuel level sensor in this context. Within this subset of preferred embodiments, FIG. 11 (1100) illustrates what is thought to be a best mode implementation of part of this fuel sensor architecture.

Figure 11:
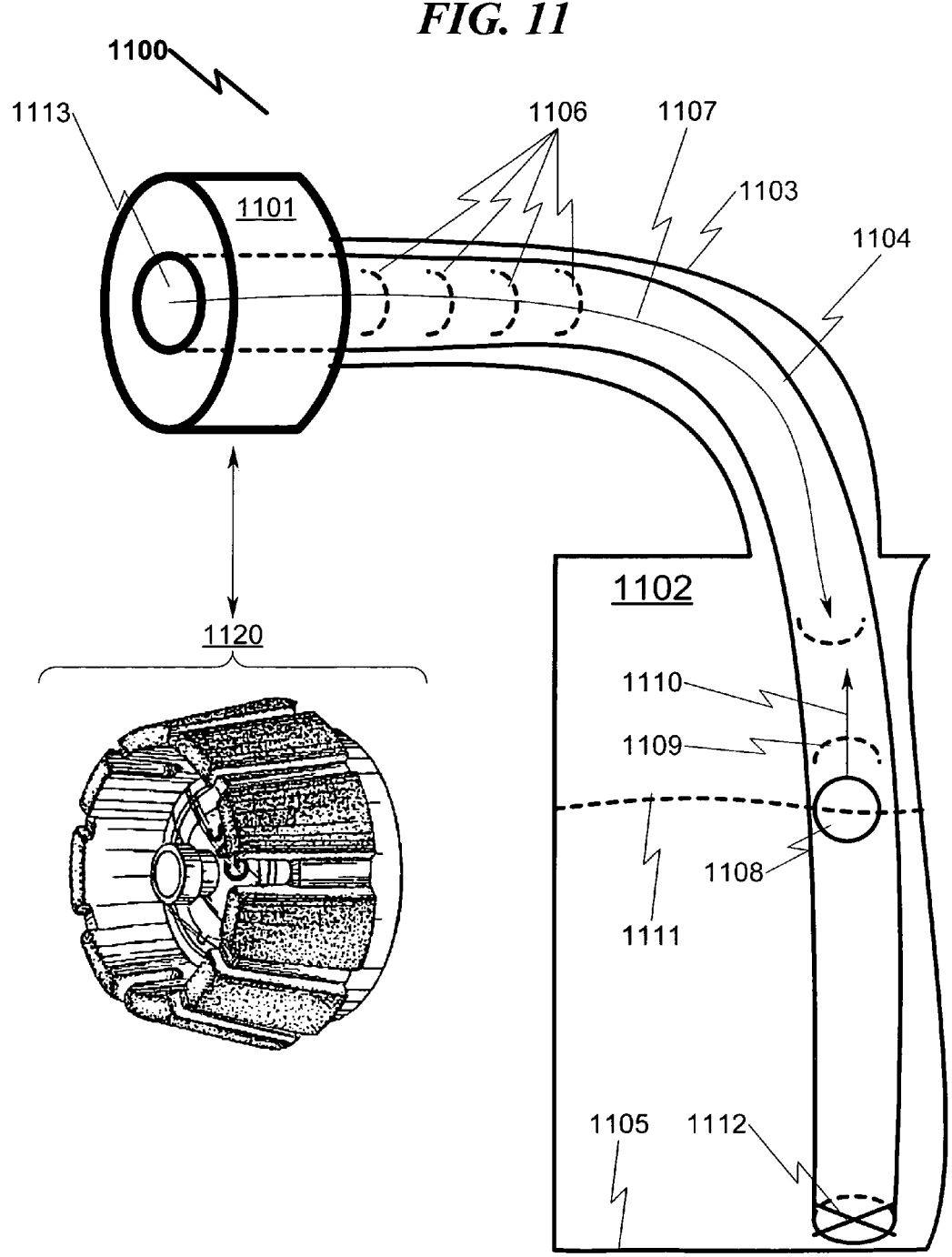
FIG. 11 illustrates a preferred exemplary embodiment of the present invention utilizing a modified fuel tank sensor tube and float ball to enhance fuel tank fuel level sensing in some preferred embodiments of the present invention.

Referencing FIG. 11 (1100), the fuel cap (1101) incorporating the electronics for the ultrasonic fuel sensor system is fixed to a fuel tank (1102) by virtue of a fuel tank filling tube (1103). Connected to the fuel cap (1101) is a sensor tube (1104) that extends from the filling cap (1101) to the bottom (1105) of the fuel tank (1102). This sensor tube (1104) permits ultrasonic waves/pulses (1106) to traverse (1107) the sensor tube (1104) until they impinge on a float ball (1108) at which point they are reflected (1109) back (1110) to the fuel cap (1101) for detection by the fuel level sensor electronics. The float ball (1108) position within the sensor tube (1104) is dictated by the precise fuel level (1111) within the fuel tank (1102). The end of the sensor tube (1104) may be screened (1112) to ensure proper retention of the float ball (1108) within the sensor tube (1104). The float ball (1108) may be constructed of any material that has a specific gravity less than that of the fuel within the fuel tank (1102), but the best known mode for construction would utilize plastic, optimally with a hollow interior.

The sensor tube (1104) in this context permits fuel to be removed from the fuel tank (1102) during both fuel tank level sensor calibration and/or fuel tank level standardization (removal of excess fuel tank fuel) upon return of rental/lease vehicles by the customer. A resealable fuel entrypoint (1113) at the distal end of the fuel cap (1101) permits access to the sensor tube (1104) for this purpose. This resealable fuel entrypoint (1113) can take many forms, with plastic being the preferable construction material. Molded plastic caps, including variants of fuel tank caps (as illustrated by example (1120) extracted from U.S. Pat. No. D294,820 (Mar. 22, 1988)), are well known in the art and thus one of ordinary skill in the art would be able to fabricate this in any suitable form based on the context of application for the invention.

Figure 12:
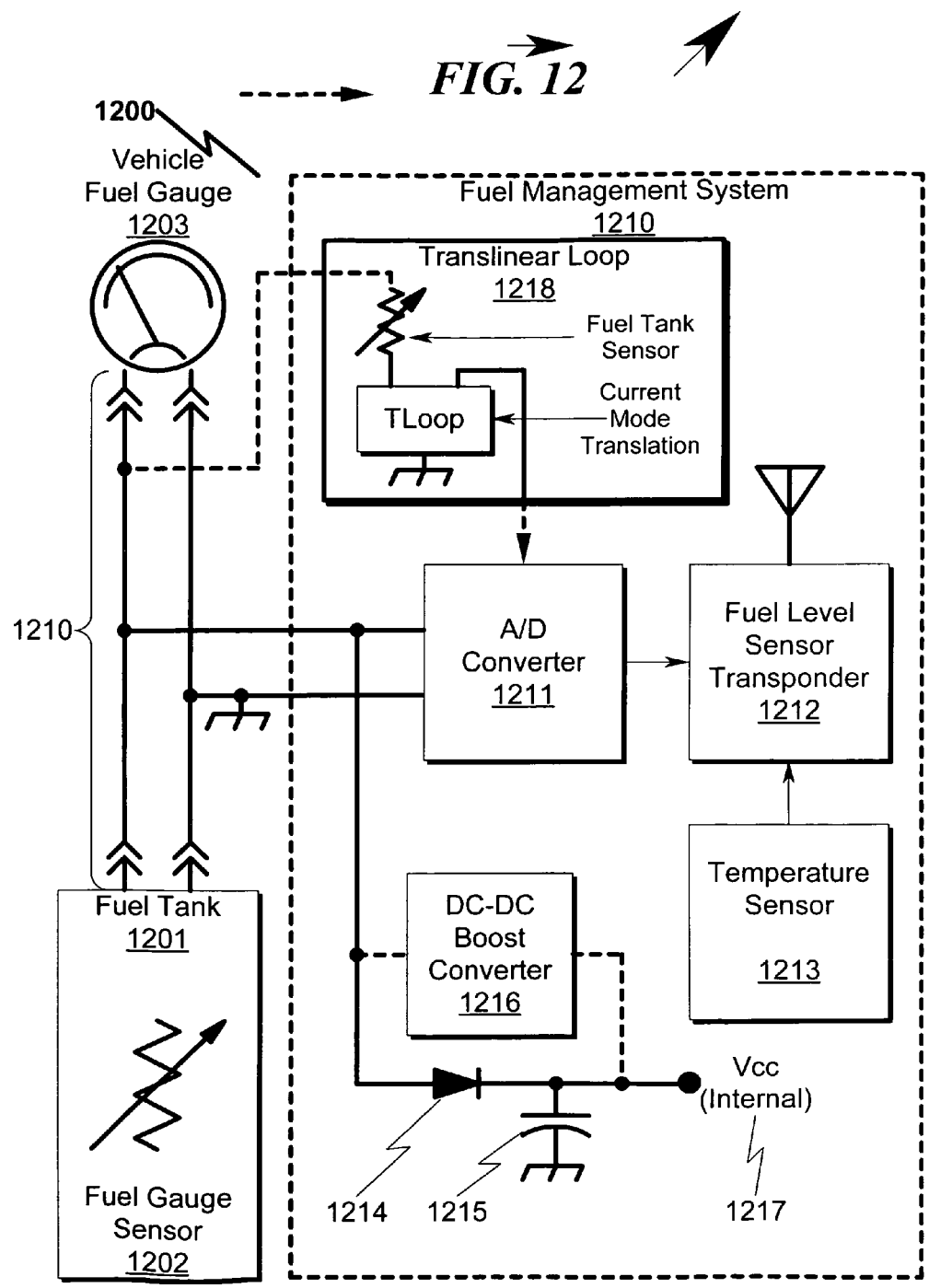
FIG. 12 illustrates a preferred exemplary embodiment of the present invention utilizing an existing inline fuel tank fuel gauge sensor as the fuel level sensing element for some preferred embodiments of the present invention.

Note that while the sensor tube may be advantageously used with a variety of fuel level sensors, including ultrasonic embodiments, it is equally well adapted for use with situations in which existing fuel tank fuel level sensors are augmented with inline fuel level sensor measurement subsystems as detailed in FIG. 12 (1200) and describe below.

Inline Fuel Level Sensor System Embodiment (1200)

While the present invention anticipates many forms of fuel level sensor implementation, the preferred embodiments generally utilize ultrasonic fuel level sensing methodologies as detailed herein. However, in some circumstances the present invention can be optimally implemented by effectively utilizing the existing fuel level sensor that resides within the fuel tank of the vehicle. These fuel sensors generally comprise a resistor/potentiometer whose resistance varies based on the fuel level within the fuel tank. As generally illustrated in FIG. 12 (1200), in these configurations the fuel tank (1201) typically incorporates a fuel gauge sensor (1202) that produces a voltage (or equivalently a resistance) based on the level of fuel within the fuel tank (1201). This fuel level sensor (1202) is generally connected to a vehicle fuel gauge (1203) (or an electronic equivalent) via a cable harness with appropriate electrical connectors. Note that in some embodiments the fuel gauge sensor (1202) may take the form of some other type of sensor (pressure, etc.) that describes the level of fuel within a fuel tank system, and thus the illustration of the fuel gauge sensor (1202) should be given its broadest possible interpretation in this context.

The present invention in some preferred embodiments can utilize this sensor with a high level of accuracy to determine the exact level of fuel within the fuel tank (1201). To implement this system a signal tapping cable harness (1210) is inserted into the normal connector flow between the fuel gauge sensor (1202) and the vehicle fuel gauge (1203). This jumper harness permits the signal levels emitted by the fuel gauge sensor (1202) to be intercepted by an analog-to-digital (A/D) converter (1211) that is part of the fuel management system. The digitized data from the A/D converter (1211) is fed into the fuel level sensor transponder (1212) for wireless transmission to the fuel accounting system as previously described.

Within the context of the inline fuel level sensor retrofit there exists the option of incorporating parasitic power operation of the fuel sensor element to eliminate the need for internal batteries or external power supply support. This may be accomplished by utilizing a diode (1214) to parasitically charge a capacitor (1215) using a small portion of the current that would normally flow through the fuel tank fuel sensor potentiometer (1202). This small current requirement is then held in reserve (as Vcc internal power (1217)) for the electronics of the fuel level sensor measurement subsystem (1210) to operate the A/D converter (1211) and associated wireless transponder (1212). In some preferred embodiments, the diode (1214) and capacitor (1215) may be replaced by a DC-to-DC boost converter (1216) to enable functioning of the system over a wide range of operating fuel sensor voltages. DC-to-DC boost converters are well known in the art and one skilled in the art will have a number of possible selections for this function block that are well documented in the prior art.

As an alternative to the voltage mode A/D converter (1211) configuration illustrated, the system may operate in a current-mode configuration utilizing a translinear loop (1218) that accepts current from the fuel sensor resistor (1201) and converts this to an internal current level that is then converted via a current-mode configured A/D converter (1211) to provide the necessary fuel tank level information in digital form. Translinear loops are well known in the art and can be configured to operate with the use of bipolar and/or MOSFET transistors in a variety of configurations, these configurations providing for both linear and non-linear transformation of the domain input current to a range output current.

The advantage to this parasitic power operation is that the fuel level sensor measurement subsystem (1210) can be installed proximal to the fuel tank and wirelessly interrogated as part of the overall fuel management system without the need for complex and costly retrofitting of any vehicle system or component. It is anticipated the optimal methodology to implement this wireless communication link is detailed within (and hereby incorporated by reference) U.S. Pat. No. 5,025,486 (now expired) for WIRELESS COMMUNICATION SYSTEM WITH PARALLEL POLLING, issued on Jun. 18, 1991, to Kevin M. Klughart. Within this context it is envisioned that a wireless UHF transmitter would in many preferred embodiments be an optimal methodology of implementing the transponder link from the fuel level sensor to the fuel accounting system.

As with the ultrasonic fuel level sensors previously discussed, the fuel gauge sensor (1202) in this case can be calibrated by evacuating the fuel tank and then filling the fuel tank with known quantities of fuel and then accurately recording the fuel gauge sensor (1202) output with the A/D converter (1211) and creating a calibration table for the fuel tank (1201)/fuel sensor (1202) combination. The use of individual calibration for each fuel tank (1201)/fuel sensor (1202) combination ensures highly accurate measurement of fuel tank (1201) fuel levels, even if the fuel gauge sensor (1202) is nonlinear, the fuel tank (1201) is irregularly shaped, or other environmental factors such as variances in fuel gauge sensor characteristics make it impossible to utilize standardized conversion tables to directly read the output of the fuel gauge sensor (1202).

As discussed elsewhere in this document, the use of a temperature sensor (1213) in conjunction with the fuel level sensor may be advantageously used in some preferred embodiments to compensate for fuel expansion in determining the actual fuel level within the fuel tank standardized to a known volumetric level and temperature.

Inline Fuel Level Sensor Calibration Method (1300)

Figure 13:
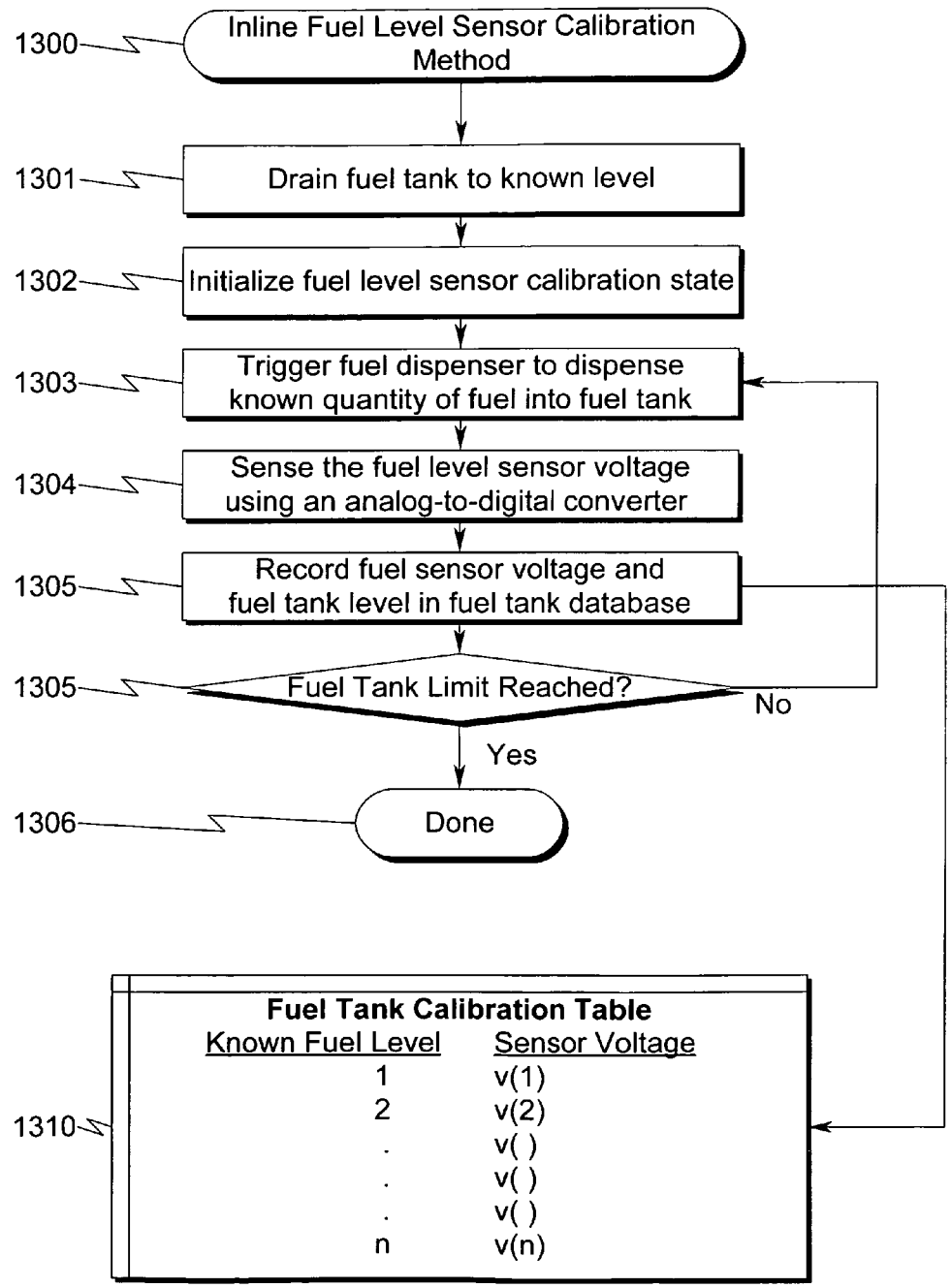
FIG. 13 illustrates a generalized method overview of a preferred exemplary embodiment of an inline fuel level sensor calibration method useful in some preferred embodiments of the present invention.

The inline fuel level sensor system described above has an associated method architecture as generally illustrated in FIG. 13 (1300). The method steps generally comprise the following:

Draining the fuel tank to a known level (1301);
Initializing the fuel level sensor calibration state to indicate that the sensor is being calibrated to the fuel tank (1302);
Triggering a fuel dispenser to transfer a known quantity of fuel into the fuel tank (1303);
Sensing the fuel level sensor voltage using an analog-to-digital converter (1304);
Recording the measured fuel level sensor voltage and fuel tank level in a fuel tank calibration database table (1310) for use later in determining the fuel level within the fuel tank (1305);
Determining if the fuel tank fill level has been reached, and if not, proceeding to step (3) (1305).

One skilled in the art will recognize that these method steps may be augmented or rearranged without limiting the teachings of the present invention.

It should be noted that the fuel tank level data (1310) generated by this fuel tank calibration procedure generally includes paired data points including a known fuel tank level and the corresponding measured sensor voltage. Given the nonlinear nature of the fuel sensor voltage, this table may be highly nonlinear. The calculation of an accurate fuel tank level may require the use of a nonlinear fitting function to be applied to the calibration data (1310). Nonlinear interpolation utilizing calibration datasets such as those illustrated in FIG. 13 (1310) are well known to those skilled in the mathematical arts.

While the source of calibration data may differ between the use of ultrasonic fuel level sensors and the analog fuel level sensors present in many vehicle fuel tanks, the overall calibration procedures with respect to the present invention system/method are the same, and provide sufficient accuracy, precision, and repeatability to ensure that accurate and precise fuel level measurements can be made to support the remaining aspects of the fuel management system/method described herein.

Low/Zero Power Fuel Sensor Embodiment (1400)

While the present invention may utilize a wide variety of fuel level sensors within the context of the disclosed fuel management system/method, one preferred exemplary embodiment of the fuel level sensor utilizes a design structure that is "zero" or near "zero" power, and in many cases can be fabricated without the use of an internal or external power supply by using parasitic power extraction techniques. Many of the wireless techniques that utilize an inductive pickup coil that is shunted with a diode or other switching element (typically utilized in product anti-theft systems and the like) are discussed (and referenced in patents cited therein, many of which are expired) within U.S. Pat. No. 7,113,094 for APPLICATION FOR RADIO FREQUENCY IDENTIFICATION SYSTEMS, issued on Sep. 26, 2006 to Sharon R. Garber, et. al, all of which is incorporated herein by reference.

Figure 14:
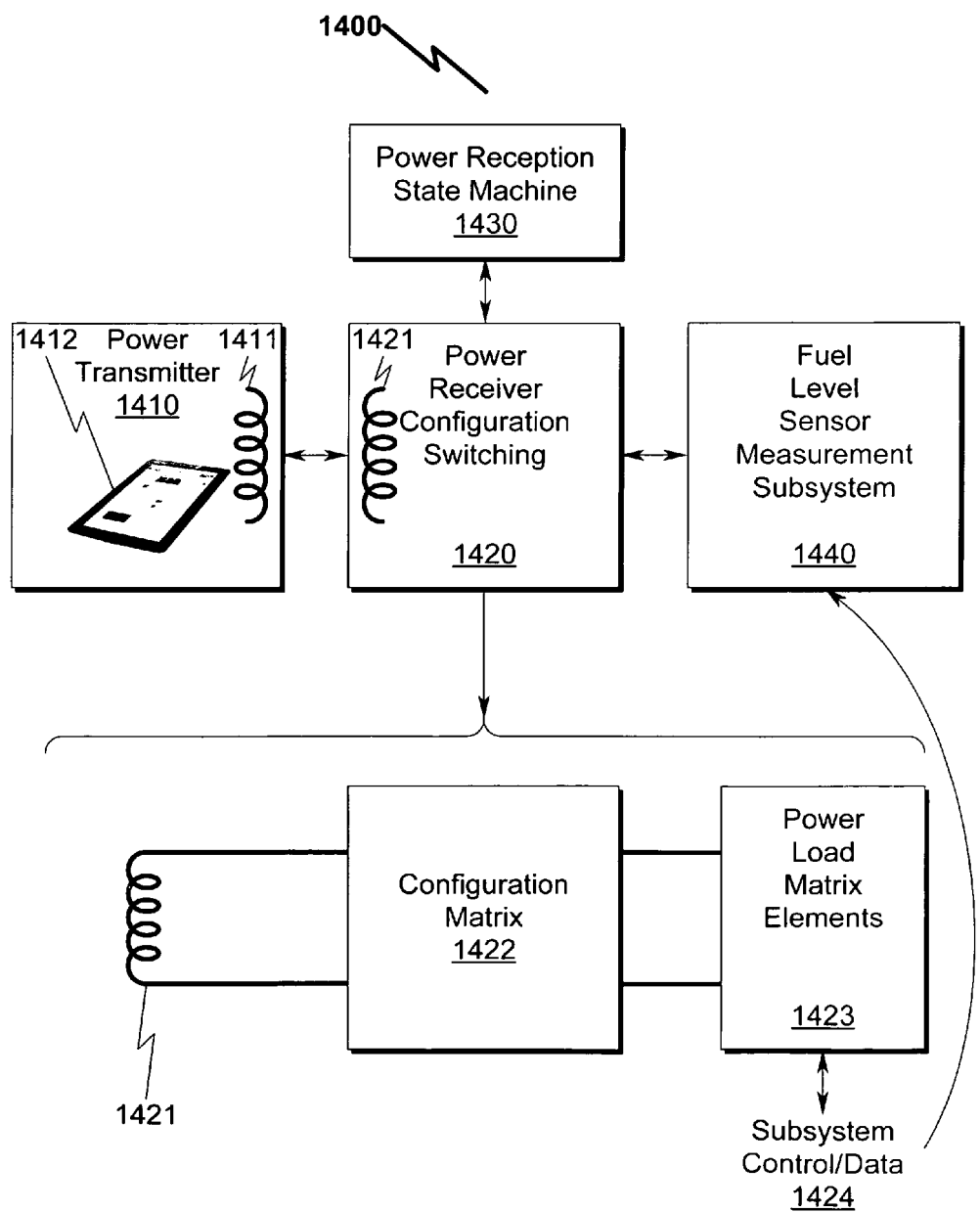
FIG. 14 illustrates an exemplary system block diagram of a low/zero power communications system useful in some preferred exemplary embodiments of the present invention.

The general structure of this particular low/zero power preferred fuel level sensor embodiment is illustrated in FIG. 14 (1400). The general architecture of this fuel level sensor makes use of inductive and/or RF transmission (1411, 1421) from a power transmitter (1410) (typically integrated or attached to a portable data entry device (1412)) to a power receiver (1420) (under control of a state machine (1430)) that communicates with the fuel level sensor measurement subsystem (1440). The combination of a power receiver (1420) and appropriate power transfer circuitry in conjunction with appropriate state machine circuitry (1430) permits the fuel level sensor subsystem (1440) to operate in some preferred embodiments without any embedded power source such as a battery or the use of wiring to the vehicle electrical system. Shunting of the power receiver (1420) inductive pickup can be sensed by the power transmitter (1410) to affect data transmission from the receiver (1420) to the transmitter (1410) in some circumstances.

Referencing FIG. 14 (1400), the power receiver subsystem (1420) is typically embodied wherein an inductive pickup (1421) is routed through a configuration matrix (1422) (typically under control of a state machine (1430)) to service an element within a power load matrix (1423). This power matrix load (1423) may also generate appropriate control/data signals (1424) to operate the remainder of the fuel level sensor measurement subsystem (1440). Depending on the state (1430) of the configuration matrix (1422), a different element within the power load matrix (1423) is selected for connection to the inductive pickup (1421), resulting in a different functional relationship between the power transmitter (1410) and the fuel level sensor measurement subsystem (1440).

The present invention anticipates a wide variety of methodologies that may be used to implement the configuration matrix (1422). However, the use of solid state switches such as MOSFETs, BJTs, IGBTs, SCRs, and/or TRIACs are thought to be optimal selections for this implementation. The specific elements contained within the power load matrix (1423) may vary widely, but optimal selections for these elements are generally thought to comprise those illustrated in FIG. 15 (1500).

Power Receiver Configuration Switching States (1500)

Figure 15:
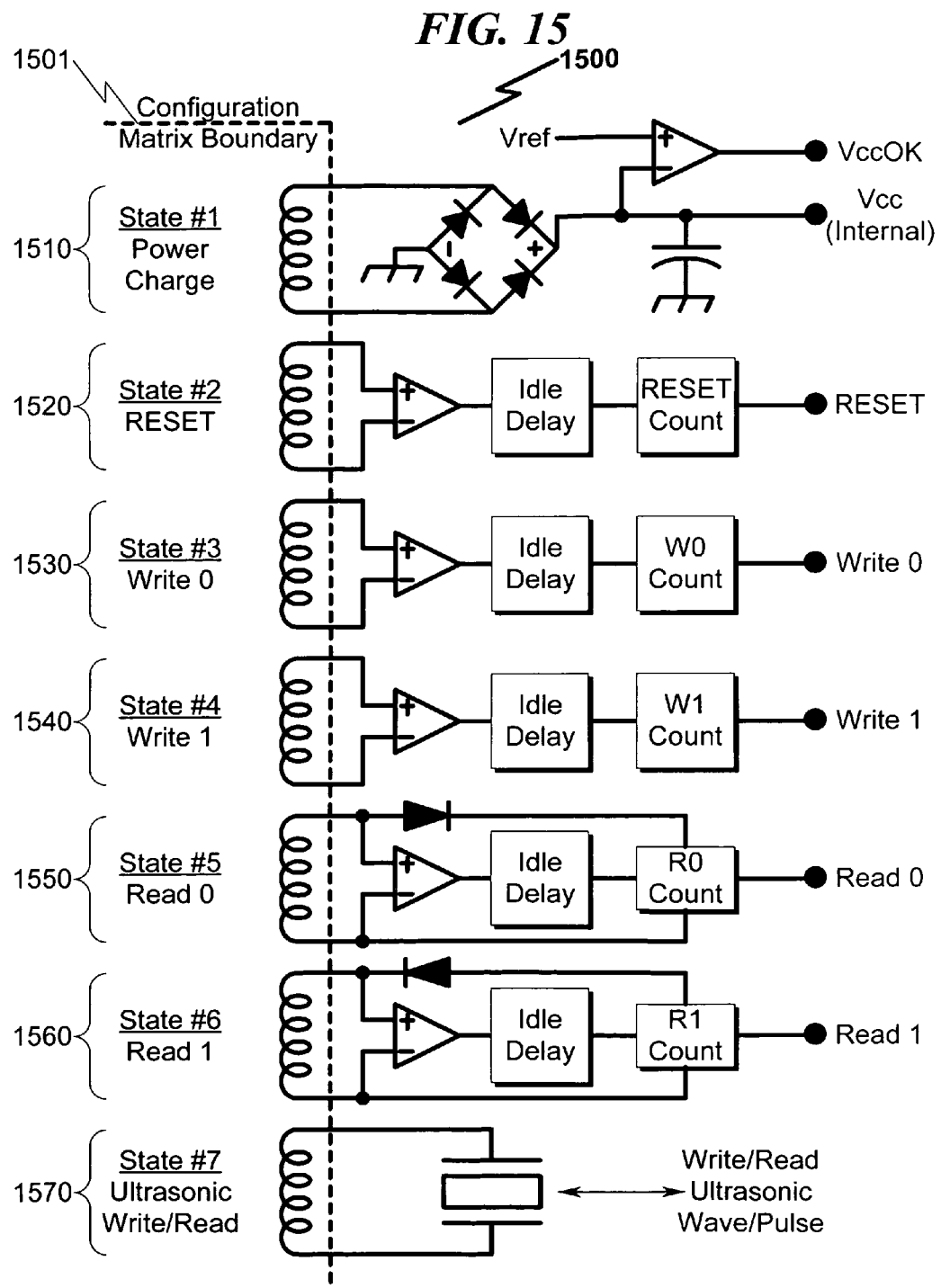
FIG. 15 illustrates exemplary power receiver configuration switching states and their associated circuitry associated with some preferred exemplary embodiments of a low/zero power communications system useful in some preferred exemplary embodiments of the present invention.

The switching states associated with power receiver configuration block diagram illustrated in FIG. 14 (1400) may take many forms, but it is thought that the scenarios depicted in FIG. 15 (1500) are optimal. In these examples, the configuration matrix (1422) has been symbolically identified by a configuration matrix boundary (1501) to separate the inductor pickup (1421) from the power load matrix elements (1423).

It should be noted that in many preferred embodiments the fuel level sensor measurement subsystem will utilize a low power clock oscillator in conjunction with state machine operations and other functions. The present invention specifically anticipates (and incorporates herein by reference) the utilization of the low power crystal oscillator technologies detailed in U.S. Pat. No. 5,546,055 for CRYSTAL OSCIL- LATOR BIAS STABILIZER, issued on Aug. 13, 1996 to Kevin M. Klughart. The availability of a low power clock oscillator source as depicted in this document permits definition and detection of distinct periods of idle and/or waveform activity in the inductive pickup and may aid in formation of the state machine controller as generally depicted in FIG. 14 (1430).

Note when interpreting the symbolic state functions in FIG. 15 (1500) that various time periods, idle times, and detected clock counts may be referenced to an internal clock generated within the fuel level sensor measurement system or in some circumstances referenced to detected pulses induced within the inductive pickup by the remote transmitter.

Power Charge State (1510)

The power charge state connects the inductor pickup to a bridge rectifier or other current rectification switch to charge a capacitor that supplies Vcc operating voltage for the remainder of the fuel level sensor measurement subsystem. Generally speaking, the default operating mode of the system is this state, in that extraneous electromagnetic energy impinging the inductive pickup will be converted into available energy to support the low-power requirements of the fuel level sensor measurement system.

As part of this state, the generation of a VccOK signal indicating that the supply voltage has reached an acceptable operating point is anticipated to be part of this process. The Vref reference level defining this operating point can be derived from stacks of chained VGS subthreshold MOSFET devices or other techniques well known in the art.

Reset State (1520)

The RESET state is entered by inspecting the inductive pickup (typically using a comparator, optimally incorporating hysteresis) to determine incident received waveforms. If, after an appropriate idle delay, a predetermined RESET count of pulses is detected, the RESET state is activated. This RESET state puts the remainder of the system in a state suitable to receive commands via the inductive pickup from the remote wireless device.

Write 0 State (1530)

The WRITE 0 state is entered by inspecting the inductive pickup (typically using a comparator, optimally incorporating hysteresis) to determine incident received waveforms. If, after an appropriate idle delay, a predetermined WRITE 0 count of pulses is detected, the WRITE 0 state is activated. This state transfers a logic 0 as a write data stream to the fuel level sensor measurement subsystem.

Write 1 State (1540)

The WRITE 1 state is entered by inspecting the inductive pickup (typically using a comparator, optimally incorporating hysteresis) to determine incident received waveforms. If, after an appropriate idle delay, a predetermined WRITE 1 count of pulses is detected, the WRITE 1 state is activated. This state transfers a logic 1 as a write data stream to the fuel level sensor measurement subsystem.

Read 0 State (1550)

The READ 0 state is entered by inspecting the inductive pickup (typically using a comparator, optimally incorporating hysteresis) to determine incident received waveforms. If, after an appropriate idle delay, a data 0 is to be read (transmitted) the inductive pickup is shorted (typically through a diode) for a predetermined READ 0 count of pulses detected from the inductive pickup. This state transfers logic 0 as a read data stream from the fuel level sensor measurement subsystem. The orientation of the diode in this configuration may be dependent on the type of data to be transmitted back to the originating transmitter (including the type of detector utilized in the originating transmitter), and is not necessarily as shown in the diagram.

Read 1 State (1560)

The READ 1 state is entered by inspecting the inductive pickup (typically using a comparator, optimally incorporating hysteresis) to determine incident received waveforms. If, after an appropriate idle delay, a data 1 is to be read (transmitted) the inductive pickup is shorted (typically through a diode) for a predetermined READ 1 count of pulses detected from the inductive pickup. This state transfers logic 1 as a read data stream from the fuel level sensor measurement subsystem. The orientation of the diode in this configuration may be dependent on the type of data to be transmitted back to the originating transmitter (including the type of detector utilized in the originating transmitter), and is not necessarily as shown in the diagram.

Ultrasonic Write/Read State (1570)

The ultrasonic write/read state is configured by connecting the inductive pickup to the ultrasonic transducer associated with the fuel level sensor subsystem. This connection permits incident wireless energy to be transmitted directly from the inductive pickup to stimulate the ultrasonic transducer to produce the ultrasonic wave/pulse necessary to measure the fuel level within the fuel tank (assuming an ultrasonic fuel level measurement embodiment). The return ultrasonic echo can be either decoded by logic within the fuel level sensor measurement system or in some instances transmitted directly back via the inductive pickup to the originating transmitter for determination of the return echo time.

Fuel Management Volume Standardization Method (1600)

An overarching goal of the fuel management system/method described herein is volumetric standardization of fuel within a fuel tank, such that discrepancies between "full" fuel tanks on rental/lease vehicles to customers are accounted for when the rental/lease vehicle is returned by the customer. One issue not addressed by the prior art is the volumetric differential in fuel that is due to thermal expansion/contraction of the fuel itself within the fuel tank. As a result of this thermal expansion/contraction, there are many instances in which vehicle rental/lease firms "overfill" their fleet of returned vehicles due to differentials in the temperature of their fuel storage versus the ambient temperature of the vehicle fuel tank.

As an example, the following fuels and their volumetric coefficient thermal expansion are listed:

| Fuel | Volumetric Coefficient of Thermal Expansion $10^{-6}/°$ C. |
| --- | --- |
| Diesel | 828 |
| Ethanol | 750 |
| Gasoline | 950 |

The coefficient of volumetric expansion values can have a significant impact on the measurement of fuel within the fuel tank. For example a 20 gallon gasoline filled fuel tank experiencing a temperature differential of 25 degrees Celsius will incur a volumetric differential of approximately half a gallon of fuel. This means that if the fuel is dispensed from a (typically cooler) underground storage tank and placed within a warmer fuel tank, the fuel will expand due to the increased temperature and be volumetrically larger than the amount of fuel dispensed from the fuel pump.

One preferred embodiment of the present invention coordinates the filling of the fuel tank with knowledge of the temperature of the fuel within the fuel dispensing storage reservoir to ensure that once the fuel is loaded into the fuel tank, its expansion due to the differential in ambient temperature and that of the fuel dispensing storage reservoir will produce a fuel tank level that meets the predetermined "full" fuel tank specification. In this manner, the fuel tank will not become "overfull" by the addition of fuel that would eventually expand due to increased temperature and result in fuel spillage and waste.

This approach to fuel management, incorporating fuel temperature as well as volume in the dispensing of fuel to the fuel tank, may be augmented in some preferred embodiments to normalize the amount of fuel resident in the tank to a known temperature standard. For example, it might be possible to define a nominal 20 gallon capacity fuel tank as "full" if it contains 18 gallons of fuel at 25 degrees Celsius. Thus, filling the fuel tank would necessarily require interrogation of the temperature of the fuel storage reservoir used by the fuel dispenser and the ambient temperature of the fuel within the fuel tank. In this fashion, the fuel management system can manage the energy content transferred to each fuel tank during the refill cycle to ensure that each "full" fuel tank contains a specified energy content based on normalized fuel volume at a standardized temperature.

Figure 16:
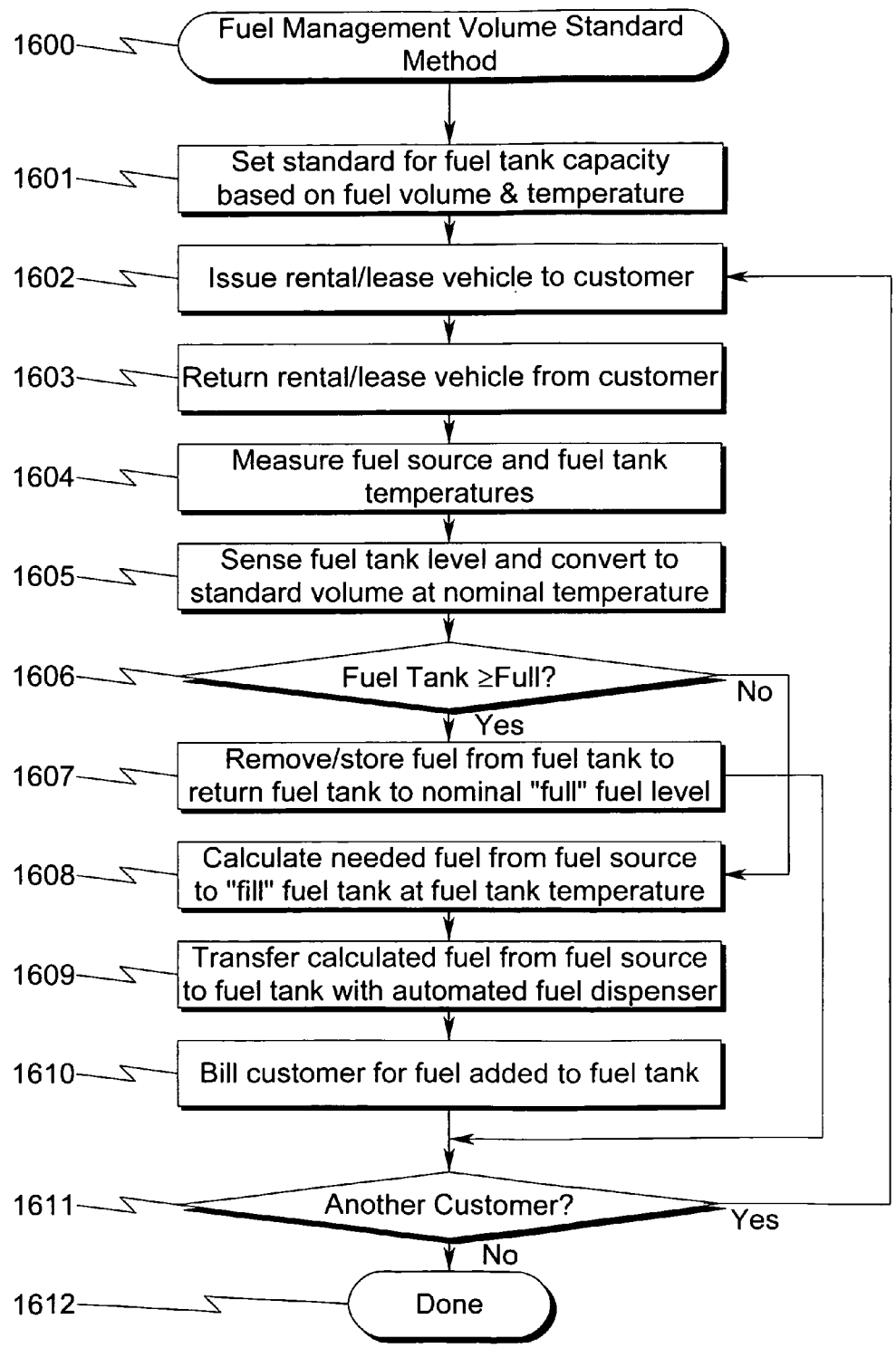
FIG. 16 illustrates an exemplary method flowchart useful in implementing some preferred exemplary embodiments of the present invention incorporating fuel dispensing compensation for thermal fuel expansion coefficients.

The fuel management volume standardization system described above has an associated method architecture as generally illustrated in FIG. 16 (1600). The method steps generally comprise the following:

- Setting the standard for fuel tank capacity based on fuel volume and standard (nominal) volumetric temperature (1601);
- Issuing the rental/lease vehicle to the customer (1602);
- Returning the rental/lease vehicle from the customer (1603);
- Measuring the fuel source and fuel tank temperatures (1604);
- Sensing the fuel tank level and converting this fuel level to a standard volume at nominal temperature (1605);
- If the fuel tank is less than the standardized "full" level, proceeding to step (8) (1606);
- Removing/storing fuel from the fuel tank to return the fuel tank to the nominal "full" level at the given fuel tank temperature, then proceeding to step (11) (1607);
- Calculating the needed fuel amount from the fuel source to "fill" the fuel tank to the nominal "full" level at the fuel tank temperature (1608);
- Transferring the calculated fuel amount from the fuel source to the fuel tank with an automated fuel dispenser (1609);
- Billing the customer for fuel added to the fuel tank (1610);
- Determining if there are other rental/lease customers to be serviced by the rental/lease vehicle, and if so, proceeding to step (2) (1611);
- Terminating the fuel management volume standardization method (1612).

One skilled in the art will recognize that these method steps may be augmented or rearranged without limiting the teachings of the present invention.

Fuel Management Surcharge System Context (1700)

Figure 17:
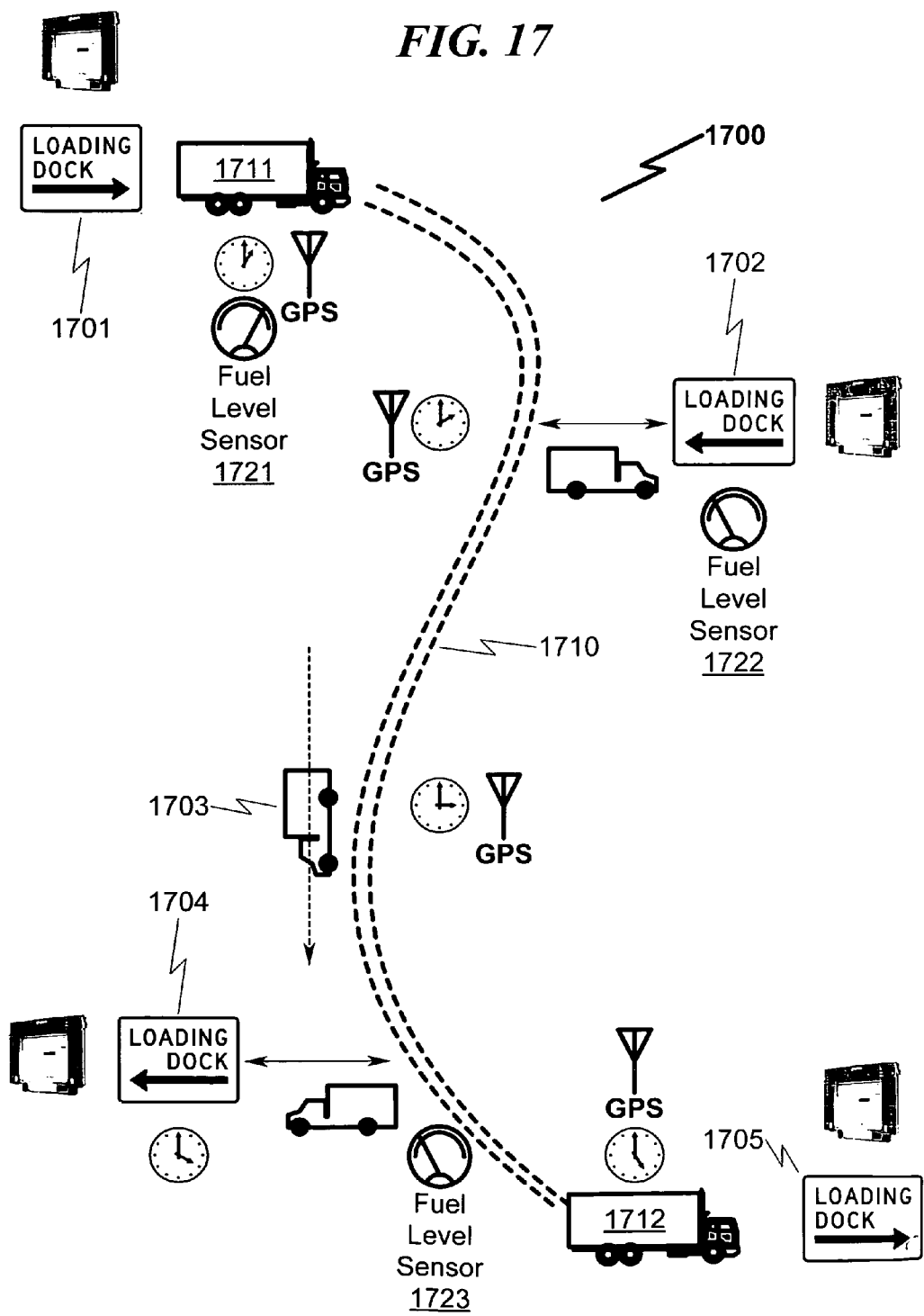
FIG. 17 illustrates an exemplary fuel management surcharge system context in which fuel surcharges may be accurately accounted for using the accurate fuel tank level sensing provisions taught within present invention.

The present invention anticipates a wide variety of fuel management applications, one preferred application context being the implementation of a fuel management surcharge system as generally illustrated in FIG. 17 (1700). In this system embodiment, the fuel management surcharge system is applied to situations where fuel surcharges must be applied to trucking and/or freight delivery systems. Currently fuel surcharges applied to truck freight and the like take the form of fixed pricing methodologies based on increased or fluctuating fuel costs. The system as depicted in FIG. 17 (1700) anticipates a system that permits fuel surcharges to be accurately attributed to individual way-points in a truck/vehicle delivery cycle.

As generally illustrated in FIG. 17 (1700), the system anticipates a truck delivery system in which a truck (1711) or other delivery vehicle is loaded at a loading dock (1701) and proceeds along a delivery path (1710) comprising a sequence of way-points (1701, 1702, 1703, 1704, 1705). This travel path (1710) may incorporate under the proposed system one or more fuel level sensor readings (1721, 1722, 1723) that track the amount of fuel required to traverse from one way-point to another way-point. This information when combined with information indicating the cargo delivery/reception transactions that occur at each way-point can be used to determine the relative cost of transport to/from a given way-point along the travel path (1710). This costing information can be attributed to the individual cargo delivery/reception transaction to permit an accurate fuel surcharge or costing algorithm to be applied to each delivery/reception transaction.

Significant to this analysis is the fact that logging of both the fuel level sensor readings (1721, 1722, 1723) and associated time stamps and/or GPS coordinates associated with each way-point also permits human/labor and equipment costs to be incorporated into the costing algorithm. For example, while many truck delivery costing methodologies may utilize travel distances to determine the chargeback costs of delivery, the present invention system anticipates that GPS can be used to determine ACTUAL miles traveled, in conjunction with time stamps that log ELAPSED TIME of travel, in addition to ACTUAL FUEL CONSUMPTION utilized to affect the cargo delivery. Each of these components if individually accounted for will not provide a comprehensive truck/vehicle delivery cost. It is only by integrating ALL of these components that the true cost of delivery can be calculated.

An example of this analysis can be seen in metropolitan areas where traffic congestion can significantly increase the travel time between way-points as well as increase fuel consumption between these way-points. Differences in GPS position will generally not account for added fuel consumption when navigating hills or steep terrain. However, accurate fuel consumption measurements can account for this terrain factor as well as traffic congestion. Differences in overall truck weight along the travel route cannot generally be accounted for except by use of accurate fuel consumption statistics, requiring accurate measurement of fuel tank contents. Atmospheric/environmental conditions (including but not limited to altitude, temperature, traffic congestion, and/or fuel efficiency) cannot be accurately accounted for without some method of accurately determining fuel tank levels along way-points within the travel path (1710). The present invention provides this essential fuel tank measurement functionality and thus enables accurate fuel surcharge management to be implemented within this application environment.

Key to implementing this fuel surcharge management methodology is the ability to accurately determine the fuel level within the fuel tank. The present invention (especially the fuel tank fill cap fuel level sensor embodiments) provide an especially convenient methodology to implement this functionality within the context of this fuel management surcharge system. Without the ability to accurately determine the level of fuel within the fuel tank (and also possibly incorporating temperature standardization into this measurement method), the ability to accurately track fuel consumption along the travel route (1710) is impossible. Thus, the accurate measurement functionality provided by the present invention fuel level measurement system disclosed herein is critical to implementing this more comprehensive cost and fuel surcharge management system.

Fuel Management Surcharge System (1800)

Figure 18:
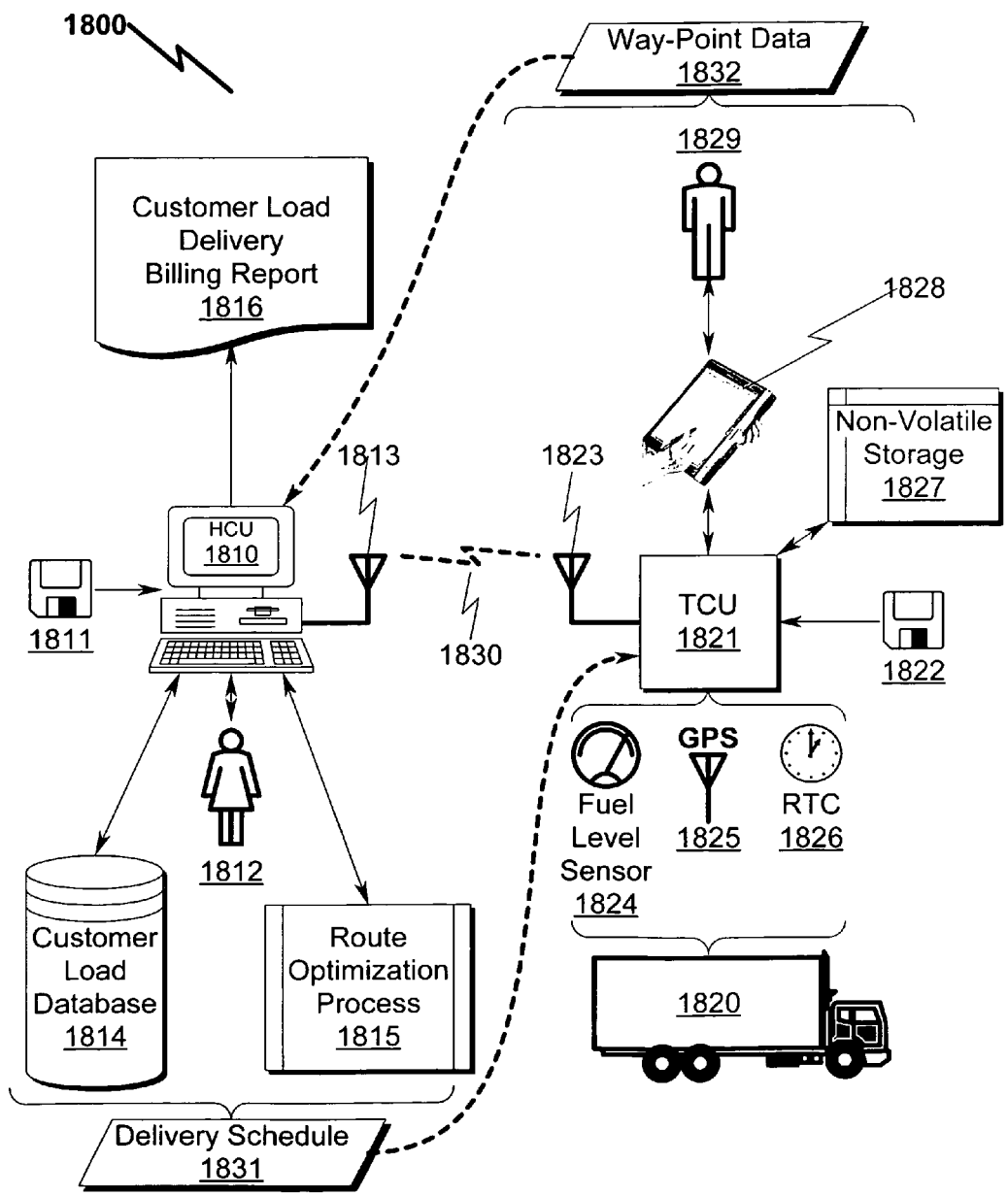
FIG. 18 illustrates an exemplary embodiment of the present invention applied to a fuel management surcharge system in which fuel surcharges may be accurately accounted for using the accurate fuel tank level sensing provisions taught within present invention.

A preferred exemplary embodiment of the present invention as applied to the system context generally illustrated in FIG. 17 (1700) is presently illustrated in FIG. 18 (1800), wherein a way-point based fuel surcharge system is generally presented. Within this context, a host central computer system (HCU) (1810) operating under software read from a computer readable medium (1811) generally interacts with a dispatch operator (1812) to provide an automated fuel accounting system to monitor and control the activity of one or more trucks and/or delivery vehicles (1820) that deliver freight or other cargo. The truck (1820) incorporates a truck/vehicle central processing unit (TCU) (1821) that operates under software read from a computer readable medium (1822). The central computer (1810) and truck computer (1820) optimally communicate via a wireless communication link (1830) with each computing subsystem incorporating wireless communication capabilities (1813, 1823).

Within this system context (1800), the HCU (1810) generally interacts with a dispatch operator (1812) to create a customer load cargo database (1814) that indicates what loads are on what truck (1820) and the characteristics of each load, such as size, weight, special characteristics, etc. This customer load cargo database (1814) is then optimized by a route optimization process (1815) running on the HCU (1810) to generate a delivery schedule (1831) that is used to schedule the optimal delivery route for the truck (1820). This delivery schedule is (optimally wirelessly) transmitted (1830) to the TCU (1821) for presentation (1828) to the delivery operator (1829) to dictate the proposed optimal delivery route for the cargo.

Note that the proposed delivery schedule (1831) may in fact not be the actual delivery schedule implemented by the delivery operator (1829). Due to environmental conditions and other factors, the actual delivery route may vary considerably from that proposed by the route optimization process (1815). Additionally, other factors, such as road conditions, traffic accidents, and other unknown environmental factors may significantly impact the actual delivery path. All of this information is accounted for in the actual way-point data (1832) collected by the TCU (1821) and stored (1827) for transmission (1830) to the HCU (1810).

The truck CPU (TCU) (1821) is charged with gathering information from a fuel level sensor (1824), global positioning system (1825), and real-time clock (1826) as the truck (1820) traverses its delivery path. This information is stored in non-volatile memory (1827) and logs (typically via a tablet or other interface (1828)) deliveries by the truck driver/operator (1829). This delivery information is integrated with way-point data for the fuel tank level (1824), geographical position of the truck (1825) (including geographic path data to the current way-point), and timing information (1826) to generate a complete cost accounting profile for the fuel/manpower/equipment costs necessary to deliver the particular cargo to the current way-point.

One a truck delivery cycle is complete with the truck cargo unloaded at the various way-points, the data gathered (1827) by the TCU (1821) is transmitted (1830) to the HCU (1810) and used to prepare a customer load delivery billing report (1816) that is the basis for charging the customer for the actual cost associated with the cargo delivery. As stated previously, by accurately accounting for truck position, cargo delivery, way-point time, and fuel tank levels, the entire cost profile associated with a given cargo delivery can be properly charged back to the customer. However, without the critical information associated with accurate fuel tank measurements, it is impossible to provide this accurate fuel surcharge accounting capability.

The present invention anticipates that the TCU (1821) along with other components associated with the truck (1820) data logging subsystem, including the fuel level sensor (1824), GPS locator (1825), and/or real-time clock (1826), may be incorporated into the fuel level sensor system as described elsewhere in this document. This integrated fuel sensor subsystem is anticipated in some preferred embodiments to incorporate a wireless interface that can communicate both with the truck operator interface (1828) and/or the HCU (1810) using the indicated wireless communication architecture (1830, 1813, 1823).

Fuel Management Surcharge Method (1900)

Figure 19:
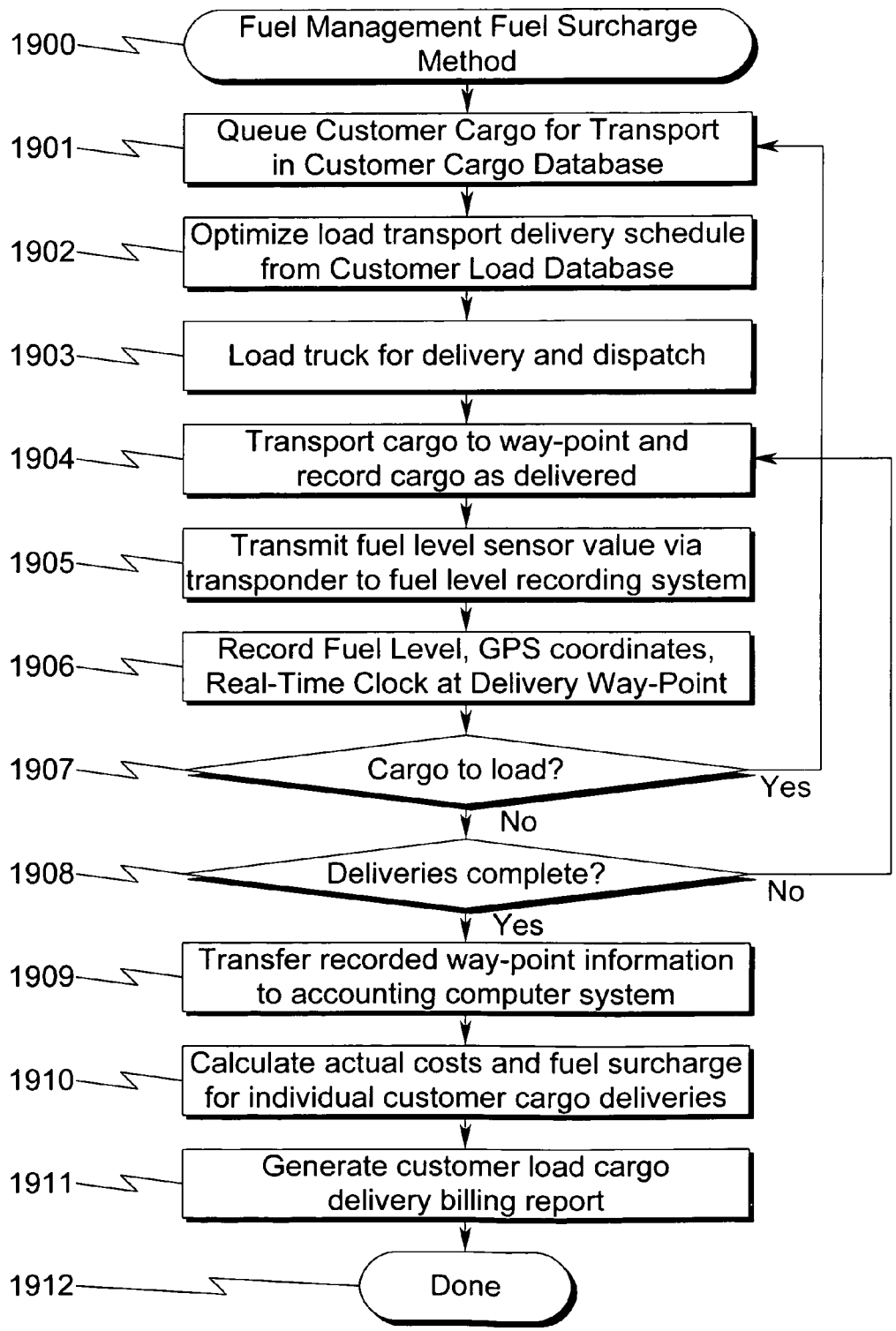
FIG. 19 illustrates an exemplary embodiment of the present invention applied to a fuel management surcharge method in which fuel surcharges may be accurately accounted for using the accurate fuel tank level sensing provisions taught within present invention.

The present invention anticipates that the fuel management surcharge system context generally illustrated in FIG. 17 (1700) and the fuel management surcharge system generally illustrated in FIG. 18 (1800) may incorporate a fuel management surcharge method. One preferred exemplary fuel management surcharge method is generally illustrated in FIG. 19 (1900) and comprises the following steps:

Queuing customer cargo for transport in a customer load cargo database (1901);
Optimizing a load transport delivery schedule from the customer load cargo database (1902);
Loading the truck for delivery and dispatch with the customer cargo (1903);
Transporting the cargo to a delivery way-point and recording the cargo as delivered (1904);
Transmitting a fuel level sensor from the truck fuel tank to a fuel level recording system (1905);
Recording the fuel level, GPS coordinates, and real-time clock value at the delivery way-point (1906);
Determining if there is cargo to load at the delivery way-point, and if so, proceeding to step (1) (1907);
Determining if there are more deliveries to complete, and if so, proceeding to step (4) (1908);
Transferring recorded way-point information to an accounting computer system (1909);
Calculating the actual costs and fuel surcharge for individual cargo deliveries based on the transferred recorded way-point information (1910);
Generating a customer cargo load delivery billing report from the calculated actual costs and fuel surcharges (1911);
Terminating the fuel management fuel surcharge method (1912).

One skilled in the art will recognize that these method steps may be augmented or rearranged without limiting the teachings of the present invention.

Fuel Management Fuel Arbitrage System Context (2000)

Overview

Figure 20:
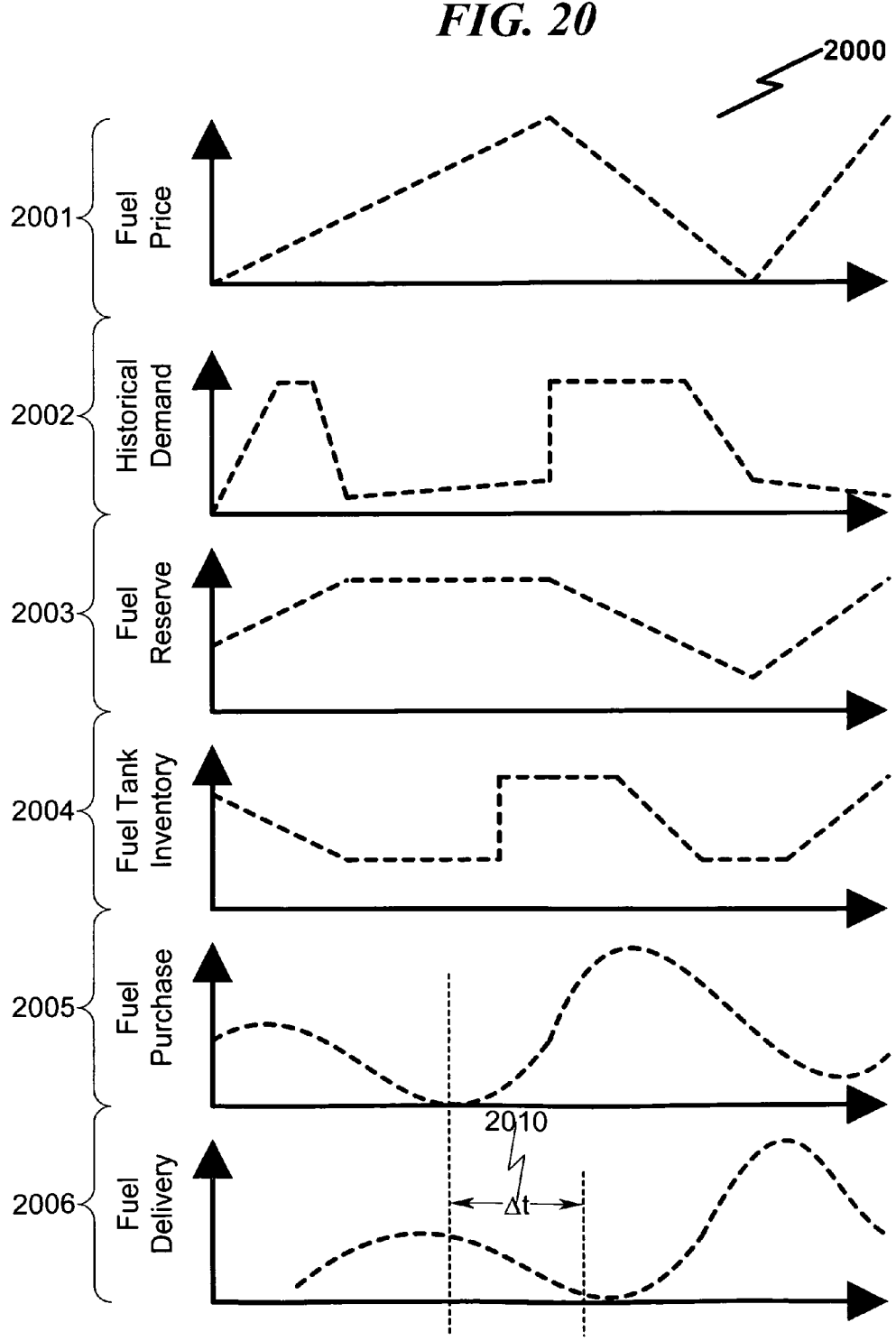
FIG. 20 illustrates an exemplary embodiment of the present invention applied to a fuel management arbitrage system context in which accurate accounting of fuel within a fleet vehicle can be utilized to provide optimal revenue generation within a rental/lease vehicle management system.

The present invention anticipates a wide variety of fuel management applications, one preferred application being the implementation of a fuel management arbitrage system as conceptually illustrated in FIG. 20 (2000). In this system embodiment, the fuel management arbitrage system is applied to situations where knowledge of fuel inventories within a fleet of fuel consuming systems can permit optimal timed purchasing of fuel to support fleet fueling requirements and thus result in a significant fuel cost savings. As a backdrop to this discussion, it is important to realize that the automotive rental fleet in the United States to date comprises approximately 1.6 million vehicles. Assuming a fuel tank capacity of approximate 20 gallons and a nominal fuel price of USD$3.33 per gallon, this represents a fuel inventory for this fleet of approximately USD$100 million. Obviously, as fuel prices increase, this fuel inventory cost will only increase, and represents a pressure on profit margins for the industry. The current state of the art provides no methodology to accurately monitor this fuel inventory and as such there is presently no methodology to leverage the capacity and level of this fuel inventory to optimize profits within the management of rental/lease vehicle fleets.

Added to this fuel inventory cost is the issue of uncertainty in required fuel consumption by the rental fleet retailers. This is caused by the fact that as automobiles are returned by customers, there is no accurate methodology to determine the amount of fuel required to return the car to a "full" fuel tank WITHOUT ACTUALLY FILLING THE FUEL TANK. Thus, auto rental retailers are required to maintain significant fuel tank reservoir levels to accommodate refilling of rental car fuel tanks. This fuel tank reservoir capacity must be maintained because there is no methodology to accurately measure CURRENT fuel tank capacity within the fleet of rental vehicles. If the CURRENT fuel tank inventory could be accurately measured, then the decision on WHEN to fill the fuel tank(s) in the fleet and to what level could be appropriately timed to take advantage of optimal fuel delivery cost metrics.

For example, upward trends in fuel pricing can be used to trigger deliveries of fuel in anticipation of the need for fuel tanks to be filled prior to rental. Conversely, if fuel prices are anticipated to drop in the future, the knowledge of exactly how much fuel is required for the fleet can be used to pre-purchase the fuel at rates that are more favorable than current pricing. While fuel pricing contracts can help moderate fluctuations in fuel pricing when applied to fleet fueling inventory, without accurate knowledge of fleet fuel tank inventories, even these brokering methodologies can fail to optimally adapt to changes in fuel pricing to permit optimal fuel price savings.

Fuel Arbitrage Components

Within the context of an exemplary vehicle fleet fuel management fuel arbitrage system, the following factors are anticipated considerations within the context of the present invention (and corresponding action drivers) within a fuel management environment:

Fuel Price (2001). The current spot fuel price, trend, and historical projection is an important consideration in the arbitrage system because the ultimate goal of the system is to purchase fuel at a low price and sell it at a high price. Alternatively, when fuel inventory must be purchased to replenish fuel tank inventory that has been utilized by customers, this replenishment activity should be activated when fuel pricing is as low as practicable, because fuel inventory replenishment is a lost cost in the overall management of the vehicle fleet, as it is normally not directly passed on to the consumer.

Historical Fuel Demand (2002). Based on the day of the week, day of the month, holidays, special events, and other predictable events that have a historical basis (and/or a known future event that has a predictable impact on overall fleet demand), the historical demand for fuel can be estimated using a wide variety of both historical and predictive factors. This information is important because it predicts fuel demand load that must be accommodated by the vehicle fleet retailer. Knowledge of this demand, in conjunction with fuel price (both current and predicted), may dictate purchase and/or delivery of fuel in advance of known historical demand, or in some circumstances "just in time" of predicted future demand based on historical fuel demand trends.

Fuel Reserve (2003). This represents the fuel capacity reserve available within a given retail vehicle rental facility as well as the total potential fuel reserve capacity. In essence, this is an accurate determination of how much fuel is available to dispense to the vehicle fleet at a given vehicle rental facility as well as the capacity of the fuel reserve tanks. This information can be obtained using an embodiment variant of the present invention fuel tank level sensor (Fuel Management Fuel Reservoir Level Sensor) as detailed later in this document. It is important to have knowledge of this variable because it dictates when fuel MUST be delivered, what vehicles MAY be rented, and to some extend how much fuel can be delivered and stored for future delivery to the fleet. In the arbitrage context, the goal is to "store" fuel at low price points for delivery to the fleet, and to extend for as long as possible fuel dispensing at these low price points to weather as best as possible spikes in fuel pricing. Additionally, cyclic conditions such as transitions to "summer formula" fuels that are often higher in price can be anticipated such that the fuel reserve is "filled" prior to the point at which the fuel price is increased, and nearly fully depleted just before the fuel price is dropped for "winter formula" fuels. This maximizes the window in which low fuel pricing is incorporated into the fleet fuel inventory.

Fuel Tank Inventory (2004). This component represents the accurate measurement of the fuel tank levels within the fleet and the associated "full" fuel capacity of individual vehicles in the fleet. This information is currently not available in the prior art as there is no accurate methodology to dynamically track the fuel level within the fuel tanks of various fleet vehicles. A significant reason that this information is critical to optimal fuel purchasing/delivery decisions is that fuel tank inventory represents a very large "lost cost" in maintaining the vehicle fleet. For example, a typical fleet of 300000 automobiles each having a 20 gallon capacity represents approximately USD$20 million in fuel inventory. A fuel price reduction of just USD$0.17 in this situation represents over USD$1 million in the cost of fuel inventory. By knowing exactly how much fuel is in each fleet vehicle, the timing of when fuel is purchased to refill the fuel tank can be optimally timed. Alternatively, based on demand, some fleet vehicles that have depleted fuel tank levels may be idled in favor of other fleet vehicles that have "full" tanks. This scenario can take advantage of situations where filling the depleted fuel tank would result in a demand for "expensive" fuel that is predicted to become "cheaper" in the future.

Fuel Purchase (2005). The arbitrage model advocated herein anticipates that fuel purchase and fuel delivery can be separated in some situations to achieve optimal fuel management strategies. Often the use of long term fuel pricing agreements may be utilized to "smooth" price spikes in the market and thus provide some level of price guarantee with respect to fleet fuel pricing. The accurate knowledge of fuel tank inventory levels (2004) permits the integration of both fuel purchase agreements as well as spot fuel purchases (at potentially lower pricing levels) to achieve an optimal overall fleet fuel pricing model. In this situation, the prior art taught that only historical demand was utilized to trigger fuel purchases, because there was no accurate methodology to measure fleet fuel tank inventory absent filling the fuel tanks on vehicle return.

Fuel Delivery (2006). Knowledge of accurate fuel tank inventory levels in conjunction with historical fuel demand profiles can permit a more optimal "just in time" fuel delivery schedule that permits delayed payment of the cost of fuel inventory replenishment. This delay in fuel payment/delivery (at) (2010) can be significant as it represents a delay in cash flow outlays that can be invested in other revenue generating avenues. This option for "just in time" fuel delivery scheduling was not possible with the prior art because the fleet was generally kept at "full" fuel tank levels upon vehicle return by the customer, regardless of the need for "full" vehicles in the future.

Summary

In summary, the present invention anticipates a system that integrates rental fleet fuel inventory management (both within the context of rental fleet fuel tank inventory and in the context of fleet reservoir tank inventory) to permit optimal timing of fuel delivery and/or purchasing. The ability to time the purchase and/or delivery of fuel within the context of an overall fuel management system is not currently possible in the rental vehicle market because currently there is no methodology to accurately measure vehicle fuel tank inventories.

Fuel Management Fuel Arbitrage Decision Matrix

With respect to the implementation of a fuel management fuel arbitrage system/method as discussed herein, many preferred embodiments of the invention incorporate a decision matrix utilized to determine when fuel should be purchased, when fuel should not be purchased, and when it may be appropriate to "wait and see" if fuel should be purchased in the future. The decision matrix for the fuel arbitrage system and method applied to the system context described above may have many forms, but an exemplary embodiment implementation will now be discussed to provide the outlines of a preferred embodiment of the present invention. The general goals of such a decision matrix may include one or more of the following objectives or rules:

Decrease total fuel inventories just before "winter blend" fuel becomes available. Since "winter blend" fuel is less costly than "summer blend" fuel, decreasing inventories of "summer blend" fuel to the absolute minimum just before the changeover will permit "expensive" "summer blend" fuel to be exhausted and replaced with cheaper "winter blend" fuel at the last possible moment.

Decrease total fuel inventories just before "fall" fuel becomes available. A price decrease in fuel is often experienced at or after the end of the summer vacation season in the northern hemisphere due to reduce fuel demand. Historically, this price drop can be mapped and anticipated to permit decreasing inventories of "summer" fuel to the absolute minimum just before the "fall" price drop is encountered. This will permit "expensive" "summer" fuel to be exhausted and replaced with cheaper "fall" fuel at the last possible moment.

Increase total fuel inventories just before "summer blend" fuel becomes available. Since "winter blend" fuel is less costly than "summer blend" fuel, increasing inventories of "winter blend" fuel to the absolute maximum just before the changeover will permit "cheaper" "winter blend" fuel to be stockpiled and replaced with more expensive "summer blend" fuel as this inventory is exhausted.

Increase total fuel inventories just before "summer" fuel becomes available. A price increase in fuel is often experienced at the beginning of the summer vacation season in the northern hemisphere due to increased fuel demand. Historically, this price increase can be mapped and anticipated to permit increasing inventories of "spring" fuel to the absolute maximum just before the "summer" price increase is encountered. This will permit "cheaper" "spring" fuel to be stockpiled and replaced with more expensive "summer blend" fuel as this inventory is exhausted.

Increase total fuel inventories if fuel prices have a current positive time derivative and anticipated future positive time derivative. If fuel prices indicate increasing prices in the past and point to future increased prices, fuel should be purchased now to stockpile fuel reserves in anticipation of higher prices.

Hold total fuel inventories if fuel prices have a current positive time derivative and anticipated future zero or negative time derivative. If fuel prices indicate increasing prices in the past and point to future flat or decreasing prices, fuel purchases should be delayed if possible, as it is probable that future pricing may be less than current fuel prices.

Decrease total fuel inventories if fuel prices have a current negative time derivative and anticipated future negative time derivative. If fuel prices indicate decreasing prices in the past and point to future decreased prices, fuel purchases should be delayed if possible, as it is probable that future pricing may be less than current fuel prices.

Hold total fuel inventories if fuel prices have a current negative time derivative and anticipated future zero or negative time derivative. If fuel prices indicate decreasing prices in the past and point to future flat or decreasing prices, fuel purchases should be delayed if possible, as it is probable that future pricing may be less than current fuel prices.

One skilled in the art will recognize that these objectives/rules may be modified in a wide variety of ways to provide for optimal revenue generation (and/or other financial goals) without limiting the teachings of the present invention.

Within this context, the term "total fuel inventories" includes any single element or multiple elements from the following items:

fuel reservoir capabilities of the rental/lease agencies;
fuel tank levels of vehicles in the rental/lease fleet; and
fleet vehicles available for rental/lease and their fuel tank capabilities.

This definition permits the optimization of the fuel inventory cost within the rental fleet by managing the fuel reservoir levels, the levels within the fuel tanks of the individual fleet vehicles, and the availability of a given fleet vehicle for rental/lease. Modifying the availability of a given fleet vehicle's availability for rental/lease may provide an additional degree of fleet management with respect to overall fleet fuel management not currently available in rental/lease retail systems. For example, if a fleet contains a number of a certain type of vehicle, the system/method decision matrix anticipates culling the fleet (temporarily) in times where the fleet fuel inventory is reduced to eliminate the need to fill all rental/lease vehicles with a "full" tank of fuel, or in other circumstances fully fueling the fleet to maximize fuel storage within all fleet vehicles when fuel pricing is low or demand is anticipated to increase in the future. These optimizations permits in some circumstances the use of the fleet fuel tank inventory to "bridge" periods where fuel inventory is temporarily reduced in anticipation of obtaining a better fuel pricing structure in the near future.

Fuel Management Fuel Arbitrage System (2100)

Figure 21:
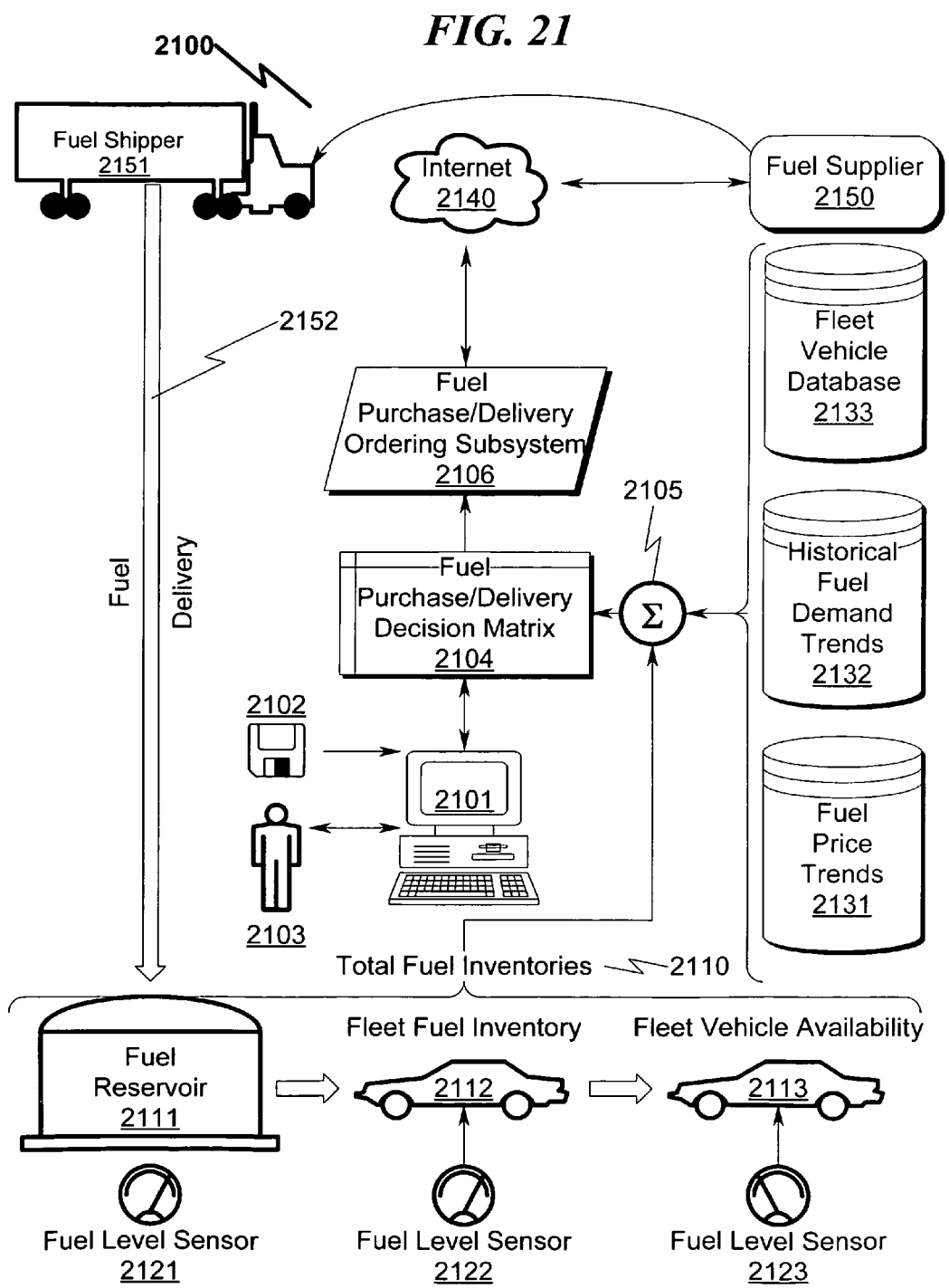
FIG. 21 illustrates an exemplary embodiment of the present invention applied to a fuel management fuel arbitrage system in which accurate accounting of fuel within a fleet vehicle can be utilized to provide optimal revenue generation within a rental/lease vehicle management system.

A preferred exemplary embodiment of the present invention as applied to the system context generally illustrated in FIG. 20 (2000) is presently illustrated in FIG. 21 (2100), wherein an exemplary fuel management fuel arbitrage system is depicted. Within this context, a computer system (2101) under control of software loaded from a computer readable medium (2102) interfaces with an operator (2103) to automatically manage when and how much fuel is purchased/delivered to support a fleet of rental/lease vehicles.

As stated previously, the total fuel inventories (2110) to be managed includes fuel reservoirs (2111) (representing fuel reservoir levels and fuel reservoir capacities at fleet dispatch points), fleet fuel inventory (2112) (representing fuel within the individual fleet vehicles and the capacity of the fleet vehicle fuel tanks), and fleet vehicle availability (2113) (representing the storage capability of fleet vehicles that may be placed in service or taken out of service). Within each of these total fuel inventory (2110) components (2111, 2112, 2113) there exists an implementation of a fuel level sensor (2121, 2122, 2123) with corresponding transducer as detailed elsewhere in this document. From the detail of the total fuel inventories (2110), it can be seen that the fuel reservoir (2111) supplies the fleet fuel inventory (2112) which supplies the fleet vehicle availability (2113) (fleet vehicles that may be placed in/out of service based on their current fuel tank levels).

As explained above, the decision as to if and when fuel should be purchased/delivered may be determined by a wide variety of business and economic factors. In this exemplary embodiment, the computer system (2101) configures a fuel purchase/delivery decision matrix (2104) (that may be determined in part by inputs from an operator (2103)) that integrates data inputs from the total fuel inventories (2110) and databases that may include fuel price trends (2131), historical fuel demand trends (2132), and information on the fleet vehicles included in a fleet vehicle database (2133). The decision matrix (2104) as integrated (2105) from the various data sources is used as input to a fuel purchase/delivery ordering subsystem (2105) that makes a decision on fuel purchases/deliveries based on the various elements within the decision matrix (2104). Once a decision to order the purchase/delivery of a fuel shipment is made, an order is placed (optimally via the Internet (2140)) to a fuel supplier (2150) to have a fuel shipper (2151) deliver fuel (2152) to a fuel reservoir (2111) at the rental/lease facility.

This system provides a significant advantage over the prior art in that total fuel inventories may be accurately managed and spot price fluctuations on the fuel exchange market may be integrated into the fuel purchase/delivery schedule of rental/lease fleet management. As mentioned previously, without the ability to accurately determine the fleet fuel inventory levels, there is no predictable method of leveraging fluctuations in fuel pricing (whether predictable or random) to achieve optimal revenue generation within the vehicle fleet or to achieve optimal profit returns on fleet fuel inventory.

Fuel Management Fuel Arbitrage Method (2200)

Figure 22:
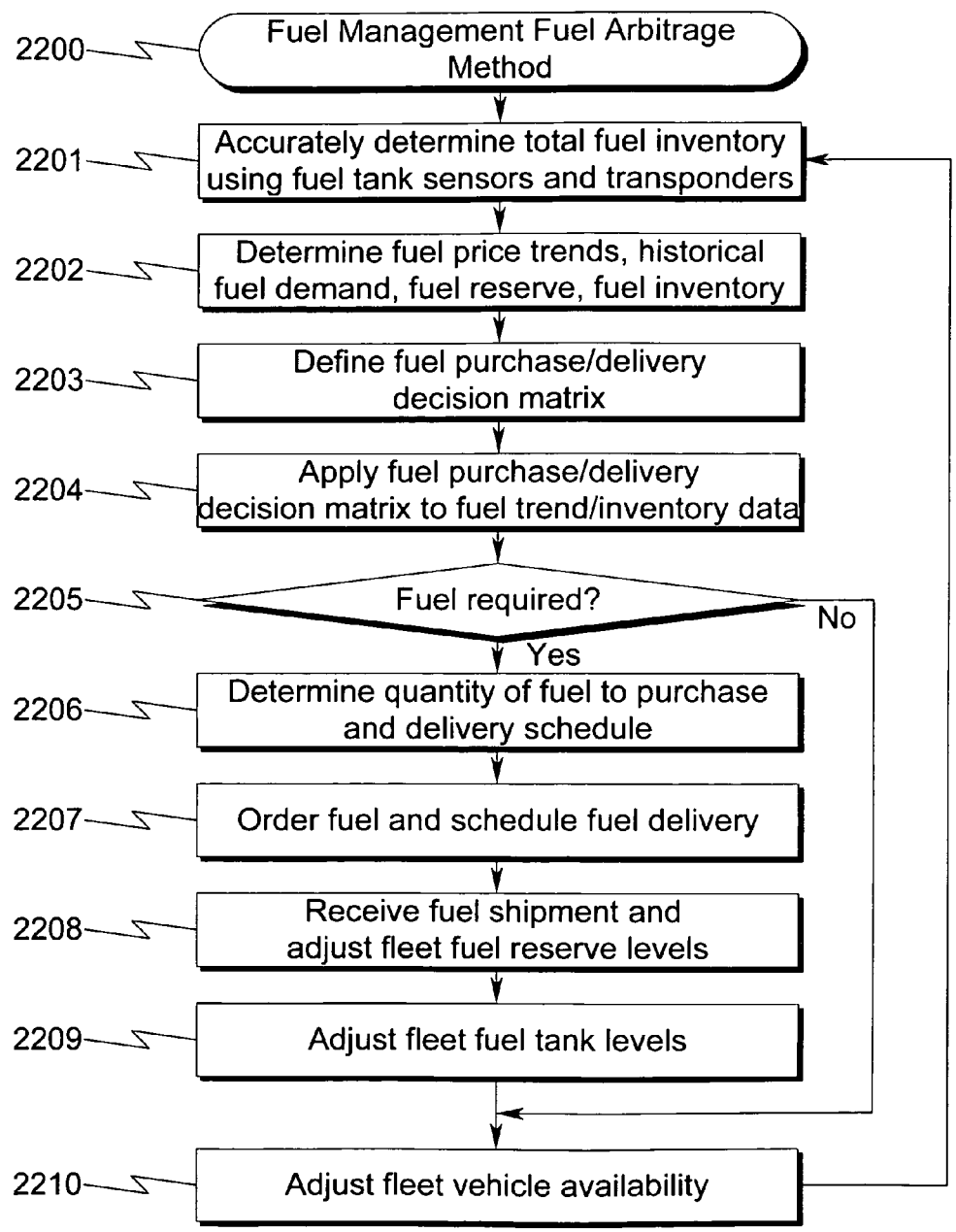
FIG. 22 illustrates an exemplary embodiment of the present invention applied to a fuel management fuel arbitrage method in which accurate accounting of fuel within a fleet vehicle can be utilized to provide optimal revenue generation within a rental/lease vehicle management system.

The present invention anticipates that the fuel management fuel arbitrage system context generally illustrated in FIG. 20 (2000) and the fuel management fuel arbitrage system generally illustrated in FIG. 21 (2100) may incorporate a fuel management fuel arbitrage method. One preferred exemplary fuel management fuel arbitrage method is generally illustrated in FIG. 22 (2200) and comprises the following steps:
- Accurately determining the total fuel inventory using fuel tank sensors and transponders (2201);
- Determining fuel price trends, historical fuel demand, fuel reserve, and fuel inventory to estimate the need for current and future fuel requirements (2202);
- Defining a fuel purchase/delivery decision matrix that determines fuel purchasing and delivery decisions based on input from fuel price trends, historical fuel demand, fuel reserve, and fuel inventory (2203);
- Applying the fuel purchase/delivery decision matrix to fuel price trends, historical fuel demand, fuel reserve, and fuel inventory to determine if fuel should be purchased and/or delivered (2204);
- If fuel is not required to be purchased or delivered, proceeding to step (10) (2205);
- Determining the quantity of fuel to be purchased and the delivery schedule for the quantity of fuel (2206);
- Ordering the quantity of fuel and scheduling delivery of the quantity of fuel (2207);
- Receiving delivery of the quantity of fuel and adjusting the fuel reserve levels (2208);
- Adjusting the vehicle fleet fuel tank levels to an optimal value based on the required fuel inventory (2209); and
- Adjusting the vehicle fleet availability in response to the required fuel inventory requirements (2210), and then proceeding to step (1).

One skilled in the art will recognize that these method steps may be augmented or rearranged without limiting the teachings of the present invention.

Fuel Management Vehicle Lease Return System (2300)

As mentioned previously, the present invention in some preferred embodiments permits an automated fuel dispenser (fuel pump) to dispense fuel to a fuel tank in response to a demand for a "predetermined" amount of fuel to be inserted into the fuel tank, as well as anticipating situations in which a "predetermined" amount of fuel is to be removed from the fuel tank. In both of these situations the "predetermined" amount of fuel may be modified based on the use of a standardized volumetric fuel tank "full" level that compensates for temperature variations between the fuel reservoir contents and the fuel tank contents.

Figure 23:
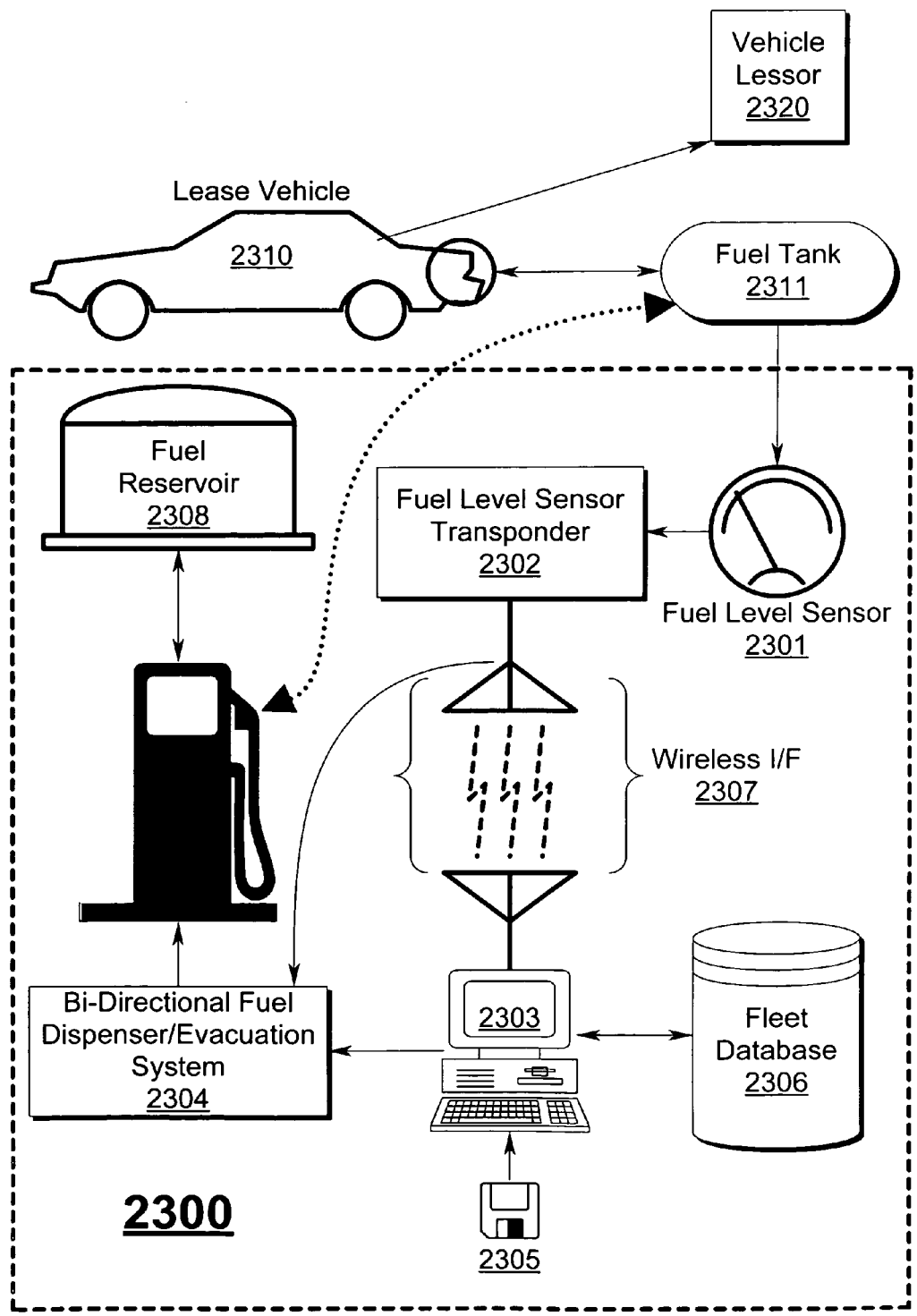
FIG. 23 illustrates an exemplary embodiment of the present invention applied to a fuel management vehicle lease return system in which standardization of fuel tank levels within a fleet vehicle can be utilized to provide optimal revenue generation within the context of a vehicle lease return environment.

A very useful application of this capability is illustrated in system embodiments of the present invention as applied to a fuel management vehicle lease return system as generally illustrated in FIG. 23 (2300) in which fuel tank levels are standardized to a "predetermined" vehicle lease return level.

The context for this method application is a common scenario in which a fleet of vehicles is leased from a major vehicle manufacturer, with a provision for a buyback of the vehicles at the end of the lease term. One important provision of the lease buyback provision is that the fuel tank be filled to some standardized fuel tank level. Traditionally, the implementation of this lease buyback provision has proven both difficult to implement and costly in that it has been difficult to accurately fill the fuel tank to a standardized fuel level. Since the lease buyback provisions often do not require a "full" fuel tank level on return, attempts to achieve "half-full", "quarter-full", or other relative tank levels generally result in the fuel tank being filled in excess of these values, resulting in lost profit when the vehicles are returned to the leasing manufacturer.

While the system depicted in FIG. 23 (2300) and the corresponding methods associated with this system generally target the return of lease vehicles to the lessor, the system and associated method can also be utilized by the lessor to ensure that the fleet vehicles are returned with the proper amount of fuel in the individual vehicle fuel tanks. This reverse scenario can be implemented with a fleet of vehicles, or in some circumstances can be implemented with single vehicles that are leased to individual customers, such as in the case of an automobile leased to a customer through a car dealership.

The general system architecture of the present invention as applied to this particular application is generally illustrated in FIG. 23 (2300). In this exemplary application the system is illustrated as applied to managing return of a leased fuel consuming system (2310) (herein depicted as an automobile) to a vehicle lessor (2320). This fuel consuming system (2310) is generally equipped with a fuel tank (2311) that may take a variety of forms. The present invention generally comprises a fuel level sensor (2301) that detects the amount of fuel present within the fuel tank (2311). This fuel level sensor (2301) communicates with a fuel level sensor transponder (2302) that converts the fuel level information to a wireless data stream (2307) that is relayed to a fuel accounting system (2303) running on a computer system under control of computer software retrieved from computer readable media (2305). A computer readable fleet database (2306) maintains information on specific fuel consuming systems (2310), their required "full" fuel tank levels (as determined by specifications from the lessor (2320)) and information on fuel consumption retrieved from the fuel level sensor (2301) via the fuel level sensor transponder (2302). This preferred exemplary embodiment implement a bi-directional fuel pump dispenser/evacuation system (2304) that determines how much fuel is required to "fill" the fuel tank (2311) by retrieving fuel tank (2311) level information from the fuel sensor (2301) and/or fuel accounting system (2303) and then replacing this exact amount of fuel in the fuel tank (2311) or alternatively removing an exact amount of fuel from the fuel tank (2311) to meet the "full" fuel tank level set by the lessor (2320).

Fuel Management Vehicle Lease Return Method (2400)

Figure 24:
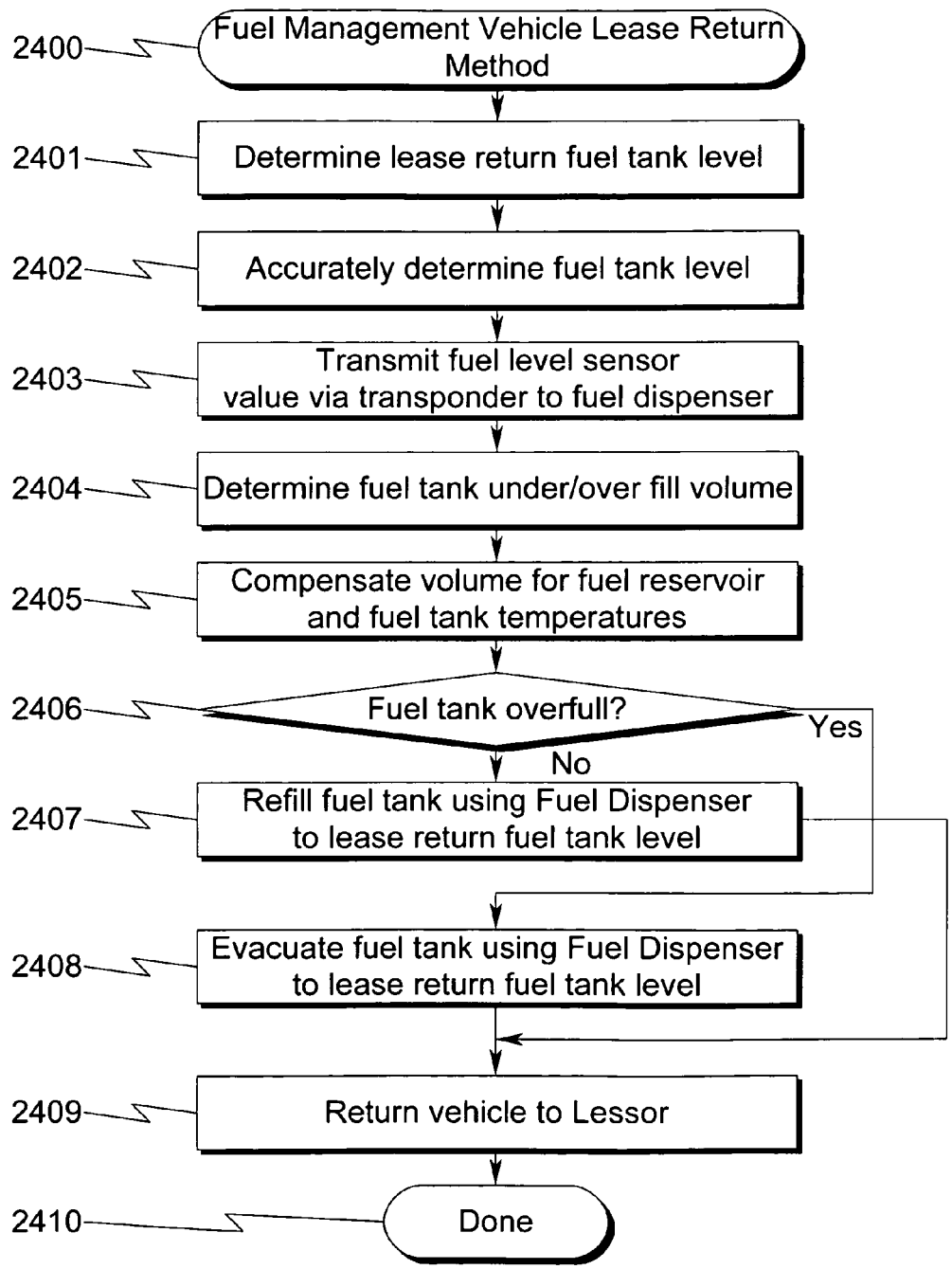
FIG. 24 illustrates an exemplary embodiment of the present invention applied to a fuel management vehicle lease return method in which standardization of fuel tank levels within a fleet vehicle can be utilized to provide optimal revenue generation within the context of a vehicle lease return environment.

Closely associated with the fuel management vehicle lease return system generally illustrated in FIG. 23 (2300) is a corresponding fuel management vehicle lease return method that implements the overall management of the hardware system functionality. One preferred exemplary fuel management vehicle lease return method is generally illustrated in FIG. 24 (2400) and comprises the following steps:

Determining the lease return fuel tank level (2401);
Accurately determining the vehicle fuel tank level using a fuel sensor (2402);
Transmitting the fuel level sensor value via a transponder to a fuel dispenser (2403);
Determining the fuel tank over/under fill volume (2404);
Optionally compensating the fill volume for differentials in temperature between the fuel reservoir and the fuel tank to generate a compensated fuel volume from the fill volume (2405);
If the fuel tank is overfull, proceeding to step (8) (2406);
Refilling the fuel tank with the compensated fuel volume using the fuel dispenser and proceeding to step (9) (2407);
Removing the compensated fuel volume from the fuel tank using the fuel dispenser (2408);
Returning the vehicle to the vehicle lessor (2409);
Terminating the fuel management vehicle lease return method (2410).

It should be noted that step (1) above (2401) may be determined as a "fractional" fuel tank level, such as "one-half", etc. and this information can be utilized by steps (4) and/or (5) to determine the actual over/under fill values based on the maximum tank capacity or the "standardized" fuel tank capacity as temperature compensated.

One skilled in the art will recognize that these method steps may be augmented or rearranged without limiting the teachings of the present invention.

Fuel Management Fuel Reservoir Level Sensor (2500)

Figure 25:
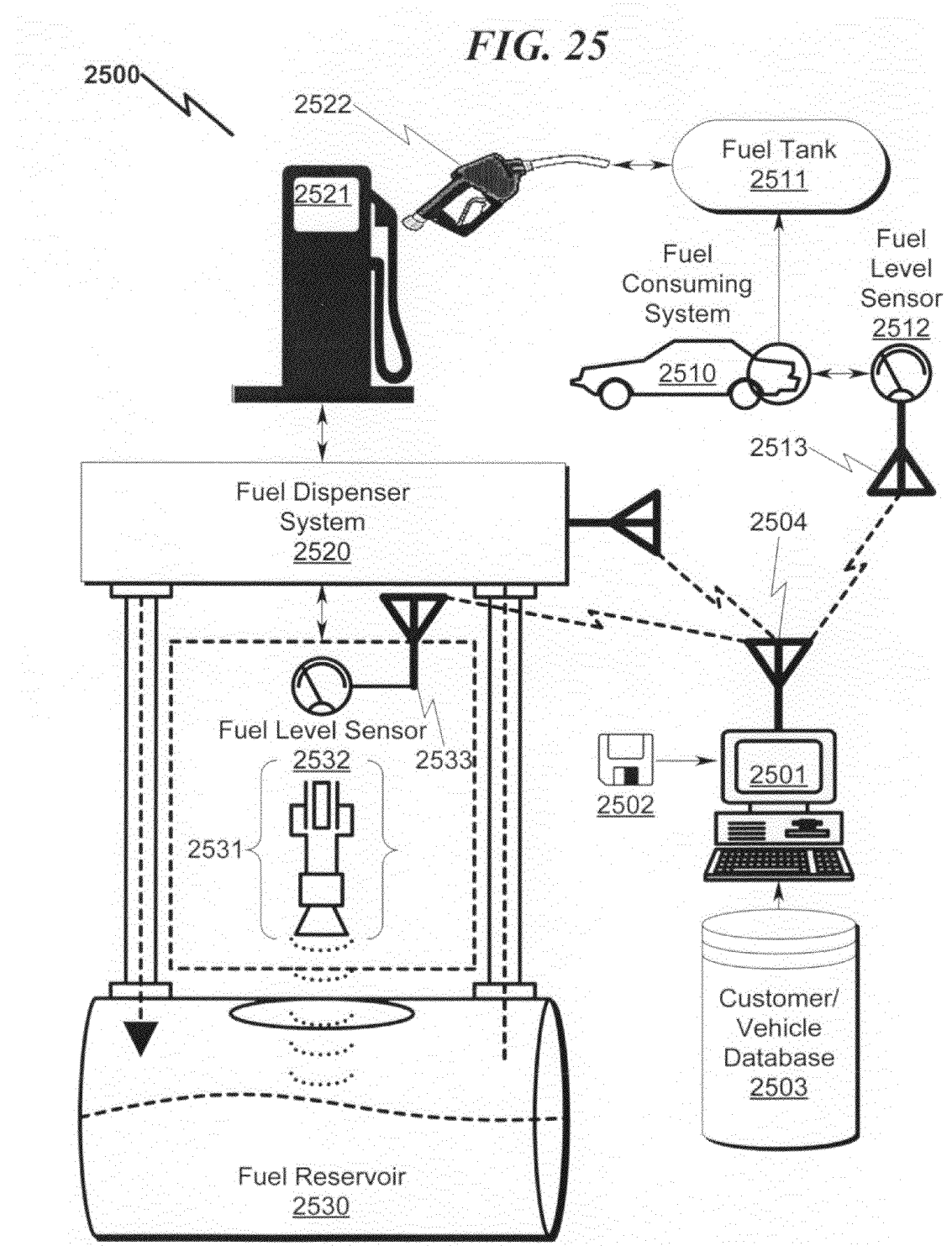
FIG. 25 illustrates a system block diagram of a preferred exemplary embodiment of an ultrasonic fuel level sensor system useful in some preferred embodiments of the present invention as applied to the monitoring of in-ground and above-ground fuel reservoir tanks.

The present invention anticipates that the fuel level sensor technologies disclosed herein can be applied to situations in which an above-ground or in-ground fuel tank reservoir is monitored as part of an overall fuel management system as generally illustrated in FIG. 25 (2500). In this preferred exemplary embodiment the fuel management system is centrally controlled by a computer system (2501) running software read from a computer readable medium (2502) and storing/retrieving data from a customer/vehicle database (2503). This software communicates (2504) to system components using an optimally wireless communications media that in some embodiments may alternatively incorporate hardwired interfaces. The system operates similarly to previously discussed embodiments, wherein a fuel consuming system (2510) comprises a fuel tank (2511) having a fuel level sensor (2512) to monitor fuel tank levels is configured with a fuel level sensor transponder (2513) (herein depicted wirelessly) to communicate this information to the host computer (2501). Within this context the fuel dispenser system (2520) incorporates a fuel dispensing pump (2521) with nozzle dispensing system (2522) to transfer fuel to or from the fuel consuming system (2510).

As part of the fuel dispensing and recovery functionality of this preferred embodiment, the fuel reservoir (2530) utilized as the source and sink for fuel dispensed to/from the fuel consuming system (2510) is outfitted with a fuel tank cap incorporating an ultrasonic or other fuel measurement system (2531) implementing a fuel level sensor (2532) functionality as previously discussed for the vehicle fuel tanks. While these fuel tank caps are conventionally large metal plate coverings associated with-in-ground fuel tanks, the present invention does not limit the scope of the claimed invention to this particular application. This fuel level sensor (2532) operates in much the same way as previously discussed, with the exception that the fuel reservoir tank (2530) in this instance has a much larger capacity. As with the fuel level sensor (2512) monitoring the vehicle fuel tank (2511), the fuel level sensor (2532) associated with the fuel reservoir (2530) incorporates a transponder (2533) that permits communication to the host computer (2501) to permit monitoring of the fuel reservoir (2530) contents as a mechanism of overall fuel management within the vehicle fleet system.

The benefits of this system architecture include the ability to accurately monitor the entire fuel inventory for a vehicle fleet management system. Fuel inventory in this context must include fuel reservoir (2530) capacity and fuel level as well as vehicle fuel tank (2510) capacities and fuel levels. It is only by having all of this information that optimal decisions regarding when to purchase fuel, how much fuel to purchase, and how to deploy the vehicle fleet given fuel inventory constraints can be made.

Since this architecture permits dispensing of fuel to the fuel consuming system (2510) fuel tank (2511) as well as recovery of fuel from the fuel tank (2511), the level of fuel in the fuel reservoir (2530) will be constantly in flux, but decisions regarding its current status can be optimally made because the exact amount of fuel in the fuel reservoir (2530) will be instantly available to the managing computer system (2501) and its associated operating software (2502).

As mentioned previously, one application of the present invention is in the standardization of fuel tank levels in situations where the vehicle fleet is leased and there is a requirement that a standardized amount of fuel be present in the vehicle as it is returned at the end of the fleet leasing period. The architecture presented in FIG. 25 (2500) is optimal for implementing this functionality, as it permits dispensing of fuel or recovery of fuel to/from the fuel tank (2511) while simultaneously permitting accounting for all fuel transactions to/from the leased vehicle (2510).

Fuel Cap Fuel Level Sensor (2600, 2700, 2800)

Figure 26:
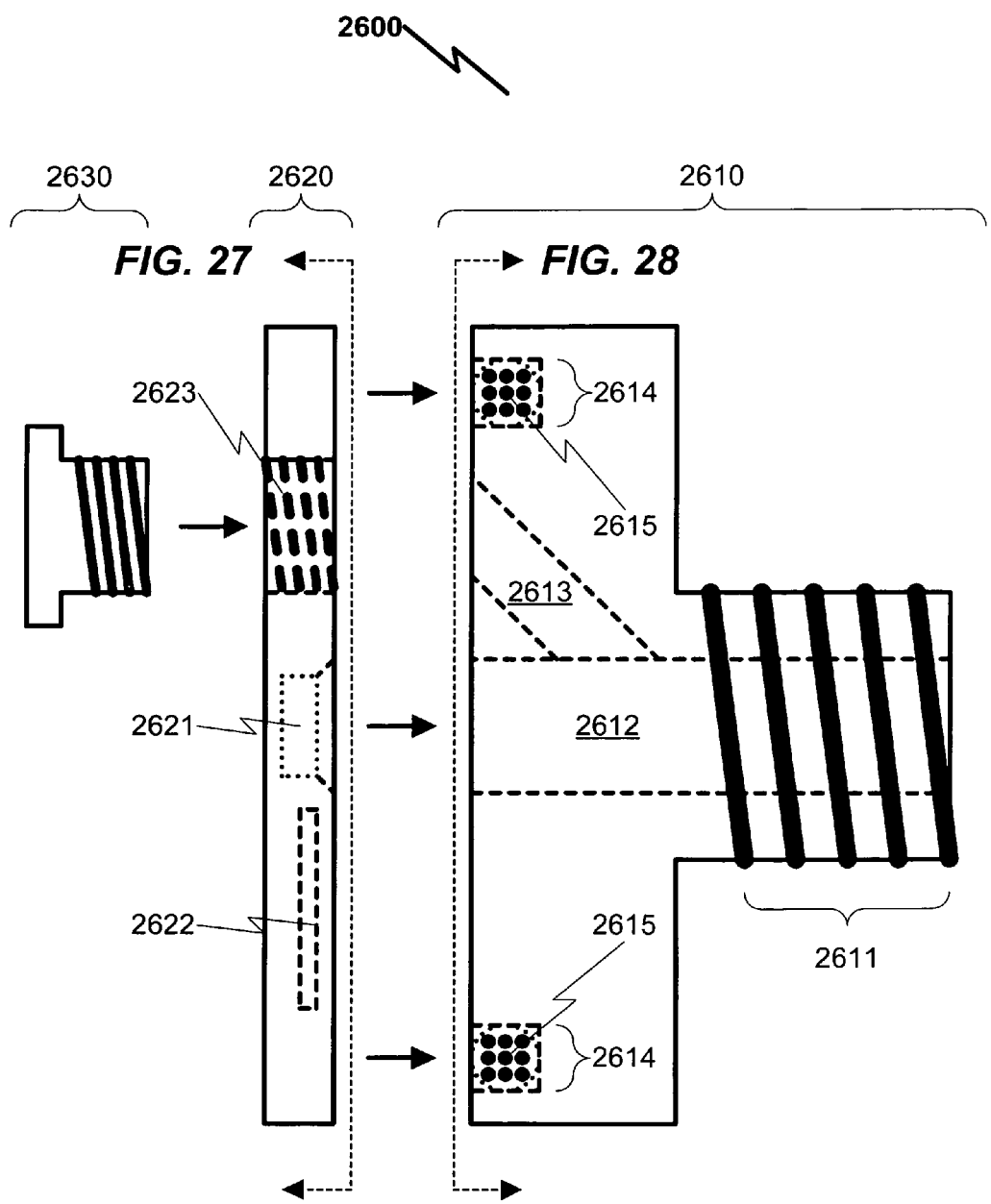
FIG. 26 illustrates a side sectional assembly view of a preferred exemplary embodiment of a fuel cap fuel tank level sensor useful in some preferred embodiments of the present invention.

In many preferred embodiments of the present invention, the fuel level sensor functionality is implemented utilizing a fuel cap fuel level sensor as generally illustrated in FIG. 11 (1100). One preferred embodiment of this fuel cap fuel level sensor is generally illustrated in FIG. 26 (2600), FIG. 27 (2700), and FIG. 28 (2800). While many methodologies are anticipated for construction and fabrication of this fuel level sensor embodiment, this preferred embodiment incorporates a tank interface module (2610), a sensor housing (2620), and a calibration port interface (2630).

The tank interface module (2610) provides for a threaded interface (2611) that mates with the existing fuel tank filling port (not shown) and which is compatible with a conventional fuel tank filler cap. Depending on the manufacturer of the vehicle/fuel tank, this threaded interface (2611) will necessarily be modified depending on application context. Within the body of the tank interface module (2610) a filling/sensor port (2612) is provided to permit access to the fuel tank by emissions from an ultrasonic transducer. Additionally, a calibration port (2613) permits addition of fuel to the tank during the sensor calibration process. In some preferred wireless embodiments, provisions are also made for a pickup coil cavity (2614) that permits a pickup coil (2615) to be embedded within the fuel cap assembly (2600). Leads from the pickup coil (2814) are routed to the PCB (2622) within the sensor housing (2620) for use in providing transponder communications to/from the fuel level sensor subsystem.

The sensor housing (2620) incorporates a recess for the ultrasonic transducer (2621) that transmits and receives ultrasonic energy into the filling/sensor port (2612). As stated previously, many preferred embodiments incorporate the use of an ultrasonic transducer that both emits and receives ultrasonic energy. Some alternate preferred embodiments may utilize separate ultrasonic devices for transmission and reception of ultrasonic energy. Electronics to support the fuel sensor and fuel sensor transponder functionality is provided for in a printed circuit board (PCB) (2622) or other mechanical assembly to integrate the electrical components (2722) within the fuel sensor/fuel sensor transponder assembly.

Finally, a calibration port interface (2630) used to fill the fuel tank during fuel sensor calibration is provided for in this exemplary embodiment. Within this preferred embodiment, a threaded interface (2623) is provide for on the sensor housing (2620) to permit plugging of the calibration port interface (2630) when not in use. A wide variety of calibration port interface (2630) methodologies are anticipated, using a wide variety of security tooling to prevent tampering of the system after calibration of the fuel sensor has been completed. One skilled in the art will recognize that any number of security fasteners may be utilized within the context of the calibration port interface (2630) to achieve this functionality.

Ultrasonic Transducer Variants (2900, 3000, 3100, 3200)

Figure 27:
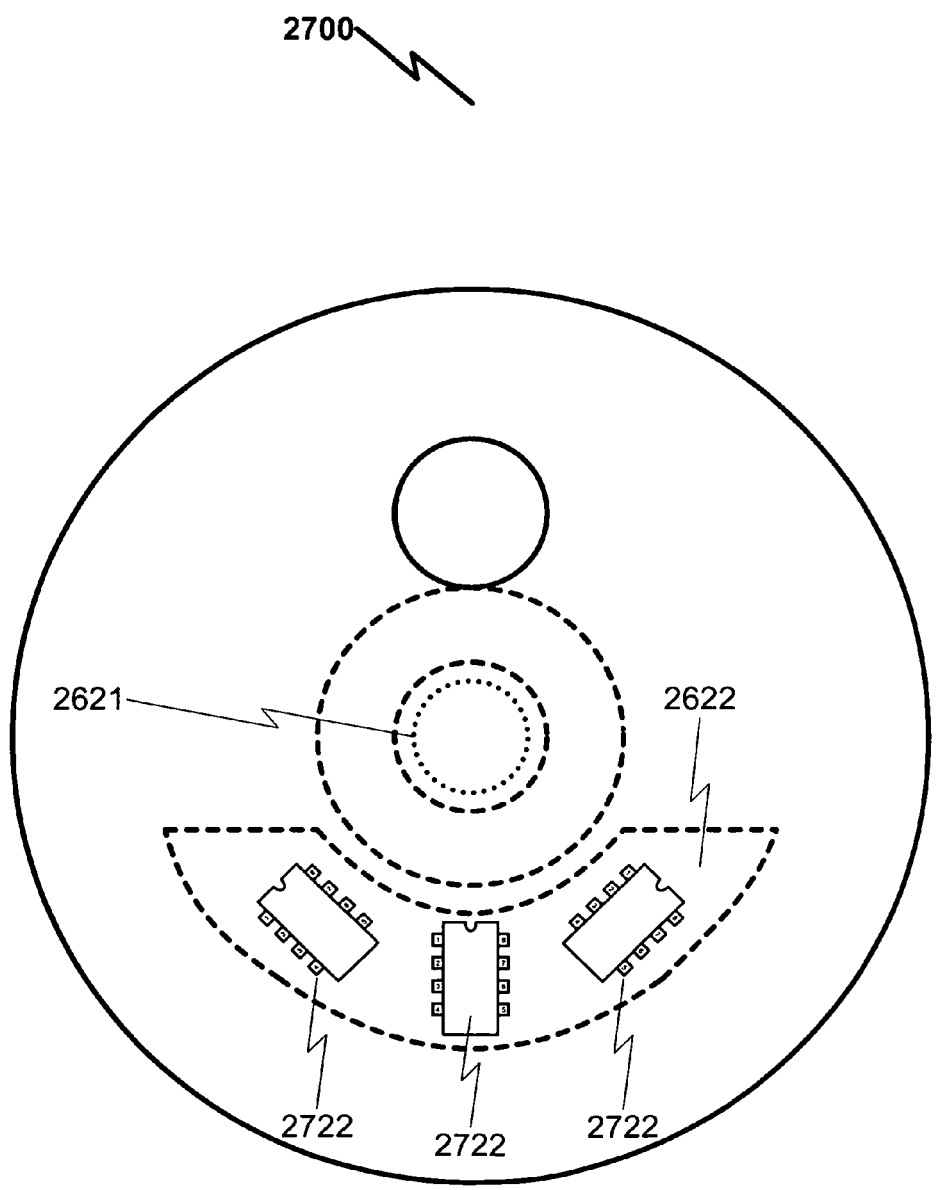
FIG. 27 illustrates a front sectional view of a preferred exemplary embodiment of a fuel cap fuel tank level sensor useful in some preferred embodiments of the present invention.
Figure 28:
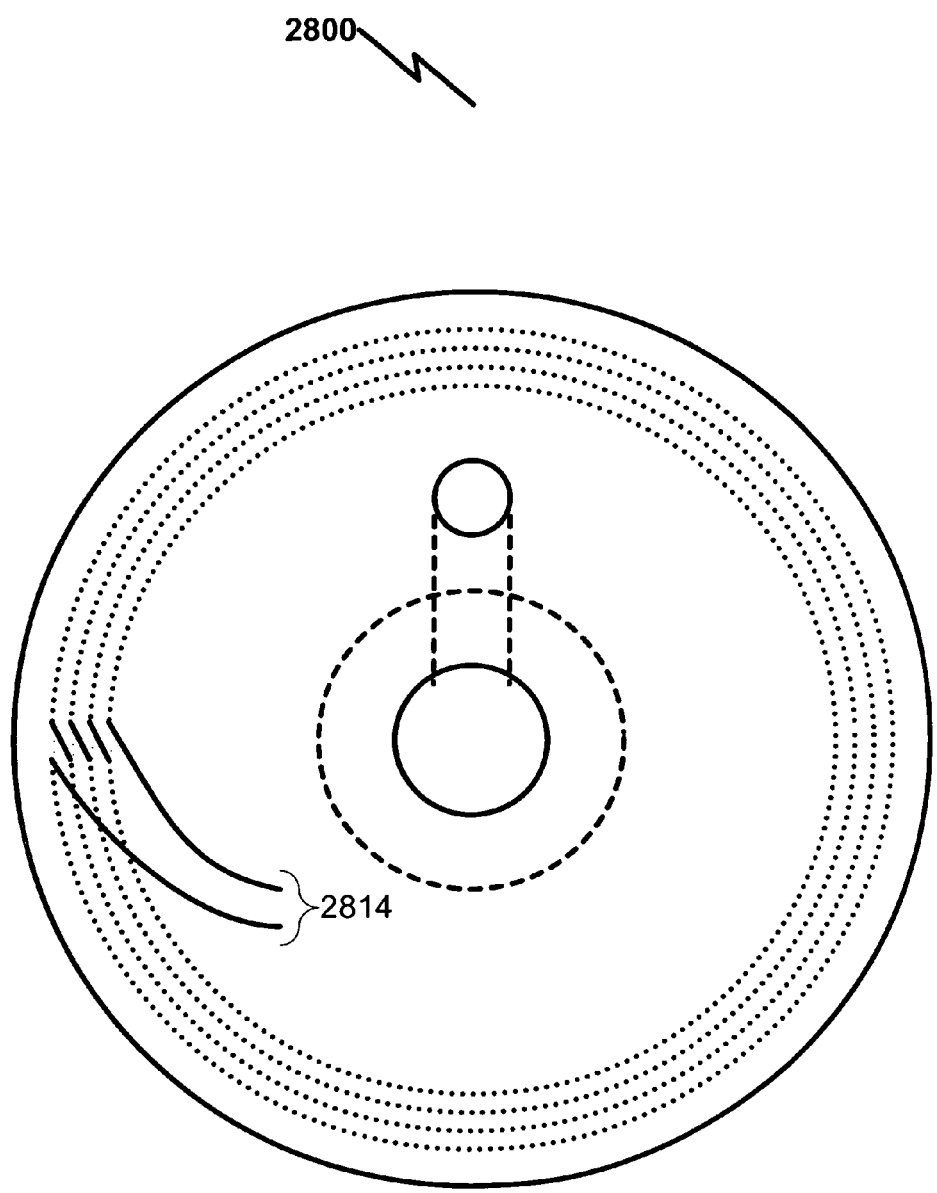
FIG. 28 illustrates a back sectional view of a preferred exemplary embodiment of a fuel cap fuel tank level sensor useful in some preferred embodiments of the present invention.

Within the context of the fuel cap fuel level sensor as generally illustrated in FIG. 26 (2600), FIG. 27 (2700), and FIG. 28 (2800), a wide variety of ultrasonic transducer configurations are possible. One key performance characteristic of any ultrasonic transducer element configuration is the impact of damping on the ultrasonic transducer. A preferred method to mitigate this damping (and thus increase overall transducer Q) is to utilize a circular ultrasonic transducer that has as its mounting point the center of the circle.

Figure 29:
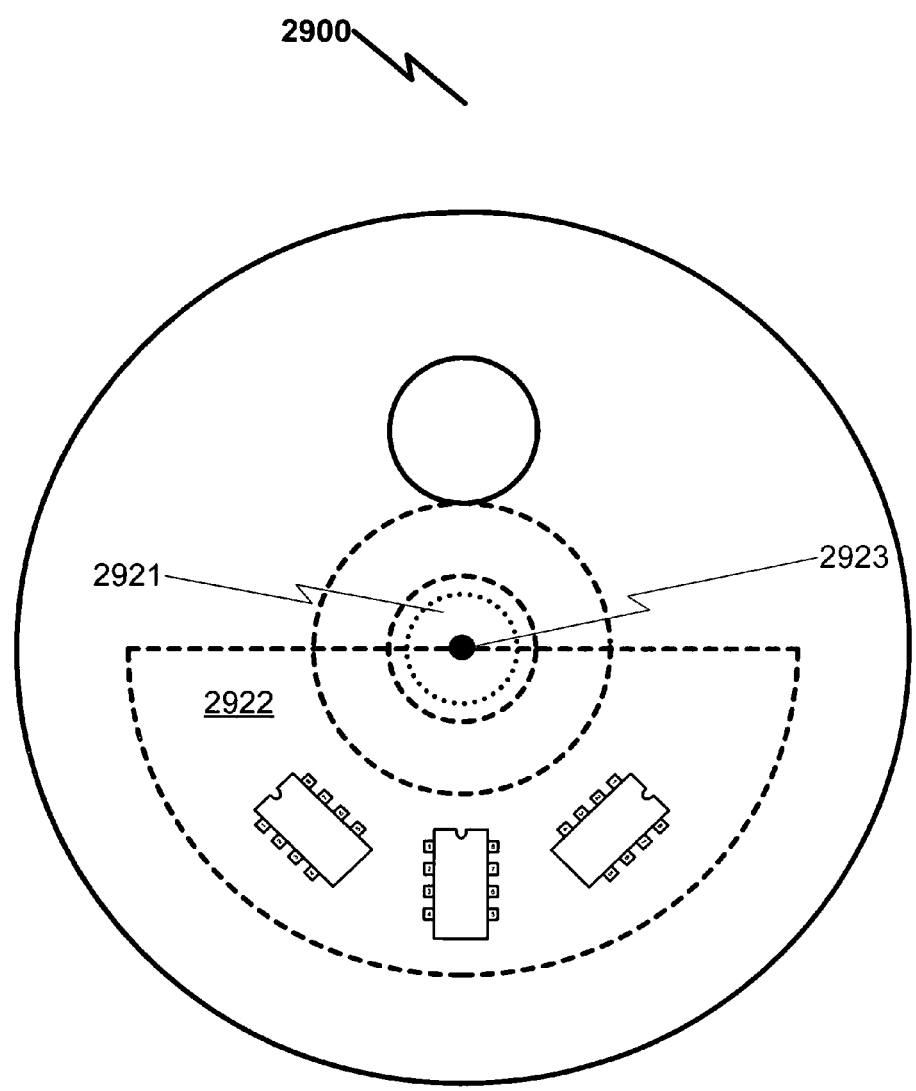
FIG. 29 illustrates a front sectional view of an alternative preferred exemplary embodiment of a fuel cap fuel tank level sensor useful in some preferred embodiments of the present invention.

As generally illustrated in FIG. 29 (2900), the PCB circuit assembly (2922) may be extended to cover the bottom of the ultrasonic transducer (2921). A mounting point (2923) secures the center of the ultrasonic transducer to the PCB (2922) and also provides a method of electrical connection between the PCB (2922) and the ultrasonic transducer (2921).

Figure 30:
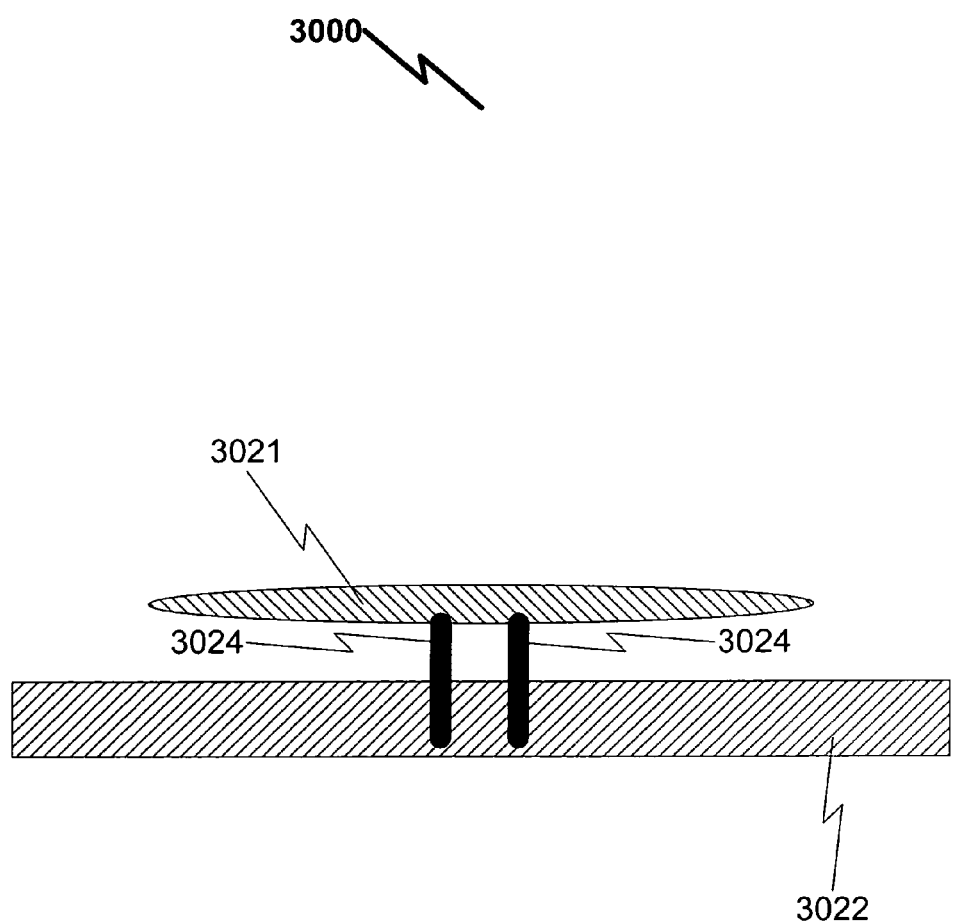
FIG. 30 illustrates a preferred exemplary embodiment of dipole mounting an ultrasonic transducer that is useful in some preferred embodiments of the present invention.
Figure 31:
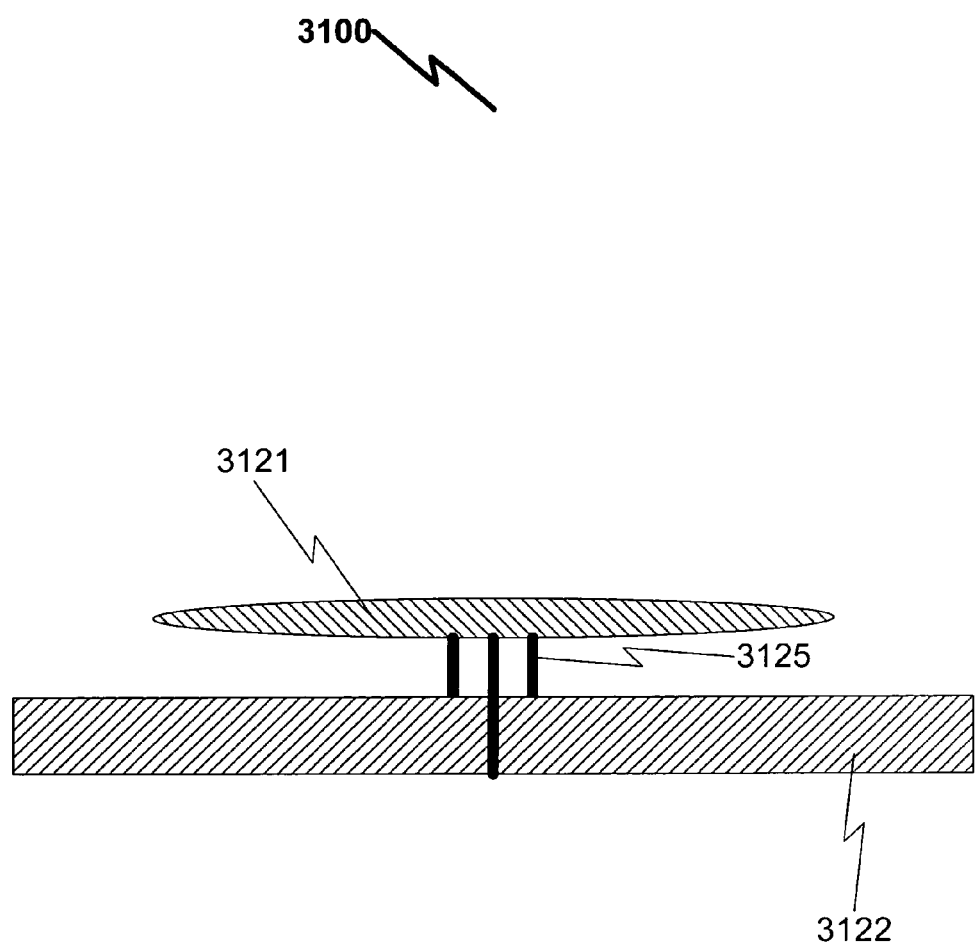
FIG. 31 illustrates a preferred exemplary embodiment of coaxial mounting an ultrasonic transducer that is useful in some preferred embodiments of the present invention.

FIG. 30 (3000) and FIG. 31 (3100) illustrate how the mounting point (2923) can be implemented in a variety of ways, with FIG. 30 (3000) illustrating a mounting point using discrete wires (3024) to connect the ultrasonic sensor (3021) to the PCB (3022), and FIG. 31 (3100) illustrating a mounting point using a coaxial connection (3125) to connect the ultrasonic sensor (3121) to the PCB (3122).

Figure 32:
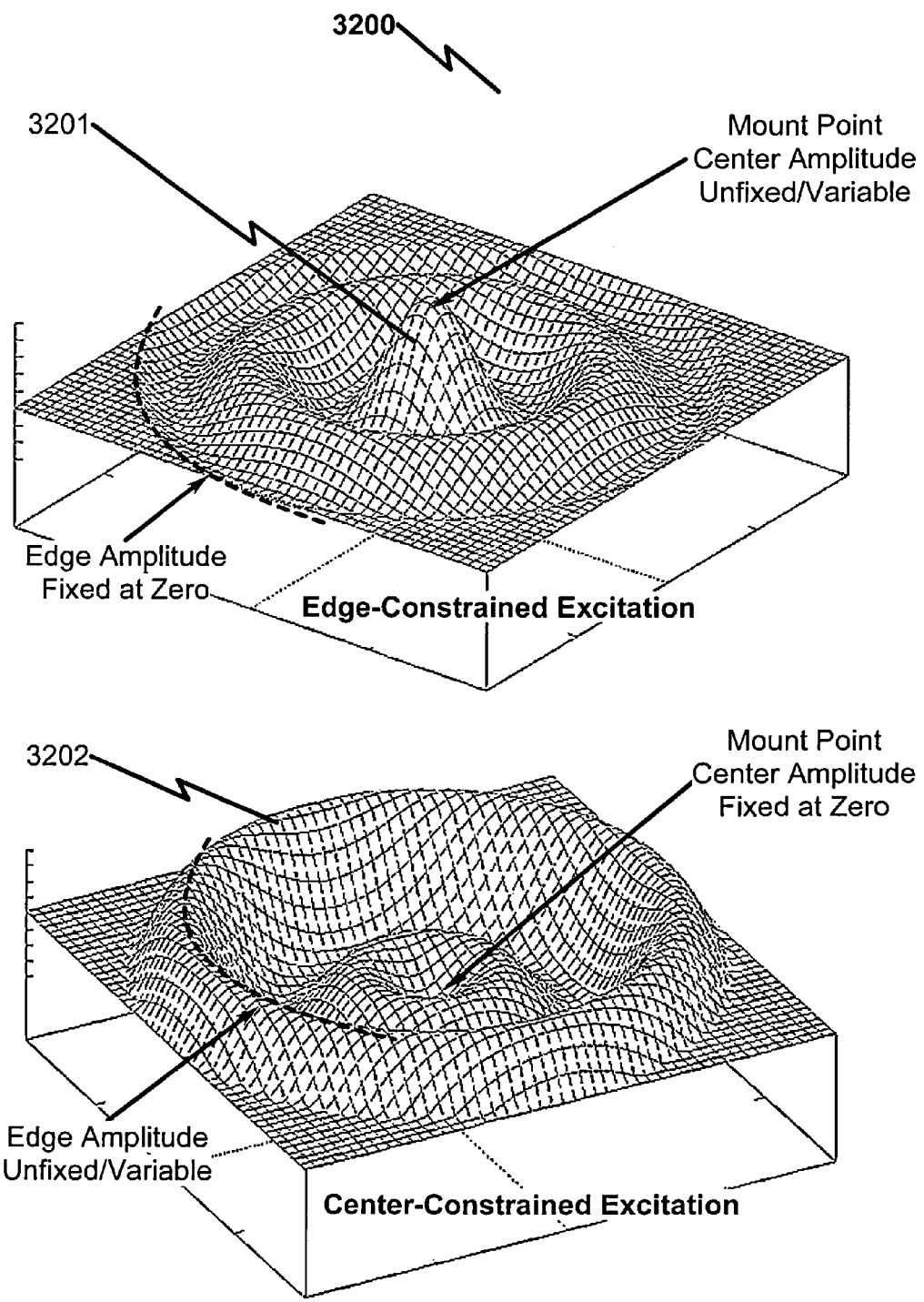
FIG. 32 illustrates several examples of cylindrical Bessel function excitations that may be useful in configuring some preferred embodiments of the present invention.

The thrust of this center-connection mounting methodology is to take advantage of the nodal points in the Bessel functions associated with excitation of the ultrasonic transducer to maximize excitation of the transducer while minimizing damping associated with the physical mounting of the device. As generally illustrated in FIG. 32 (3200), cylindrical Bessel functions associated with the excitation/oscillation of the ultrasonic transducer can take a variety of forms, with a first common variant having edge-constrained excitation (3201) (edges of the cylinder fixed), while a second variant may operate with center-constrained excitation (3202) (center of the cylinder fixed). The edge damping associated with the first variant (3201) may result in reduced ultrasonic energy output as compared to the second variant (3202) that is considered optimal for use with many preferred embodiments of the present invention. Note that the second variant (3202), by reducing the damping associated with the transducer outer edges, may permit a variety of other modes of oscillation within the ultrasonic transducer to occur, permitting a greater range of possible high amplitude outputs as compared to the first variant (3201).

One skilled in the art will recognize that these ultrasonic mounting variants are not limitive of the scope of the present invention, but rather provide a context in which several preferred exemplary embodiments may be constructed.

Use of Aftermarket Fuel Level Sensors

The present invention may make use of a wide variety of existing fuel level sensors to implement some preferred exemplary system and method embodiments of the claimed invention. These fuel level sensors may incorporate traditional resistive fuel level sensors as well as ultrasonic fuel level sensors that are currently available in the prior art. Of particular application in some embodiments are resistive and ultrasonic fuel level sensors from SSI TECHNOLOGIES, INC., 2643 West Court Street, Janesville, Wis. 53548-3357 USA, including their FLUID-TRAC brand and ACU-TRAC brand lines of fluid level sensors.

It should be noted, however, that the incorporation of these sensors is not optimal in many anticipated applications of the present invention due to the power requirements of these devices. Situations in which these sensors are used as replacements for conventional fuel tank sensors (FIG. 12 (1202)) require that the cable harnesses of the vehicle be modified to accommodate power and signaling information that is generally hardwired within the electrical system of the vehicle. It should be noted that the accuracy of these devices is approximately 2%, and there doesn't appear to be a methodology to tailor the units to individual fuel tank geometries in conjunction with a calibration system as outlined in the present invention. Additionally, the power requirements of the SSI product line of fluid level sensors may put them beyond the power budget of the low/zero-power invention embodiments illustrated in FIG. 14 (1400) and FIG. 15 (1500). Finally, power requirements for these units put them beyond the space constraints available for fuel cap embodiments of the present invention as generally illustrated in FIG. 11 (1120) and elsewhere in this document.

Therefore, given the goals of the present invention regarding low-cost/generic retrofit applications of fuel consuming systems (particularly in the context of rental fleet vehicles), the use of these aftermarket fuel level sensors, while in some instances possible, is not preferred. Between the addition cost associated with vehicle retrofits, limited power budgets, physical constraints, and overall system accuracy/precision, the present invention provides a fuel management measurement methodology that is superior to the existing technologies exhibited by prior art such as depicted by SSI within this particular application context. Within this application context, a paramount consideration for acceptable integration into fleet management is implementation cost and versatility in fleet application, a central aspect of the present invention architecture.

System Summary

General System

The present invention system anticipates a wide variety of variations in the basic theme of construction, but can be generalized as a fuel management system comprising:
(a) fuel level sensor;
(b) fuel level sensor transponder; and
(c) fuel accounting system;
wherein
the fuel level sensor determines the current fuel contents of a fuel tank and produces a measurement output responsive to the contents;
the fuel level sensor transponder accepts the measurement output and transmits the measurement output to the fuel accounting system;
the fuel accounting system saves as a stored data records the transmitted measurement output into a database associated with the fuel consuming system associated with the fuel tank; and
the fuel accounting system determines fuel consumption of the fuel consuming system by noting the differential between the stored data records within the database.

This general system summary may be augmented by the various elements described herein to produce a wide variety of invention embodiments consistent with this overall design description.

Fuel Surcharge System

The present invention also anticipates a fuel surcharge fuel management system variant embodiment comprising:
(a) host computer system;
(b) fuel consuming system vehicle computer system;
(c) fuel level sensor;
(d) fuel level sensor transponder; and
(e) fuel accounting system operating under the host computer system;
wherein
the fuel level sensor determines the current fuel contents of a fuel tank and produces a measurement output responsive to the contents;
the fuel level sensor transponder accepts the measurement output and transmits the measurement output to the fuel accounting system;
the fuel accounting system saves as stored data records the transmitted measurement output into a database associated with the fuel consuming system associated with the fuel tank; and
the fuel accounting system determines fuel consumption of the fuel consuming system by noting the differential between the stored data records within the database.

This fuel surcharge system can incorporate a number of other features as detailed above, including but not limited to GPS positioning, real-time clock logging of GPS position during deliveries, and relative fuel consumption data for each way-point delivery.

Fuel Arbitrage System

The present invention also anticipates a fuel arbitrage fuel management system embodiment variant comprising:
(a) host computer system;
(b) fuel purchase/delivery decision matrix operating under software control of the host computer system;
(c) fuel purchase/delivery ordering subsystem;
(d) fleet fuel inventory, further comprising a plethora of fuel level sensors and associated fuel level sensor transponders that communicate fleet fuel levels to the host computer system;
wherein
the fuel purchase/delivery decision matrix integrates information from fleet fuel inventory fuel level sensors, fuel price trends, historical fuel demand trends, and/or fleet vehicle data to make a determination if and when replacement fuel should be purchased/delivered;
the fuel purchase/delivery ordering subsystem acts on the determination to affect purchasing/delivery of the replacement fuel; and
the fuel reservoir accepts the replacement fuel delivered by the actions of the fuel purchase/delivery ordering subsystem.

Vehicle Lease Return System

The present invention also anticipates a fuel management vehicle lease return system variant embodiment comprising:
- (a) fuel level sensor;
- (b) fuel level sensor transponder; and
- (c) fuel dispensing/removal system;

wherein
the fuel level sensor determines the current fuel contents of a fuel tank and produces a measurement output responsive to the contents;
the fuel level sensor transponder accepts the measurement output and transmits the measurement output to the fuel dispensing/retrieval system;
the fuel dispensing/removal system determines a standardized "full" fuel level for the fuel tank; and
the fuel dispensing/removal system attempts to bring the fuel level in the fuel tank to a standardized "full" fuel level by removing fuel from the fuel tank if the measurement output indicates an overfull fuel tank and dispensing fuel to the fuel tank if the measurement output indicates an under-full fuel tank.

Method Summary

The present invention method anticipates a wide variety of variations in the basic theme of implementation, but can be generalized as a fuel management method wherein the method comprises:
- (1) Accurately sensing the level of fuel in a fuel tank using a fuel level sensor having a fuel level sensor measurement output;
- (2) Transmitting the fuel level sensor measurement output via a fuel level sensor transponder;
- (3) Receiving the transmitted fuel level sensor measurement output as current fuel level information in a fuel accounting system;
- (4) Tracking the fuel level information associated with a given customer or vehicle in a customer database;
- (5) Determining if fuel tank refilling is enabled, and if not, proceeding to step (8);
- (6) Subtracting the sensed fuel level from a "full" tank value to determine a fuel tank "refill" quantity;
- (7) Refilling the fuel tank using a fuel dispenser system that is controlled by the fuel accounting system based on the difference between the sensed fuel tank level and a predetermined "full" fuel tank level; and
- (8) Terminating the fuel accounting cycle.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:

An embodiment wherein the fuel level sensor further comprises a fuel tank cap utilizing an ultrasonic transducer to determine the current fuel contents by transmitting ultrasonic energy into the fuel filler tube of the fuel tank and measuring the return echo time of the ultrasonic energy after the ultrasonic energy impinges on the current fuel contents.

An embodiment wherein the fuel tank cap further comprises a fuel sensor tube fitting within the filler tube of the fuel tank, the fuel sensor tube further comprising a float ball positioned to float on the surface of fuel contained within the fuel tank.

An embodiment wherein the fuel accounting system further comprises a fuel dispensing apparatus that dispenses fuel to the fuel tank based on the differential between a predetermined "full" fuel tank level and the current fuel contents.

An embodiment wherein the fuel accounting system further comprises a fuel dispensing apparatus that (a) dispenses fuel to the fuel tank based on the differential between a predetermined "full" fuel tank level and the current fuel contents if the fuel tank fuel level is below a predetermined "full" level, or (b) removes fuel from the fuel tank based on the differential between a predetermined "full" fuel level and the current fuel contents if the fuel tank fuel level is above a predetermined "full" level.

An embodiment wherein the "full" fuel tank level and the measurement of the current fuel contents are temperature standardized based on the respective temperature of fuel within the fuel tank and the temperature of fuel supplied by the fuel dispensing apparatus.

An embodiment wherein the fuel level sensor measurement output is compensated based on the characteristics of the fuel tank and the fuel level sensor by interpolating values contained in a fuel tank calibration table, the fuel tank calibration table being generated by a process of evacuating the contents of the fuel tank followed by incremental additions of fuel to the fuel tank coupled with recording the fuel level sensor measurement output associated with the fuel level corresponding to the incremental fuel additions.

An embodiment wherein the fuel level sensor transponder communicates with the fuel accounting system utilizing wireless low/zero power communication system, the communication system further comprising a power transmitter controlled by the accounting system, and a power receiver configuration switch and power reception state machine interfaced to and controlled by the fuel level sensor.

An embodiment wherein the power receiver configuration switch further comprises an inductive pickup electrically connected to a configuration matrix that is electrically connected to elements of a power load matrix.

An embodiment wherein the fuel level sensor further comprises an A/D converter, the A/D converter further comprising an analog input and digital output, the analog input connected to an inline fuel level sensor integrated into the fuel tank and the digital output connected to the fuel level sensor transponder.

An embodiment wherein the fuel management system/method is integrated into a vehicle rental/lease accounting system/method.

An embodiment wherein the fuel level sensor is embodied in a fuel tank cap incorporating a display, with the fuel cap display triggered via a magnetic Hall effect sensor. This variant may incorporate a magnetic source in the vehicle body covering of the fuel tank cap to affect this display triggering.

An embodiment wherein the fuel level sensor is embodied in a fuel tank cap incorporating a visual indicator that indicates if the fuel tank is "full" and/or the current fuel level within the fuel tank.

An embodiment wherein the fuel level sensor is embodied in a fuel tank cap incorporating a pushbutton switch to trigger a visual indicator that indicates if the fuel tank is "full" and/or the current fuel level within the fuel tank.

An embodiment wherein the fuel level sensor is embodied in a fuel tank cap incorporating a periodic trigger to display a visual indicator that indicates if the fuel tank is "full" and/or the current fuel level within the fuel tank.

An embodiment wherein the fuel level sensor is embodied in a fuel tank cap incorporating a visual display to indicate whether the fuel tank is "unfull", "full", or "overfull".

One skilled in the art will recognize that other embodiments are possible based on combinations of elements taught within the above invention description.

CONCLUSION

A fuel management system and method that permits accurate accounting of fuel consumption within the context of a fuel consuming system has been disclosed. The system/method may be broadly described as comprising a fuel level sensor, fuel level sensor transponder, fuel accounting system, and optional regulated fuel dispenser. The fuel level sensor accurately determines the contents of a fuel tank. This information is reported via fuel sensor transponder to a fuel accounting system that tracks the fuel consumption of the fuel consuming system and provides billing information based on the detected fuel consumption. This accounting information may be utilized within an optional regulated fuel dispenser to refill/unfill the fuel tank to an accurately predetermined fuel level for the next fuel management accounting cycle. The present invention has many applications, including but not limited to management of rental/lease vehicles, transportation fuel surcharges, leased vehicle fleet returns, and/or fuel arbitrage.

What is claimed is:

1. A fuel management fuel surcharge method comprising:
   (1) Queuing customer cargo for transport in a customer load cargo database;
   (2) Optimizing a load transport delivery schedule from said customer load cargo database;
   (3) Loading a vehicle for delivery and dispatch with said customer cargo;
   (4) Transporting said customer cargo to a delivery way-point with said vehicle and recording said cargo as delivered;
   (5) Transmitting fuel level sensor information from the fuel tank of said vehicle via a fuel level transponder to a fuel level recording system and a fuel accounting system;
   (6) Recording said vehicle fuel tank level, GPS coordinates, and real-time clock value at said delivery way-point;
   (7) Determining if there is cargo to load at said delivery way-point, and if so, proceeding to said step (1);
   (8) Determining if there are more deliveries to complete, and if so, proceeding to said step (4);
   (9) Transferring said recorded vehicle fuel tank level, GPS coordinates, and real-time clock value way point information to an accounting computer system;
   (10) Calculating the actual costs and fuel surcharge for individual cargo deliveries based on said transferred recorded way-point information; and
   (11) Generating a customer cargo load delivery billing report from said calculated actual costs and fuel surcharges;
   wherein:
   said transmitting fuel level sensor information from said fuel tank of said vehicle via a fuel level transponder to a fuel level recording system and a fuel accounting system comprise determining a current fuel level of said fuel tank and producing measurement output responsive to said current fuel level with a fuel level sensor;
   said fuel level sensor is a fuel tank cap utilizing an ultrasonic transducer which transmits ultrasonic enemy into a fuel filler tube said fuel tank and measures the return echo time of said ultrasonic energy after said ultrasonic energy impinges on a surface of fuel contained within the fuel tank;
   said fuel level sensor comprises a fuel level sensor transponder which accepts said fuel level sensor measurement output responsive to said current fuel level and transmits said fuel level sensor measurement output;
   said fuel accounting system is configured to receive said transmitted fuel level sensor measurement output, store said transmitted fuel level sensor measurement output into a database associated with a fuel consuming system of said fuel tank, and calculate a difference between a predetermined fuel tank level and said current fuel level; and
   said fuel level sensor measurement output is compensated based on characteristics of said fuel tank and said fuel level sensor by interpolating values contained in a fuel tank calibration table, said fuel tank calibration table being previously generated by a process of evacuating the contents of said fuel tank followed by incremental additions of fuel to said fuel tank coupled with recording said fuel level sensor measurement output associated with the fuel level corresponding to said incremental fuel additions.

2. The fuel management method of claim 1 wherein said fuel tank cap further comprises a fuel sensor tube fitting within the filler tube of said fuel tank, said fuel sensor tube further comprising a float ball positioned to float on the surface of fuel contained within said fuel tank.

3. The fuel management method of claim 1 wherein said fuel accounting system further comprises a fuel dispensing apparatus that dispenses fuel to said fuel tank based on the differential between a predetermined "full" fuel tank level and said current fuel contents.

4. The fuel management method of claim 3 wherein said "full" fuel tank level and said measurement of said current fuel contents are temperature standardised based on the respective temperature of fuel within said fuel tank and the temperature of fuel supplied by said fuel dispensing apparatus.

* * * * *